(12) United States Patent
Fuwa

(10) Patent No.: US 8,131,448 B2
(45) Date of Patent: Mar. 6, 2012

(54) ENGINE CONTROL APPARATUS AND METHOD

(75) Inventor: Naohide Fuwa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 817 days.

(21) Appl. No.: 11/988,741

(22) PCT Filed: Jul. 13, 2006

(86) PCT No.: PCT/IB2006/001927
§ 371 (c)(1),
(2), (4) Date: Apr. 4, 2008

(87) PCT Pub. No.: WO2007/010348
PCT Pub. Date: Jan. 25, 2007

(65) Prior Publication Data
US 2009/0048764 A1  Feb. 19, 2009

(30) Foreign Application Priority Data
Jul. 15, 2005 (JP) .................. 2005-207435

(51) Int. Cl.
*F02D 45/00* (2006.01)
*F01L 13/00* (2006.01)
*G06F 19/00* (2011.01)
(52) U.S. Cl. .................. 701/105; 123/90.15
(58) Field of Classification Search ............ 701/105, 701/103, 113, 115; 123/90.15, 90.16, 90.17
See application file for complete search history.

(56) References Cited

U.S. PATENT DOCUMENTS

| 5,103,780 A | 4/1992 | Ishii |
| 5,280,770 A | 1/1994 | Satou et al. |
| 6,278,933 B1 | 8/2001 | Buckland et al. |
| 6,378,484 B1 | 4/2002 | Russell et al. |
| 6,915,769 B2 * | 7/2005 | Yoshikawa et al. ........ 123/90.17 |
| 6,945,224 B2 * | 9/2005 | Yoshizawa et al. ........ 123/90.15 |
| 7,032,567 B2 * | 4/2006 | Ogiso et al. ............... 123/90.15 |
| 7,594,487 B2 * | 9/2009 | Okamoto ................... 123/90.16 |
| 2002/0066436 A1 | 6/2002 | Majima et al. |
| 2003/0121486 A1 | 7/2003 | Komazawa et al. |
| 2004/0031466 A1 | 2/2004 | Ogiso et al. |

FOREIGN PATENT DOCUMENTS

| EP | 0 828 068 A2 | 3/1998 |
| EP | 1 143 119 A2 | 10/2001 |
| EP | 1 227 229 A | 7/2002 |
| EP | 1 310 649 A | 5/2003 |
| EP | 1 375 840 A | 1/2004 |
| EP | 1 586 761 A2 | 10/2005 |
| FR | 2 843 421 A | 2/2004 |

(Continued)

OTHER PUBLICATIONS

Office Action issued on Aug. 25, 2011 in CN 2010010163667.5 and English translation thereof.

(Continued)

*Primary Examiner* — Hieu T Vo
(74) *Attorney, Agent, or Firm* — Kenyon & Kenyon LLP

(57) ABSTRACT

To provide a control apparatus of an engine that improves vehicle drivability by controlling a variable valve mechanism. The control apparatus of an engine prohibits the changing of the valve duration of an intake valve during a stop of an engine.

38 Claims, 35 Drawing Sheets

FOREIGN PATENT DOCUMENTS

| | | |
|---|---|---|
| JP | 07-109907 A | 4/1995 |
| JP | 11-270368 A | 10/1999 |
| JP | 2000-034913 A | 2/2000 |
| JP | 2000-136709 A | 5/2000 |
| JP | 2001-263015 A | 9/2001 |
| JP | 2002-371871 A | 12/2002 |
| JP | 2004-183512 A | 7/2004 |
| JP | 2005-061286 A | 3/2005 |
| JP | 2005-069147 A | 3/2005 |
| JP | 2005-127239 A | 5/2005 |
| JP | 2005-517852 T | 6/2005 |
| JP | 2009-209787 A * | 9/2009 |
| KR | 1998-24127 | 7/1998 |

OTHER PUBLICATIONS

Office Actions issued on Nov. 1, 2011 in JP 2010-087377 2010-087378 and English translations thereof.

* cited by examiner

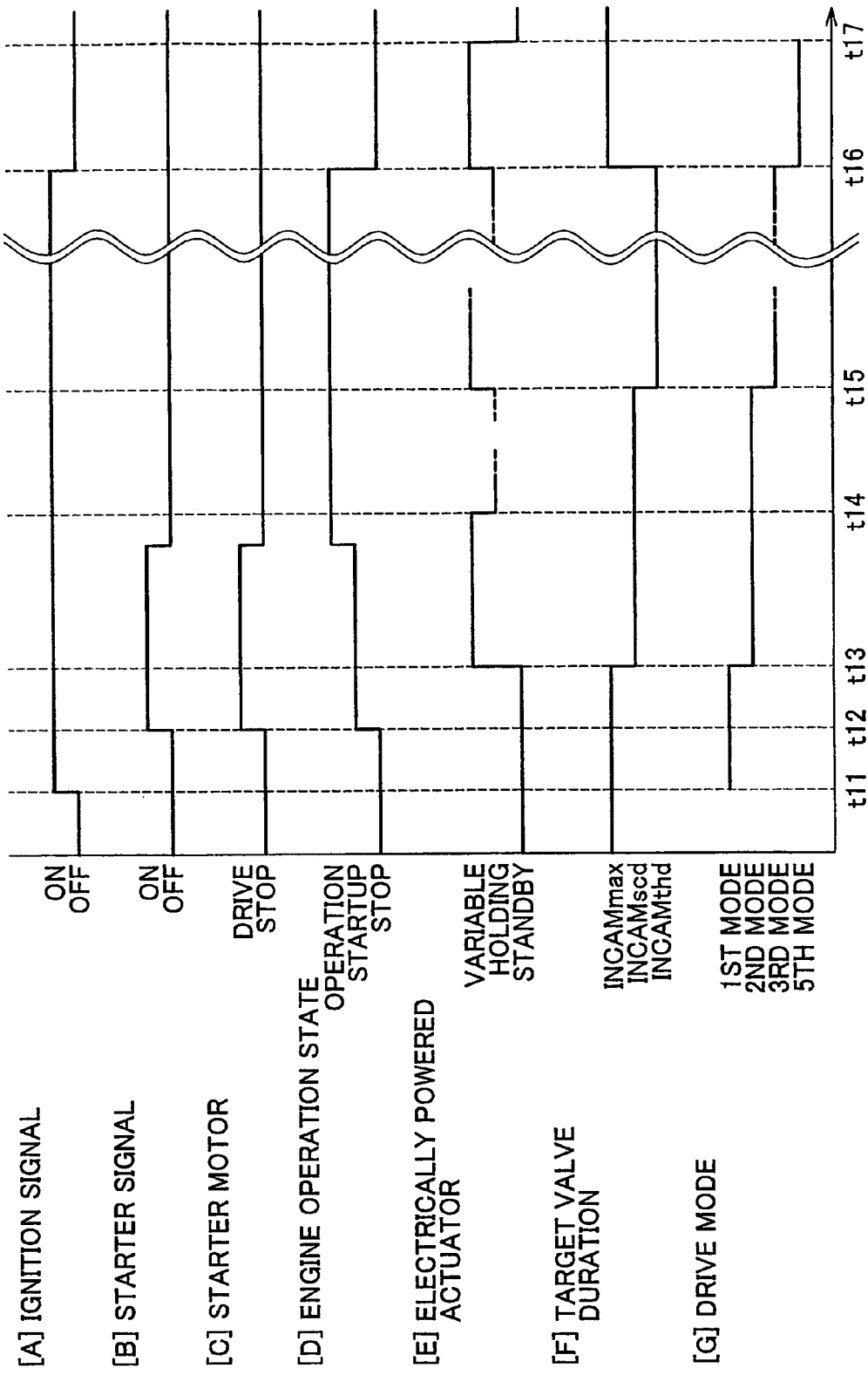

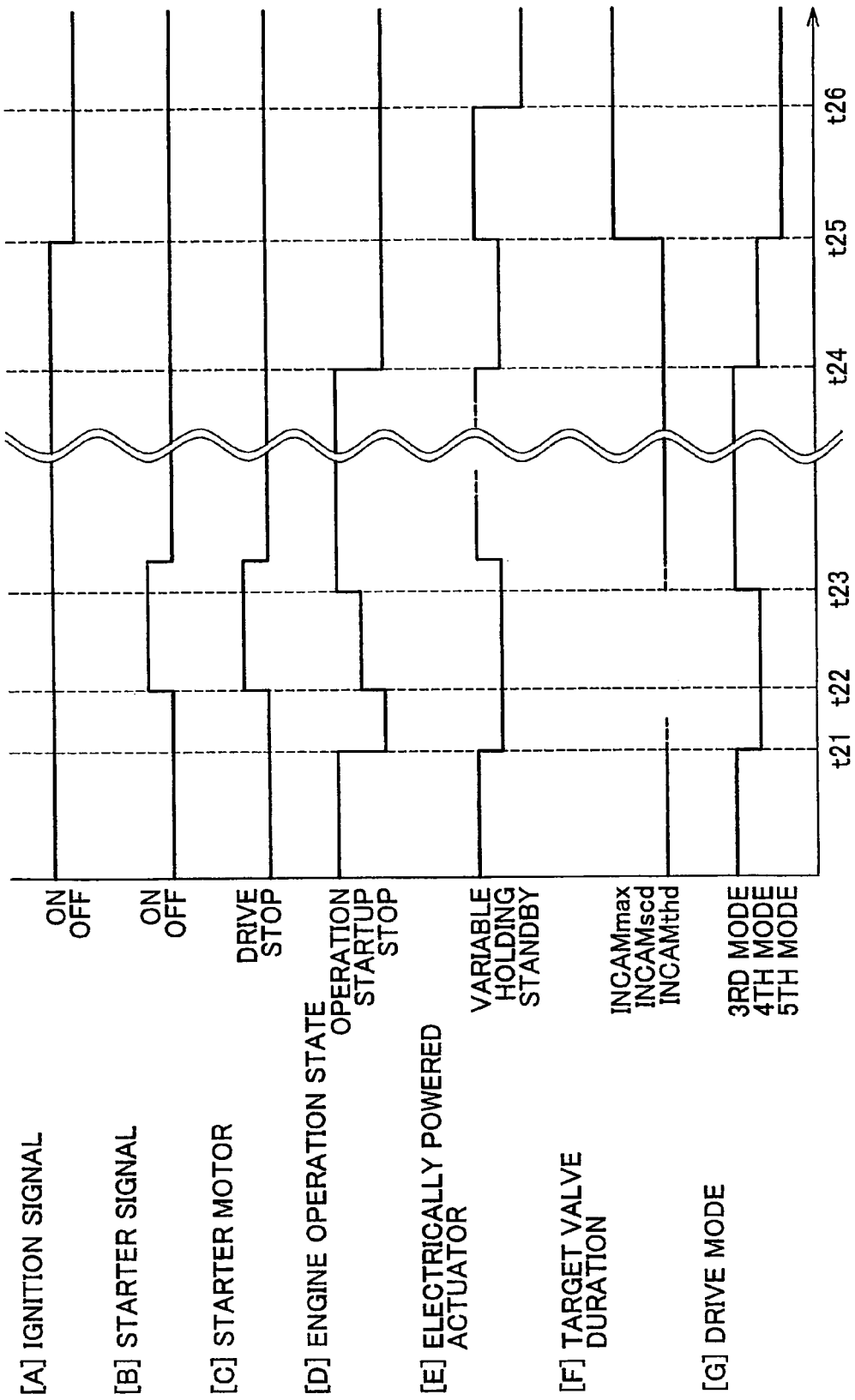

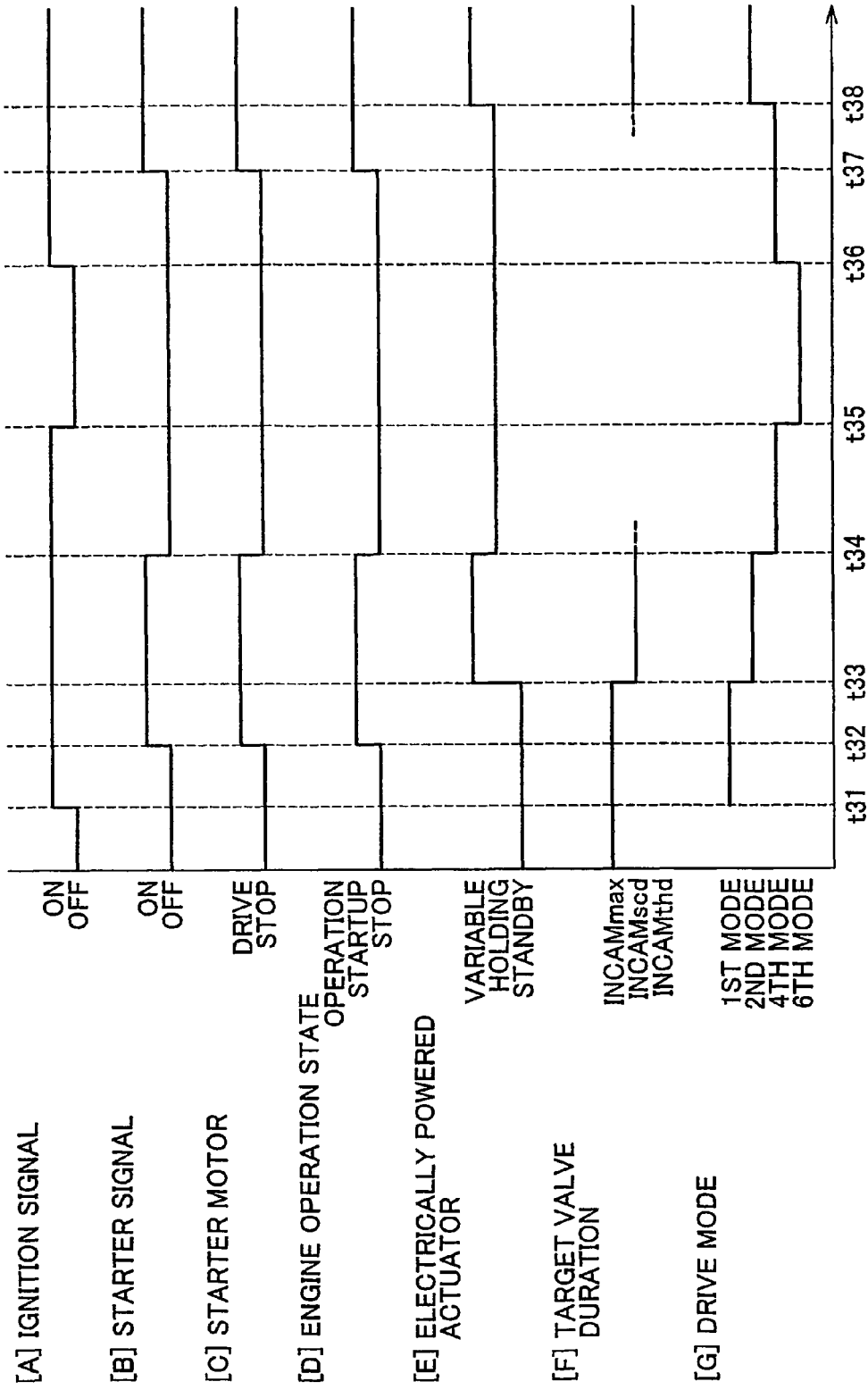

ENGINE CONTROL APPARATUS AND METHOD

This is a 371 national phase application of PCT/IB2006/001927 filed 13 Jul. 2006, claiming priority to Japanese Patent Application No. 2005-207435 filed 15 Jul. 2005, the contents of which are incorporated herein by reference.

BACKGROUND OF THE INVENTION

1. Field of the Invention

The invention relates to a control apparatus and a control apparatus method of an engine which changes the opening-closing characteristic of engine valves through control of the variable valve mechanism.

2. Description of Related Art

In an engine equipped with a variable valve mechanism, the opening-closing characteristic of the intake and exhaust valves of the engine can be changed. Japanese Patent Application Laid-Open Publication No. 2001-263015 describes a variable valve mechanism that changes duration and the maximum lift of engine valves.

In recent years, engines capable of further improvements in fuel economy and drivability (vehicle riding comfort) are desired in order to meet increasingly diversified demands from environmental concerns and from users.

In conjunction with engine control apparatuses equipped with a variable valve mechanism, various proposals intended to improve fuel economy and engine output have been made; however, there has been no appropriate proposal intended to improve vehicle drivability.

SUMMARY OF THE INVENTION

The invention provides an engine control apparatus and an engine control method, each of which is improves vehicle drivability through control of a variable valve mechanism.

A first aspect of the invention is an engine control apparatus that changes the opening-closing characteristic of an engine valve by controlling a variable valve mechanism. The control apparatus comprises a control unit that prohibits changing the opening-closing characteristic of the engine valve when the engine is stopped.

Because it is relatively quiet in the cabin of the vehicle when the engine is stopped, occupants of the vehicle may be able to hear noises associated with the changing of the opening-closing characteristic of the engine valves. Such noises may annoy the driver or other occupants of the vehicle.

As such, the first aspect of the invention is designed so that the opening-closing characteristic is not changed while the engine is stopped. Therefore, it becomes possible to curb the degradation of vehicle drivability caused by the changing of the opening-closing characteristic of the engine valve.

In a second aspect of the invention, the control unit of the engine control apparatus prohibits changing the opening-closing characteristic of the engine valve during the time from when the ignition switch is switched on, while the engine is stopped, to when the starter motor is first driven.

Because it is also relatively quiet in the cabin of the vehicle before the engine is started, occupants of the vehicle may be able to hear noises associated with the changing of the opening-closing characteristic of the engine valves. The driver or other occupants of the vehicle may be annoyed by such noises.

Thus, the second aspect of the invention is designed so that the opening-closing characteristic of the engine valve is not changed during the time between when the ignition switch is switched to the on position while the engine is stopped, and ending when the driving of the starter motor begins. Therefore, it becomes possible to curb the degradation of vehicle drivability caused by the operating noise of the variable valve mechanism prior to the startup of the engine.

In a third aspect of the invention, the control unit of the engine control apparatus prohibits changing the opening-closing characteristic of the engine valve during the time from when occurrence of an engine stall is detected, to when a beginning of a restart of the engine is detected.

While the engine has stopped due to an engine stall, it is relatively quiet in the cabin of the vehicle. Therefore, if the opening-closing characteristic of the engine valves is changed in such a situation, the driver or other occupants may be annoyed by the operating noise of the variable valve mechanism.

As such, the third aspect of the invention is designed so that the opening-closing characteristic of the engine valve is not changed during the time from when occurrence of an engine stall is detected to when the beginning of the restart of the engine is detected. Therefore, it becomes possible to curb the degradation of vehicle drivability caused by the operating noise of the variable valve mechanism prior to the restart of the engine.

A fourth aspect of the invention is based on the third aspect; wherein the control unit, while prohibiting the change in the opening-closing characteristic of the engine valve, maintains the opening-closing characteristic of the engine valve used immediately before occurrence of the engine stall is detected.

If an engine stall occurs while the opening-closing characteristic of the engine valve is being changed, the changing of the opening-closing characteristic is discontinued. Therefore, after the engine is re-started, it is required that the changing of the opening-closing characteristic be promptly resumed.

Considering such a circumstance, the fourth aspect of the invention is designed so that while the engine has stopped due to an engine stall, the opening-closing characteristic of the engine valve used immediately before occurrence of the engine stall is detected, is maintained. Therefore, it becomes possible to promptly resume the changing of the opening-closing characteristic after the engine is re-started.

In a fifth aspect of the invention, when an amount of intake air is adjusted by changing a degree of opening of a throttle valve, the engine control apparatus controls the variable valve mechanism so that the variable valve mechanism is switched to a first drive manner. In addition, and when the amount of intake air is adjusted by changing the opening-closing characteristic of the engine valve, the engine control apparatus controls the variable valve mechanism so that the variable valve mechanism is switched to a second drive manner. In this aspect of the invention, the control unit permits switching from the first drive manner to the second drive manner when it detects that an operation state of the engine is a transitional operation state.

When switching from the first drive manner to the second drive manner, the control object for adjustment of the amount of intake air changes from the throttle valve to the variable valve mechanism. Therefore, the deviation of the actual amount of intake air from the target amount of intake air may temporarily increase. This causes sharp fluctuations in torque, which leads to degraded drivability. However, when the operation state of the engine is a transitional operation state, the vibrations of the engine and the vehicle are large, so that torque fluctuations are unlikely to be perceived by the driver.

Considering such a circumstance, the fifth aspect of the invention is designed so that when the control unit detects that the operation state of the engine is a transitional operation state, it permits the switch from the first drive manner to the second drive manner. Therefore, it becomes possible to curb the degradation of vehicle drivability caused by the switching from the first drive manner to the second drive manner.

In a sixth aspect of the invention, when an amount of intake air is adjusted by changing a degree of opening of a throttle valve, the engine control apparatus controls the variable valve mechanism so that the variable valve mechanism is switched to a first drive manner. In addition, and when the amount of intake air is adjusted by changing the opening-closing characteristic of the engine valve, the engine control apparatus controls the variable valve mechanism so that the variable valve mechanism is switched to a second drive manner. However in the sixth aspect of the invention, the control unit permits switching from the first drive manner to the second drive manner when the control unit detects that a running state of a vehicle is not a low-speed run state.

When switching from the first drive manner to the second drive manner, the control object for adjustment of the amount of intake air changes from the throttle valve to the variable valve mechanism. Therefore, the deviation of the actual amount of intake air from the target amount of intake air may temporarily increase. This causes sharp fluctuations in torque, which leads to degraded drivability of the vehicle. However, when the vehicle speed is relatively high (when the run state of the vehicle is not a low-speed run state), the vibrations of the engine and the vehicle are great, so that torque fluctuations are unlikely to be perceived by the driver.

Considering such a circumstance, the sixth aspect of the invention is designed so that when the control unit detects that the run state of the vehicle is not the low-speed run state, the switching from the first drive manner to the second drive manner is permitted. Therefore, it becomes possible to curb the degradation of vehicle drivability caused by the switching from the first drive manner to the second drive manner.

In a seventh aspect of the invention, when an amount of intake air is adjusted by changing a degree of opening of a throttle valve, the engine control apparatus controls the variable valve mechanism so that the variable valve mechanism is switched to a first drive manner. In addition, and when the amount of intake air is adjusted by changing the opening-closing characteristic of the engine valve, the engine control apparatus controls the variable valve mechanism so that the variable valve mechanism is switched to a second drive manner. However, in the seventh aspect of the invention, the control unit permits switching from the first drive manner to the second drive manner when the control unit detects that an operation state of the engine is a high-load operation state.

When switching from the first drive manner to the second drive manner, the control object for adjustment of the amount of intake air changes from the throttle valve to the variable valve mechanism. Therefore, the deviation of the actual amount of intake air from the target amount of intake air may temporarily increase. This causes sharp fluctuations in torque, which leads to degraded vehicle drivability. In addition, the degree of the deviation of the actual amount of intake air from the target amount of intake air tends to increase with increasing degree of the change in the opening-closing characteristic that occurs at the time of switching between the drive manners.

Incidentally, the difference between the opening-closing characteristic set when the operation state of the engine is the high-load operation state and the opening-closing characteristic set for the first drive manner is smaller than the difference between the opening-closing characteristic set when the operation state of the engine is other than the high-load operation state and the opening-closing characteristic set for the first drive manner.

Considering such a circumstance, the seventh aspect of the invention is designed so that when the control unit detects that the operation state of the engine is the high-load operation state, the switching from the first drive manner to the second drive manner is permitted. Therefore, the degree of the change in the opening-closing characteristic at the time of switching from the first drive manner to the second drive manner decreases. It thus becomes possible to curb the degradation of vehicle drivability.

In an eighth aspect of the invention, when an amount of intake air is adjusted by changing a degree of opening of a throttle valve, the engine control apparatus controls the variable valve mechanism so that the variable valve mechanism is switched to a first drive manner. In addition, and when the amount of intake air is adjusted by changing the opening-closing characteristic of the engine valve, the engine control apparatus controls the variable valve mechanism so that the variable valve mechanism is switched to a second drive manner. However, in the eighth aspect of the invention, the control unit permits switching from the first drive manner to the second drive manner when the controller detects that an operation state of the engine is not a low-load operation state.

When switching from the first drive manner to the second drive manner, there also is a risk of an engine stall resulting from an increased deviation of the actual amount of intake air from the target amount of intake air, that is, the actual amount of intake air becoming far less than the target amount of intake air. However, when the operation state of the engine is not the low-load operation state, the occurrence of an engine stall can be avoided even if the amount of intake air temporarily becomes small.

Considering such a circumstance, the eighth aspect of the invention is designed so that when the control unit detects that the operation state of the engine is not the low-load operation state, the switching from the first drive manner to the second drive manner is permitted. Therefore, it becomes possible to curb the occurrence of an engine stall caused by the switching from the first drive manner to the second drive manner.

In a ninth aspect of the invention, the variable valve mechanism changes the opening-closing characteristic of the intake valve as an opening-closing characteristic of an engine valve. In particular, the control unit of the engine control apparatus changes the opening-closing characteristic of the intake valve toward an initial opening-closing characteristic, which is defined to be a largest or nearly largest open valve duration of the intake valve when the ignition switch is switched off.

In this vehicle, the changing of the opening-closing characteristic of the intake valve may be impossible when the engine is started, due to occurrence of an abnormality in the variable valve mechanism during the stop of the engine. If in such a case, the opening-closing characteristic of the intake valve has been set at an opening-closing characteristic that involves a minimum open valve duration, or at an opening-closing characteristic close thereto, it is conceivable that the amount of intake air at the time of starting up the engine could be insufficient, leading to a startup failure.

Considering such a circumstance, the ninth aspect of the invention is designed so that when a drive of the vehicle ends, the opening-closing characteristic of the intake valve changes toward the initial opening-closing characteristic in preparation for when the engine is next started. Therefore, insufficient supply of air when starting the engine is curbed even if the variable valve mechanism has an abnormality. It thus becomes possible to improve the startability of the engine.

The tenth aspect of the invention is based on the ninth aspect. However, according to the tenth aspect, when the control unit detects that the vehicle speed is greater than or equal to a threshold value when changing the opening-closing characteristic of the intake valve toward the initial opening-closing characteristic, the control unit suspends the changing of the opening-closing characteristic of the intake valve until the vehicle speed becomes less than the threshold value.

If the opening-closing characteristic of the intake valve is changed toward the initial opening-closing characteristic while the engine rotation speed is excessively high, fuel remaining in the combustion chamber may burn due to the increased amount of intake air. In such a case, the engine speed increases despite the driver's request to stop the vehicle, which may cause discomfort to the driver.

Considering such a circumstance, the tenth aspect of the invention is designed so that the changing of the opening-closing characteristic of the intake valve is suspended until the vehicle speed falls below the threshold value. Therefore, it becomes possible to avoid increasing the engine speed occurring despite a driver's request for a stop of the vehicle.

The eleventh aspect of the invention is based on the ninth aspect, except that if the control unit detects that the engine speed is greater than or equal to a threshold value when changing the opening-closing characteristic of the intake valve is changed toward the initial opening-closing characteristic, the control unit suspends the changing of the opening-closing characteristic of the intake valve until the engine speed becomes less than the criterion value.

If the opening-closing characteristic of the intake valve changes toward the initial opening-closing characteristic while the engine speed is excessively high, fuel remaining in the combustion chamber may burn due to the increased amount of intake air. In such a case, the engine speed rises despite the driver's request for a stop of the vehicle, which may cause discomfort to the driver.

Considering such a circumstance, the eleventh aspect of the invention is designed so that the changing of the opening-closing characteristic of the intake valve is suspended until the engine speed becomes less than the threshold value. Therefore, it becomes possible to avoid increasing the engine speed occurring despite a driver's request for a stop of the vehicle.

A twelfth aspect of the invention is the control apparatus of an engine based on the ninth aspect, wherein if the control unit detects that the engine has not been started by the time the ignition switch is switched to the off position, the control unit prohibits the changing of the opening-closing characteristic of the intake valve toward the initial opening-closing characteristic.

Generally, the ignition is intentionally switched off by the driver when the driver is finished driving the vehicle. However, in some cases, the ignition switch may be switched to the off position while a driver does not intend to finish driving. In such a case, the startup of the engine is performed in a relatively short time, and therefore the risk of an abnormality occurring in the variable valve mechanism before the engine is restarted up is very small. That is, even if the opening-closing characteristic is not changed to the initial opening-closing characteristic on the basis of the ignition switch being switched to the off position, it is considered that there is substantially no fear of a startup failure being caused by insufficient air supply.

Considering such a circumstance, the twelfth aspect of the invention is designed so that if the control unit detects that the engine has not started by the time of the ignition switch is switched to the off position, the changing of the opening-closing characteristic of the intake valve is prohibited. Therefore, it becomes possible to reduce unnecessary actions of the variable valve mechanism.

The thirteenth aspect of the invention is based on the engine control apparatus according to twelfth aspect, wherein the control unit, prohibits the opening-closing characteristic of the intake valve, and maintains the opening-closing characteristic of the intake valve that was present immediately before the ignition is switched off.

If the engine has not been in the state of completion of startup up to the moment of the ignition switch being switched to the off position, it is calculated that the ignition switch was switched to the off position before the driver is finished driving. That is, it is calculated that the restart of the engine will be begun in a relatively short time.

Considering such a circumstance, the thirteen aspect of the invention is designed so that while the changing of the opening-closing characteristic of the intake valve is prohibited, the opening-closing characteristic of the intake valve present immediately before detection of the switching of the ignition switch to the off position is maintained. Therefore, it becomes possible to promptly perform the changing of the opening-closing characteristic of the intake valve after the engine is started up.

The fourteenth aspect of the invention provides an engine control apparatus based on any one of the ninth to thirteenth aspects, wherein the control unit discontinues the changing of the opening-closing characteristic of the intake valve if it is calculated or detected that an engine speed falls below a reference value.

If the opening-closing characteristic of the intake valve is changed when the engine speed is very low (equal or close to "0"), the variable valve mechanism may be damaged by an excessively increased load on the variable valve mechanism.

Considering such a circumstance, the fourteenth aspect of the invention is designed so that if it is calculated that the engine rotation speed is less than the reference value, or if it is detected that the engine rotation speed is less than the reference value, the changing of the opening-closing characteristic of the intake valve is discontinued. Therefore, it becomes possible to curb the damage of the variable valve mechanism caused by the changing of the opening-closing characteristic.

In a fifteenth aspect of the invention, an engine control apparatus according to any one of the first to fourteenth aspects, the variable valve mechanism comprises a control shaft disposed in a cylinder head so as to be movable in a direction of an axis, a valve lift mechanism mounted around the control shaft so as to operate the engine valve, and an actuator that moves the control shaft, and wherein the valve lift mechanism comprises a slider gear movable in cooperation with the control shaft, an input gear mounted on the slider gear so as to operate through a cam of a camshaft, and an output gear mounted on the slider gear so as to operate the engine valve, and wherein the actuator changes an open valve duration of the engine valve by relatively rotating the input gear and the output gear through a movement of the control shaft.

According to a sixteenth aspect of the invention, the engine control apparatus is based on the fifteenth aspect; however, the actuator is driven via electric power.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 34 is a timing chart indicating a manner of controlling the variable valve mechanism by the electronic control apparatus of the embodiment.

FIG. 35 is a timing chart indicating another manner of controlling the variable valve mechanism by the electronic control apparatus of the embodiment.

FIG. 36 is a timing chart indicating still another manner of controlling the variable valve mechanism by the electronic control apparatus of the embodiment.

DETAILED DESCRIPTION OF THE INVENTION

Figure 1:
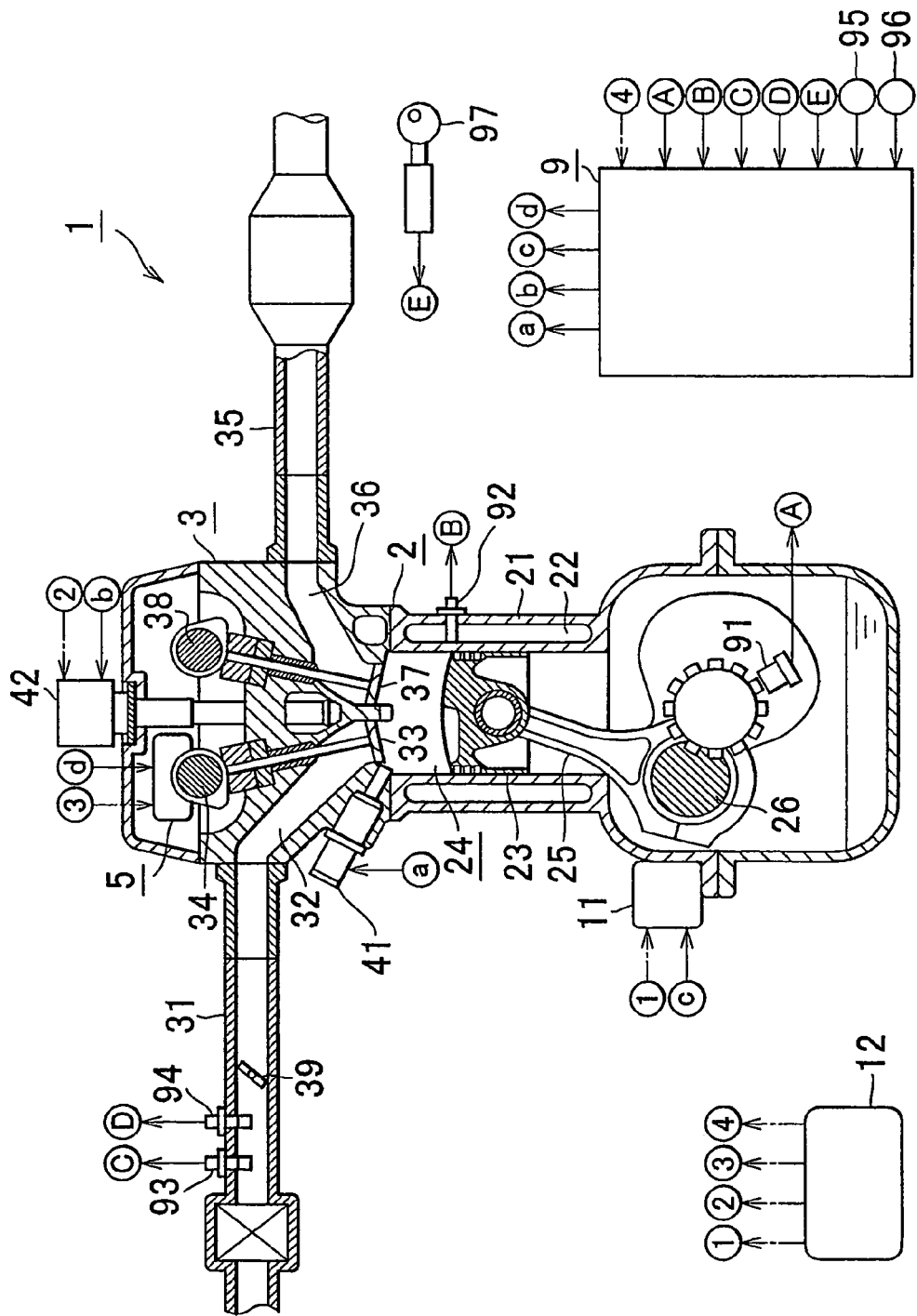
FIG. 1 is a diagram showing an overall construction of an engine equipped with a variable valve mechanism in conjunction with an embodiment in which a control apparatus of an engine in accordance with the invention is embodied.
Figure 2:
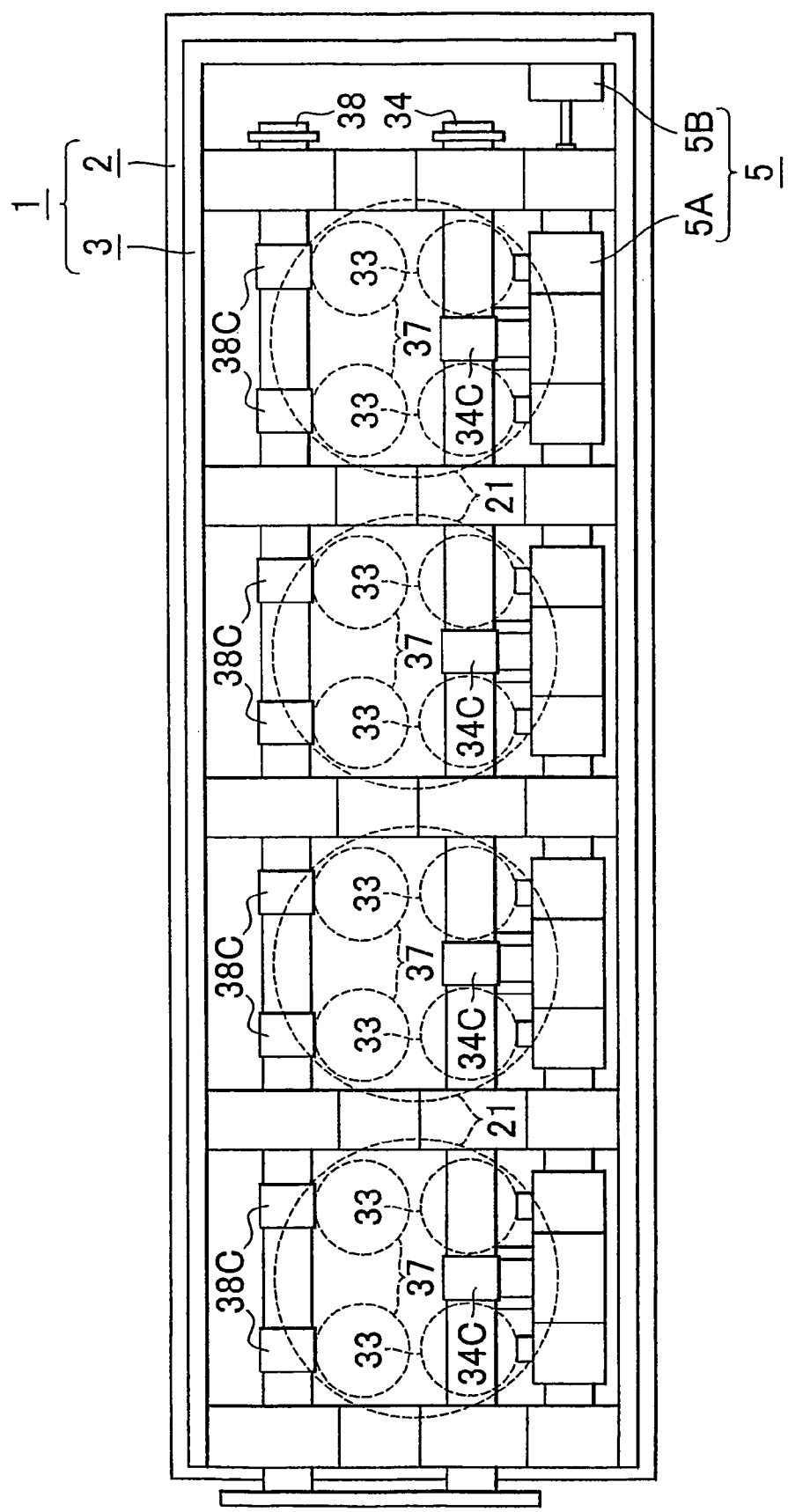
FIG. 2 is a plan view showing a planar structure of a cylinder head of the engine of the embodiment.

An embodiment of the invention will be described with reference to FIGS. 1 to 36. In this embodiment, the invention is embodied as a variable valve mechanism that changes the opening-closing characteristic (the duration and the maximum valve lift) of an intake valve.

<Structure of Engine>

The engine 1 is substantially made up of a cylinder block 2 and a cylinder head 3. The cylinder block 2 has a plurality of cylinders 21. A water jacket 22 is formed around the cylinders 21.

A piston 23 is disposed in each cylinder 21. Furthermore, a combustion chamber 24 is defined, that is, surrounded, by an inner peripheral surface of the cylinder 21, a top surface of the piston 23, and the cylinder head 3. The piston 23 is connected to a crankshaft 26 via a connecting rod 25.

The cylinder head 3 is provided with an intake port 32 connecting the combustion chamber 24 and an intake pipe 31 in communication, and an exhaust port 36 connecting the combustion chamber 24 and an exhaust pipe 35 in communication.

The intake port 32 is opened and closed via an intake valve 33. The intake valve 33 is opened via a cam 34C of an intake camshaft 34, and is closed via a valve spring.

The exhaust port 36 is opened and closed via an exhaust valve 37. The exhaust valve 37 is opened via a cam 38C of an exhaust camshaft 38, and is closed via a valve spring.

A throttle valve 39 changes the area in the intake pipe 31 through which air can pass. An injector 41 injects fuel into the combustion chamber 24.

An ignition plug 42 ignites a mixture gas within the combustion chamber 24. A variable valve mechanism 5 changes the open valve duration (valve duration INCAM) of the intake valve 33.

A starter motor 11 rotates the crankshaft 26 at the time of startup of the engine 1. A battery 12 supplies electric power to the starter motor 11, the ignition plug 42, the variable valve mechanism 5, an electronic control apparatus 9, etc. In FIG. 1, the supply paths of electric power from the battery 12 to the aforementioned devices and the like are indicated by one-dot chain lines. Incidentally, the battery 12 is provided in a vehicle in which the engine 1 is mounted. In the description below, the "vehicle" refers to a vehicle in which the engine 1 is mounted.

The engine 1 is centrally controlled via the electronic control apparatus 9. The electronic control apparatus 9 is substantially made up of a central processing unit that executes computational processing related to the engine control, a read-only memory in which programs and maps necessary for the engine control are stored beforehand, a random access memory for temporarily storing results of computation of the central processing unit and the like, an input port for inputting external signals, an output port for outputting signals to external devices, etc.

The input port of the electronic control apparatus 9 is connected to a rotation speed sensor 91, a cooling water temperature sensor 92, an intake temperature sensor 93, an air flow meter 94, an accelerator position sensor 95, a vehicle speed sensor 96, an ignition switch 97, etc.

The rotation speed sensor 91 is provided near the crankshaft 26, and outputs an electric signal corresponding to the rotation speed of the crankshaft 26 (engine rotation speed NE). The output signal of the rotation speed sensor 91 is input to the electronic control apparatus 9, and then is used as an engine rotation speed measured value NEM for various controls.

The cooling water temperature sensor 92 is provided around the cylinders 21, and outputs an electric signal corresponding to the temperature of cooling water within the water jacket 22 (cooling water temperature THW). The output signal of the cooling water temperature sensor 92 is input to the electronic control apparatus 9, and then is used as a cooling water temperature measured value THWM for various controls.

The intake temperature sensor 93 is provided in an intake passageway downstream of an air cleaner, and outputs an electric signal corresponding to the temperature of air in the intake pipe 31 (intake temperature THA). The output signal of the intake temperature sensor 93 is input to the electronic control apparatus 9, and then is used as an intake temperature measured value THAM for various controls.

The air flow meter 94 is provided in the intake passageway downstream of the air cleaner, and outputs an electric signal corresponding to the amount of flow of air in the intake pipe 31 (intake flow amount GA). The output signal of the air flow meter 94 is input to the electronic control apparatus 9, and then is used as an intake flow amount measured value GAM for various controls. Incidentally, the intake flow amount GA corresponds to the amount of air supplied into the combustion chamber 24 (amount of intake air).

The accelerator position sensor 95 is provided near an accelerator pedal of the vehicle, and outputs an electric signal corresponding to the amount of depression of the accelerator pedal (accelerator operation amount ACP). The output signal of the accelerator position sensor 95 is input to the electronic control apparatus 9, and then is used as an accelerator operation amount measured value ACPM for various controls.

The vehicle speed sensor 96 is provided near a tire wheel of the vehicle, and outputs an electric signal corresponding to the rotation speed of the tire wheel (vehicle speed SPD). The output signal of the vehicle speed sensor 96 is input to the electronic control apparatus 9, and then is used as a vehicle speed measured value SPDM for various controls.

The ignition switch 97 is provided at the side of a driver's seat of the vehicle, and is switched to one of the "OFF", "ACC", "ON" and "START" positions. When the ignition switch 97 is in the "ON" position, an ignition signal IG is input to the electronic control apparatus 9. When the ignition switch 97 is in the "START" position, a starter signal STA is input, together with the ignition signal IQ to the electronic control apparatus 9. Incidentally, in this embodiment, the state where the ignition switch 97 is in the "ACC" position is assumed to be the same as the state where the ignition switch 97 is in the "OFF" position.

The output port of the electronic control apparatus 9 is connected to drive circuits of the injector 41, the ignition plug 42, the starter motor 11, the variable valve mechanism 5, etc.

On the basis of the engine operation state grasped from the output signals of the various sensors and the like, the electronic control apparatus 9 performs various controls, such as a throttle control of adjusting the degree of opening of the throttle valve 39 (throttle opening degree THR), a fuel injection control of adjusting the amount of fuel injected from the injector 41, an ignition timing control of adjusting the ignition timing of the ignition plug 42, a variable valve mechanism control of adjusting the valve duration INCAM, etc. Incidentally, the control unit includes the electronic control apparatus 9.

<Manner of Changing Valve Duration>

Figure 3:
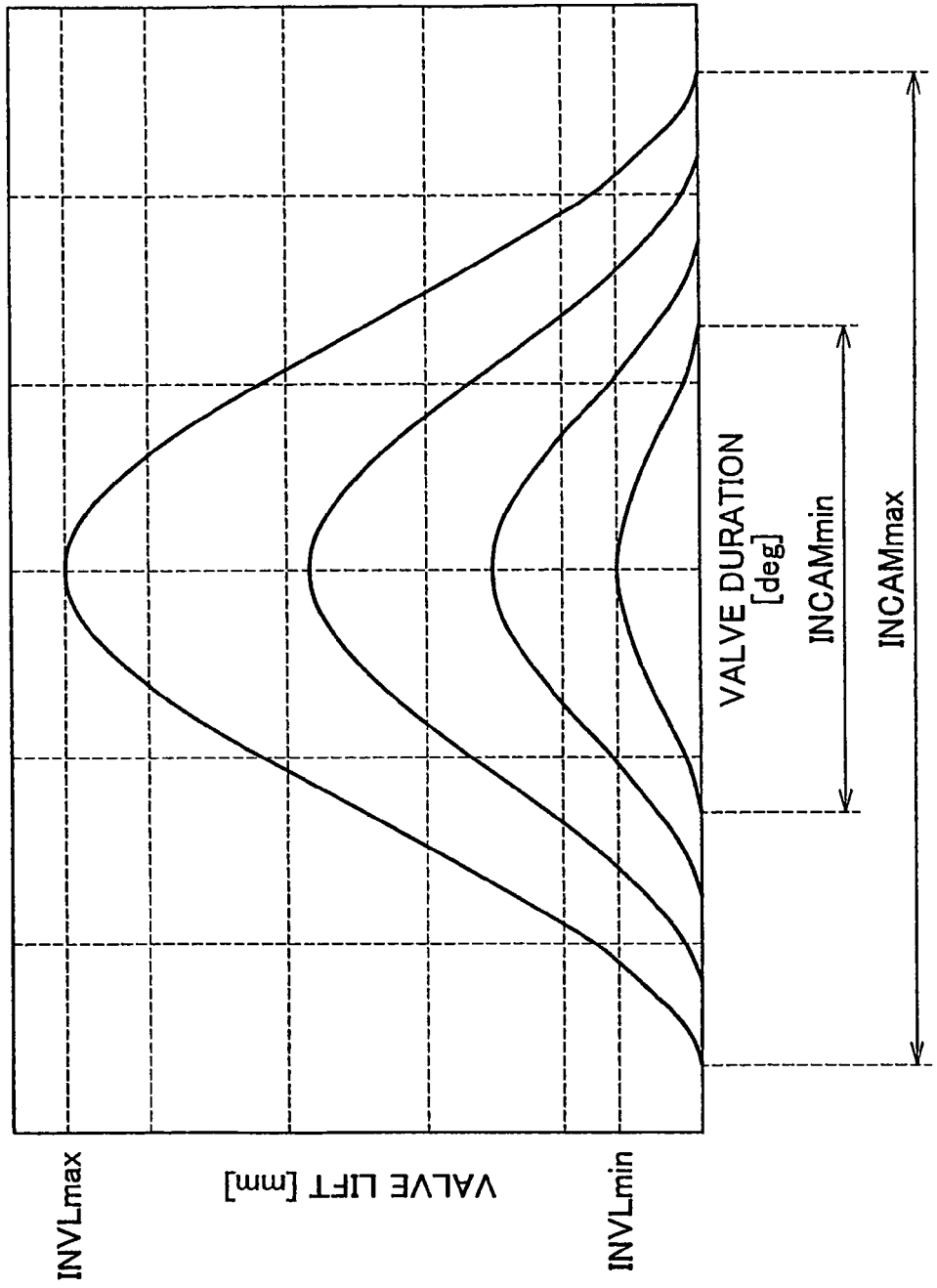
FIG. 3 is a graph indicating fashions of changes in the valve duration and in the maximum valve lift of an intake valve operated by a variable valve mechanism in the embodiment.
Figure 4:
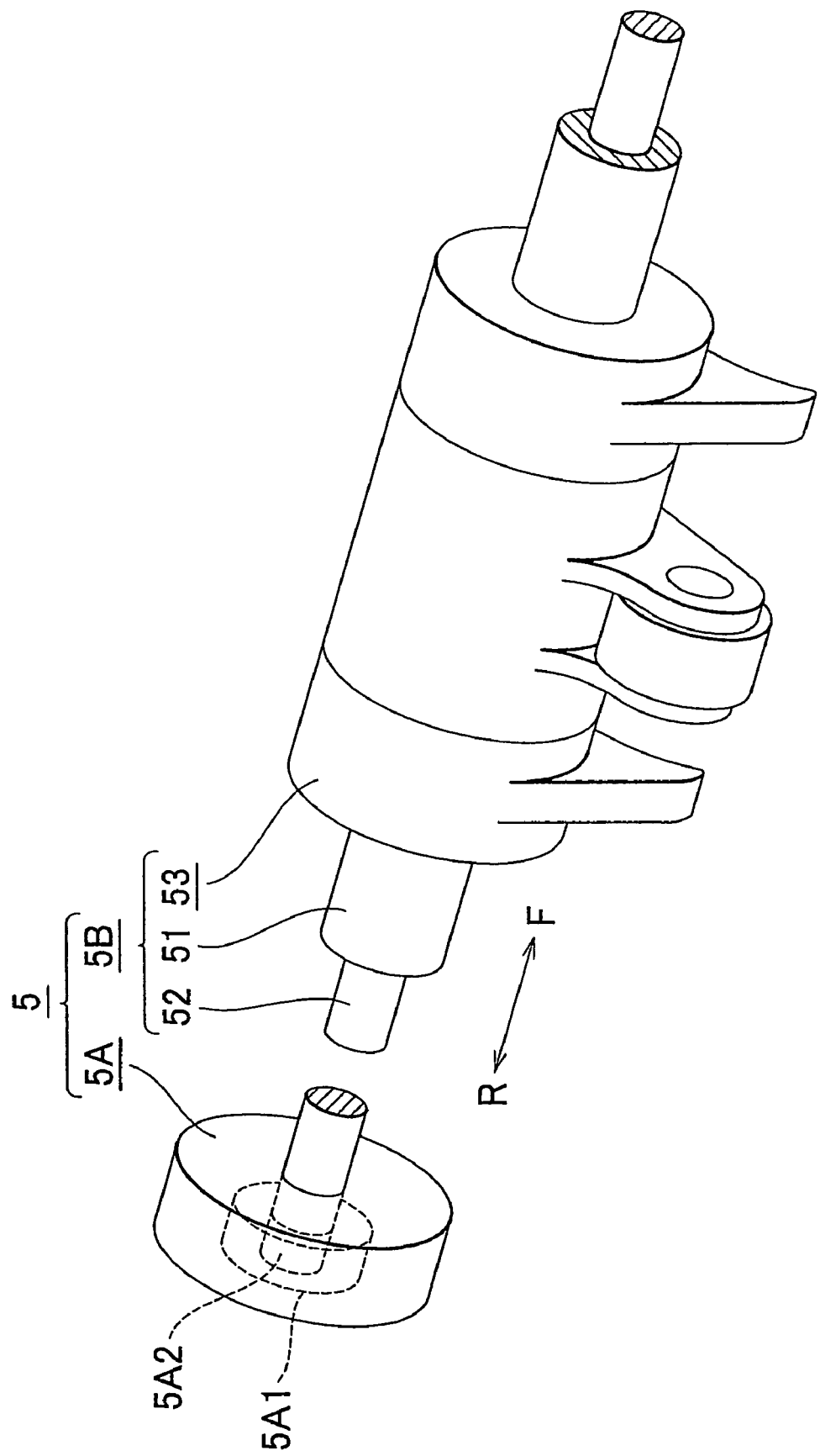
FIG. 4 is a perspective view of the electric actuator and the valve mechanism main body in the variable valve mechanism in the embodiment.
Figure 5:
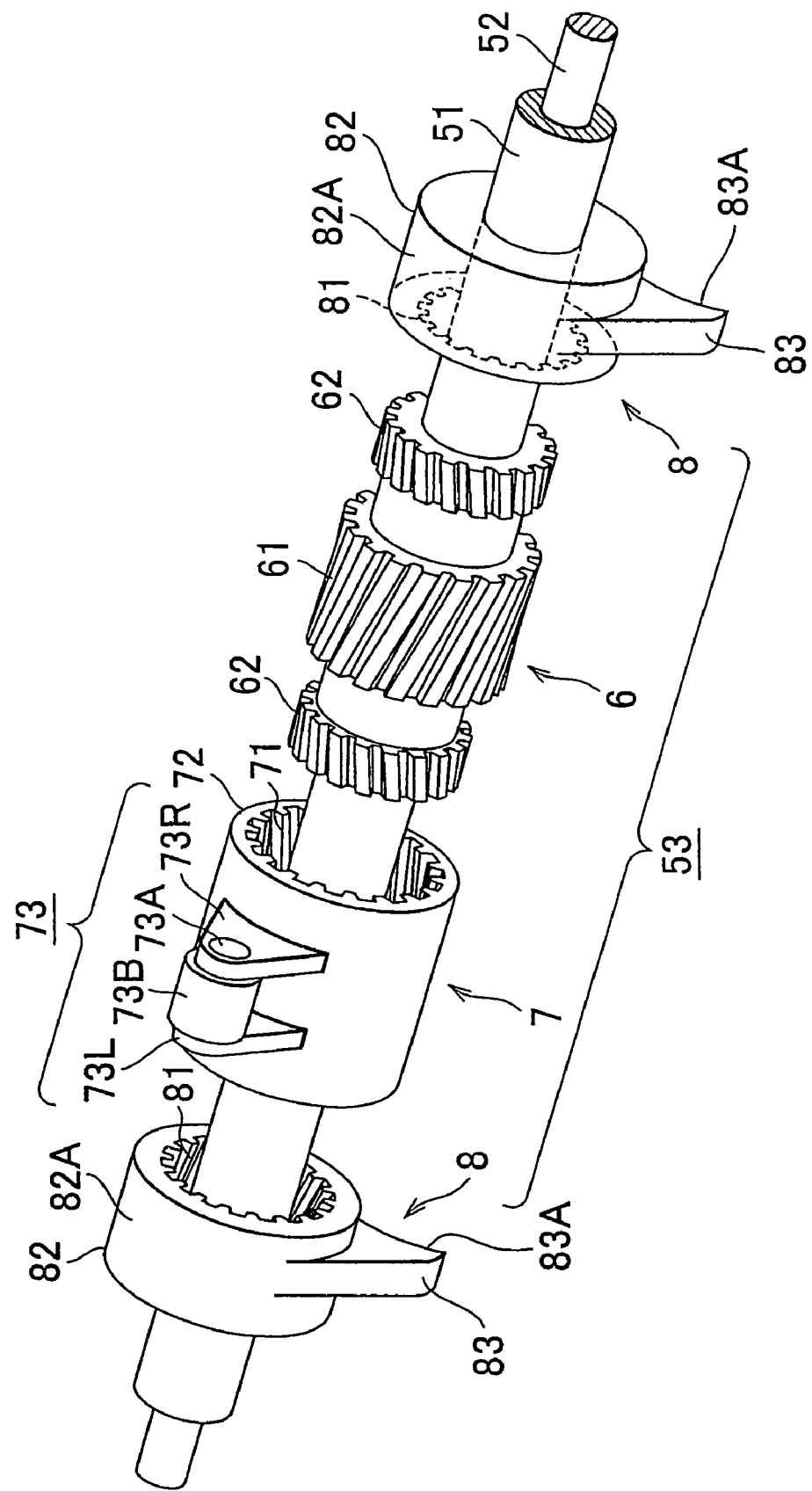
FIG. 5 is an exploded perspective view of a valve mechanism main body in the variable valve mechanism in the embodiment.
Figure 6:
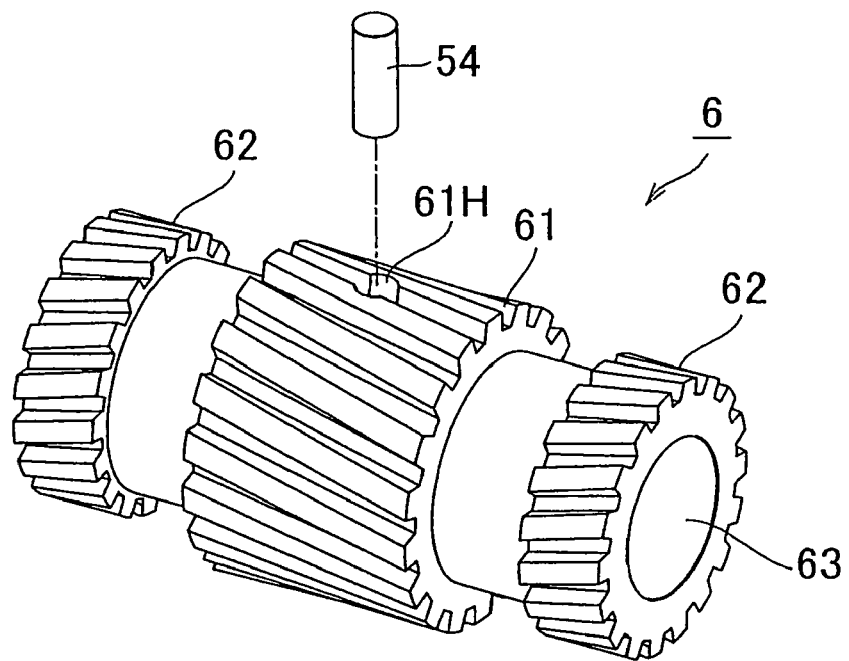
FIG. 6 is a perspective view of a slider gear in the variable valve mechanism in the embodiment.
Figure 7:
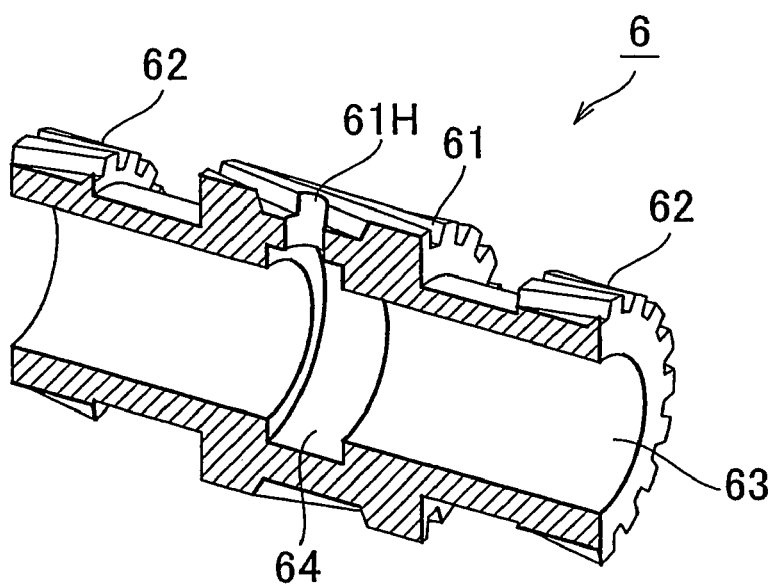
FIG. 7 is a sectional view of a slider gear (input spline and output splines).

With reference to FIG. 3, the manner of changing the valve duration INCAM via the variable valve mechanism 5 will be described.

The variable valve mechanism 5 changes the valve duration INCAM continuously between the largest valve duration (maximum valve duration INCAMmax) and the smallest valve duration (minimum valve duration INCAMmin). Synchronously with changes in the valve duration INCAM, the maximum valve lift INVL of the intake valve 33 (amount of movement of the intake valve 33 from an extreme position on the closed valve side to an extreme position on the open valve side) changes.

The maximum valve lift INVL reaches a largest maximum valve lift (upper-limit maximum valve lift INVLmax) when the valve duration INCAM is a maximum valve duration INCAMmax. Furthermore, the maximum valve lift INVL reaches a smallest maximum valve lift (lower-limit maximum valve lift INVLmin) when the valve duration INCAM is a minimum valve duration INCAMmin. That is, the maximum valve lift INVL changes continuously between the upper-limit maximum valve lift INVLmax and the lower-limit maximum valve lift INVLmin, synchronously with changes in the valve duration INCAM.

<Structure of Variable Valve Mechanism>

With reference to FIGS. 4 to 11, a detailed structure of the variable valve mechanism 5 will be described. It is to be noted that the variable valve mechanism 5 has substantially identical structures at sites corresponding to the individual cylinders 21, and FIGS. 4, 5, 8, 9 and 10 show only the structure provided at a site corresponding to one cylinder 21.

[1] Overall Structure of Variable Valve Mechanism

The variable valve mechanism 5 is substantially made up of an electric actuator 5A and a valve mechanism main body 5B.

The valve mechanism main body 5B is substantially made up of a rocker shaft 51, a control shaft 52, and a valve lift mechanism 53. The valve lift mechanism 53 is provided separately for each cylinder 21.

The rocker shaft 51 is disposed in the cylinder head 3, extending in the directions of arrangement of the cylinders (the directions of arrows F, R). Furthermore, the rocker shaft 51 is secured so as to be neither rotatable nor movable in the directions of an axis. Incidentally, the arrow F indicates the direction away from the electric actuator 5A, and the arrow R indicates the direction toward the electric actuator 5A.

Within the rocker shaft 51, the control shaft 52 is disposed so as to be movable in the directions of the axis. On the rocker shaft 51, the valve lift mechanisms 53 are provided at positions corresponding to the individual cylinders 21. That is, all the valve lift mechanisms 53 are supported by the single common rocker shaft 51.

The control shaft 52 is connected to the electric actuator 5A. The electric actuator 5A is substantially made up of an electric motor 5A1 and a motion conversion mechanism 5A2. The electric motor 5A1 runs on electric power supplied from the battery 12. The motion conversion mechanism 5A2 converts the rotary motion of the electric motor 5A1 into linear motion, and transfers it to the control shaft 52. That is, in the variable valve mechanism 5, the control shaft 52 is actuated by the electric motor 5A1 of the electric actuator 5A.

The electronic control apparatus 9 changes the valve duration INCAM and the maximum valve lift INVL of the intake valve 33 by displacing the control shaft 52 in the directions of the axis through control of the electric actuator 5A. As the control shaft 52 is displaced in the direction of the arrow F, the valve duration INCAM and the maximum valve lift INVL of the intake valve 33 change in the increasing direction. Conversely, as the control shaft 52 is displaced in the direction of the arrow R, the valve duration INCAM and the maximum valve lift INVL of the intake valve 33 change in the decreasing direction. Incidentally, the relationship between the direction of displacement of the control shaft 52 and the direction of change of the valve duration INCAM and the maximum valve lift INVL may be set opposite to the aforementioned relationship.

[2] Structure of Valve Mechanism Main Body

The valve lift mechanism 53 is substantially made up of the slider gear 6, an input gear 7, and output gears 8.

The slider gear 6 is provided on the rocker shaft 51. Furthermore, the slider gear 6 is movable on the rocker shaft 51 in the directions of the axis in association with the control shaft 52.

The slider gear 6, the input gear 7 and the output gears 8 are interconnected by helical splines. Specifically, the input gear 7 and the output gears 8 are fitted to the slider gear 6 in such a fashion that the side surfaces of the gears 7, 8 which face each other are in contact with each other.

[3] Structure of Slider Gear

The slider gear 6 has a slider gear input spline 61 and slider gear output splines 62.

The slider gear input spline 61 is provided at a center of the slider gear 6 in the directions of the axis. Furthermore, the slider gear input spline 61 is formed so as to mesh with a helical spline of the input gear 7 (input gear spline 71).

The slider gear output splines 62 are provided on two opposite sides of the slider gear input spline 61. Furthermore, the slider gear output splines 62 are formed so as to mesh with helical splines of the output gears 8 (output gear splines 81), respectively.

The slider gear input spline 61 and each slider gear output spline 62 are formed so that their spline tilt directions are opposite. Furthermore, the outside diameter of each slider gear output spline 62 is set smaller than the diameter of the groove portions of the slider gear input spline 61.

A shaft insert hole 63 extending in the directions of the axis is formed within the slider gear 6. Furthermore, inside the slider gear input spline 61, a pin groove 64 is formed extending in the circumferential direction.

The slider gear 6 has a pin insert hole 61H that allows a connect pin 54 to be inserted into an internal space. The pin insert hole 61H is formed as a through hole that penetrates the slider gear input spline 61 from its outer peripheral surface to the pin groove 64. The connect pin 54 is attached to the slider gear 6 for the purpose of associated movements of the slider gear 6 and the control shaft 52.

[4] Structure of Input Gear

The input gear 7 is substantially made up of an input gear housing 72 that is a main body of the input gear 7. Inside the input gear housing 72, a space is formed extending in the directions of the axis of the rocker shaft 51. An inner periphery of the input gear housing 72 has a helical spline (input gear spline 71) that meshes with the slider gear input spline 61 of the slider gear 6.

An outer peripheral surface of the input gear housing 72 is provided with an input arm 73 that contacts the cam 34C of the intake camshaft 34. The input arm 73 is substantially made up of a pair of support arms 73L, 73R, a shaft 73A, and a roller 73B The aforementioned component elements of the input arm 73 are constructed as follows:

The support arms 73L, 73R are protruded in a radial direction from the outer periphery of the input gear housing 72. In addition, the support arms 73L, 73R are formed so as to be parallel to each other.

The shaft 73A is provided between the support arm 73L and the support arm 73R so as to be parallel to the axis of the rocker shaft 51.

The roller 73B is fitted to the shaft 73A so as to be rotatable.

[5] Structure of Output Gear

Each output gear 8 is substantially made up of an output gear housing 82 that is a main body thereof.

Inside the output gear housing 82, a space is formed extending in the directions of the axis of the rocker shaft 51. An inner periphery of the output gear housing 82 has a helical spline (output gear spline 81) that meshes with the slider gear output spline 62 of the slider gear 6. Incidentally, the spline tilt direction of the output gear spline 81 is opposite to the spline tilt direction of the input gear spline 71.

The outer periphery of a circular base portion (base portion 82A) of the output gear housing 82 has an output arm 83 that is protruded outward in a radial direction. A side of the output arm 83 has a cam surface 83A that is curved in a concave manner.

[6] Structures of Rocker Shaft and Control Shaft

Figure 8:
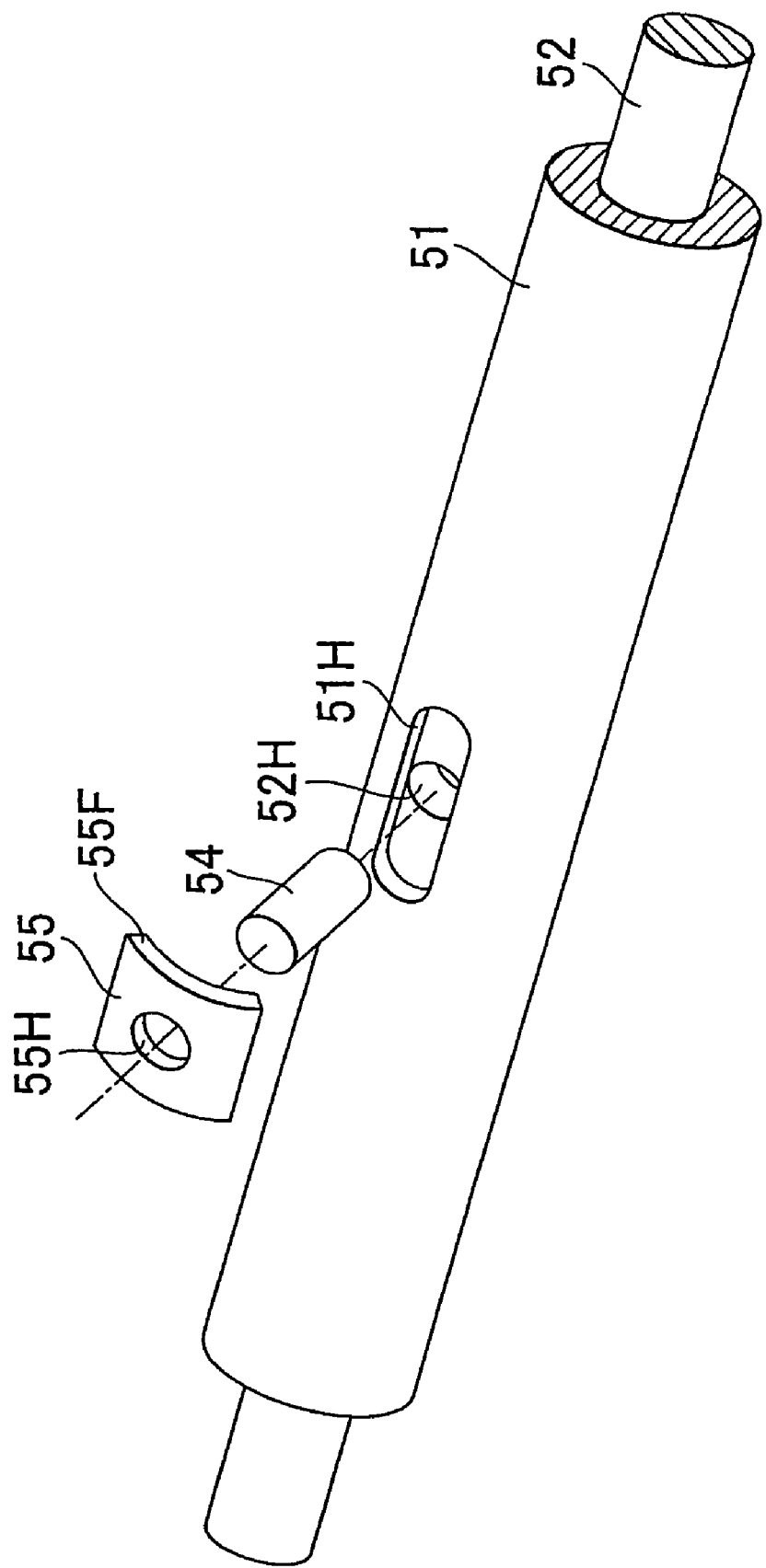
FIG. 8 is a perspective view of a control shaft and its surrounding members in the variable valve mechanism in the embodiment.

FIG. 8 shows structures of the rocker shaft 51 and the control shaft 52 in a perspective view.

The control shaft 52 has a pin insert hole 52H that is formed at each site where a valve lift mechanism 53 is disposed. That is, in this embodiment, the control shaft 52 has four pin insert holes 52H.

A connect pin 54 is fitted into each pin insert hole 52H, for the purpose of associated movements of the control shaft 52 and the slider gear 6 in the directions of the axis.

The rocker shaft 51 has pin slide holes 51H at sites that correspond to the pin insert holes 52H of the control shaft 52. Each pin slide hole 51H is formed as an elongated hole that extends in the directions of the axis so as to permit the connect pin 54 to be moved relative to the rocker shaft 51.

A bush 55 is attached to the connect pin 54.

The bush 55 is formed so that surfaces thereof (support end surfaces 55F) generally orthogonal to the directions of the axis of the control shaft 52 come into surface contact with the pin groove 64 of the slider gear 6. Furthermore, the bush 55 has a pin insert hole 55H into which the connect pin 54 is fitted.

The length of the bush 55 in the directions of the axis of the control shaft 52 is set substantially equal to the width of the pin groove 64 of the slider gear 6. Therefore, the bush 55 fitted to the connect pin 54 fixes the relative positions of the control shaft 52 and the slider gear 6 in the directions of the axis.

[7] Manner of Assembling Valve Mechanism Main Body

Figure 9:
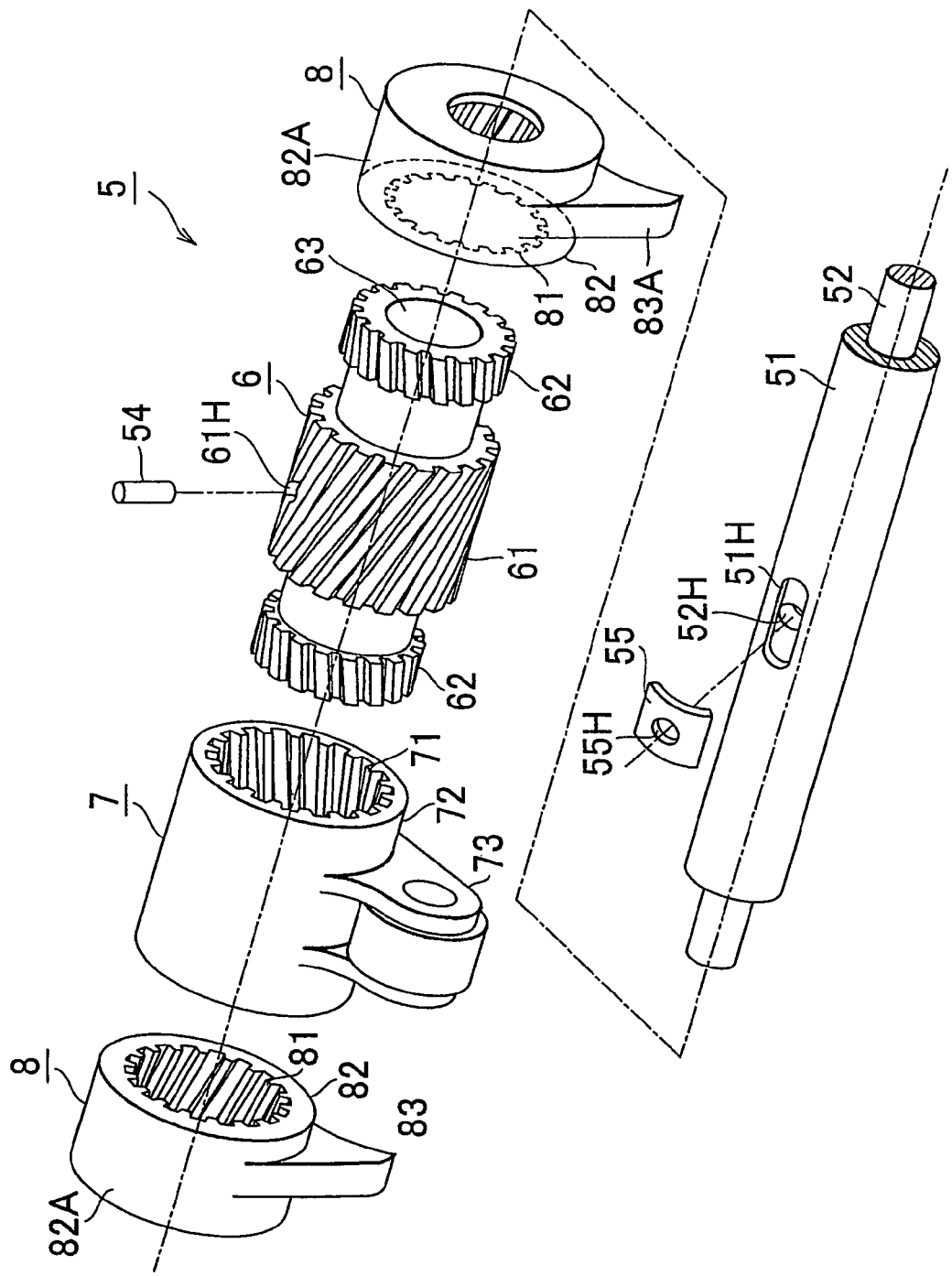
FIG. 9 is an exploded perspective view of the valve mechanism main body in the variable valve mechanism in the embodiment.

FIG. 9 shows a structure of the valve mechanism main body 5B in an exploded perspective view.

The various members of the valve mechanism main body 5B can be assembled in the following procedure:

The control shaft 52 is inserted into the rocker shaft 51.
The bush 55 is disposed in the pin groove 64 of the slider gear 6.
The rocker shaft 51 is inserted into the slider gear 6.
The connect pin 54 is planted to the control shaft 52 by inserting it through the slider gear 6, the bush 55, and the rocker shaft 51.

[8] Internal Structure of Valve Lift Mechanism

Figure 10:
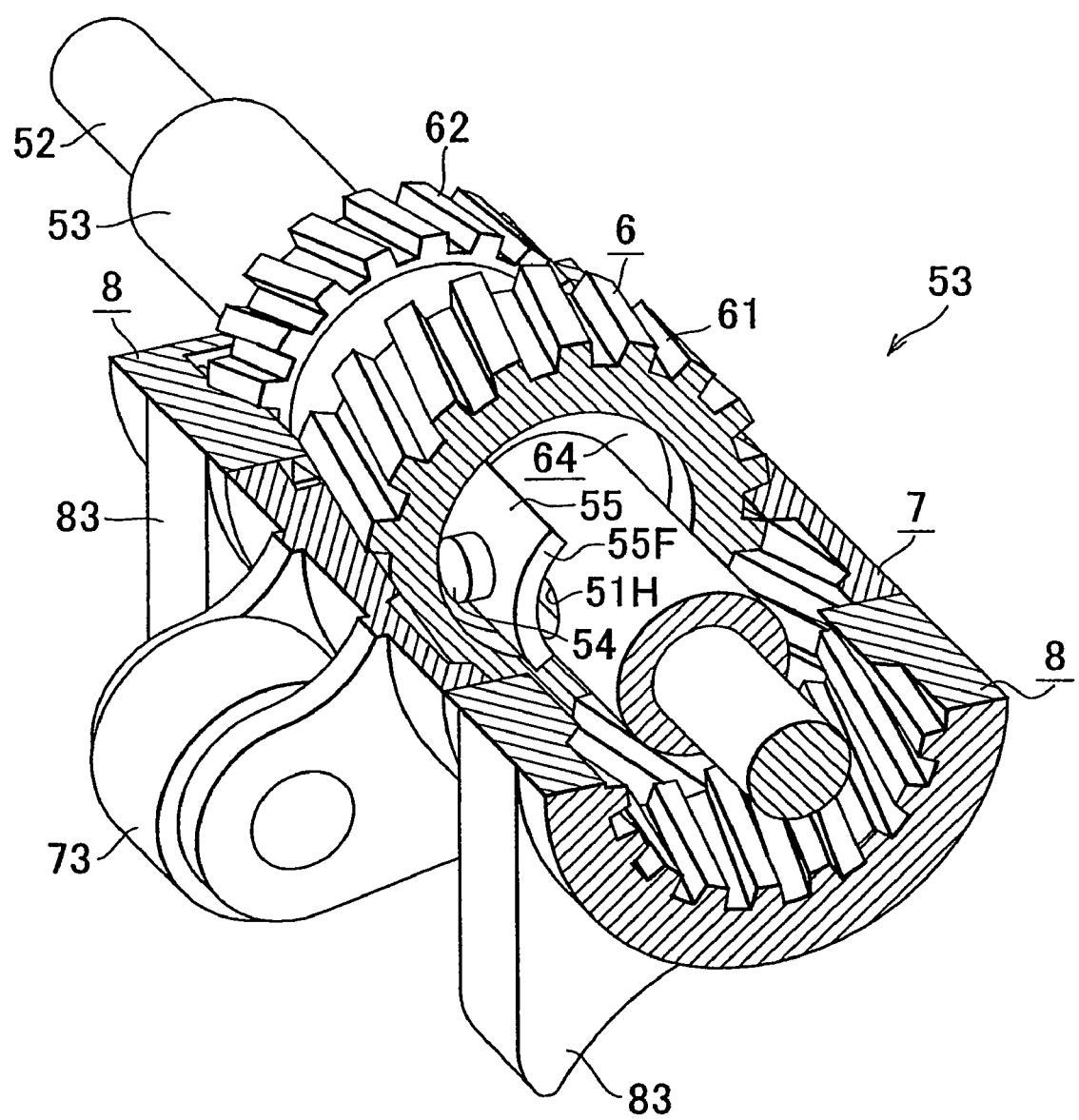
FIG. 10 is a cutaway perspective view showing an internal structure of the valve lift mechanism in the variable valve mechanism in the embodiment.

FIG. 10 shows an internal structure of the valve lift mechanism 53. The connect pin 54 is disposed relative to the pin groove 64 in such a fashion that a distal end of the connect pin 54 is not in contact with the inner peripheral surface of the slider gear 6. The bush 55 is disposed in the pin groove 64 in such a fashion that the support end surfaces 55F of the bush 55 are in surface contact with the slider gear 6.

Therefore, as the control shaft 52 is moved in a direction of the axis, the slider gear 6 moves by the same amount of movement and in the same direction of the axis as the control shaft 2. That is, the slider gear 6 moves in the directions of the axis in association with the control shaft 52. At the time of such a movement, the force that acts in either direction of the axis is received by the entire contact surfaces of the bush 55 and the pin groove 64, so that the movement of the slider gear 6 via the connect pin 54 can be stably conducted.

The connect pin 54 and the bush 55 are disposed with respect to the pin groove 64 so as to be movable relative to the slider gear 6. Therefore, as torque of the intake camshaft 34 is transferred to the input gear 7, the slider gear 6 oscillates about the rocker shaft 51. That is, the pin groove 64 moves in a circumferential direction relative to the connect pin 54 and the bush 55. Since the support end surfaces 55F of the bush 55 and the pin groove 64 slide on each other while remaining in surface contact with each other, the relative movement thereof stably occurs.

[9] Manners of Changing Valve Duration and Maximum Valve Lift

In the variable valve mechanism 5, if the relative positions of the slider gear 6, the input gear 7, and the output gears 8 in the directions of the axis are changed by moving the control shaft 52 in the directions of the axis, the input gear 7 and each output gear 8 receive torsions in directions opposite to each other.

Therefore, the input gear 7 and each output gear 8 rotate relatively to each other, changing the relative phase difference between the input gear 7 (input arm 73) and each output gear 8 (output arm 83). It is to be noted herein that in the variable valve mechanism 5, since all the slider gears 6 are secured to the signal common control shaft 52, the relative phase difference is changed simultaneously in all the valve lift mechanisms 53 by moving the control shaft 52.

The valve duration INCAM and the maximum valve lift INVL of the intake valve 33 change through the changing of the relative phase difference as follows:

(a) As the relative phase difference decreases, that is, as the input arm 73 and each output arm 83 approach each other in the circumferential direction, the valve duration INCAM and the maximum valve lift INVL of the intake valve 33 decrease.

(b) As the relative phase difference increases, that is, as the input arm 73 and each output arm 83 move away from each other in the circumferential direction, the valve duration INCAM and the maximum valve lift INVL of the intake valve 33 increase.

[10] Valve Lift Structure of Engine

Figure 11:
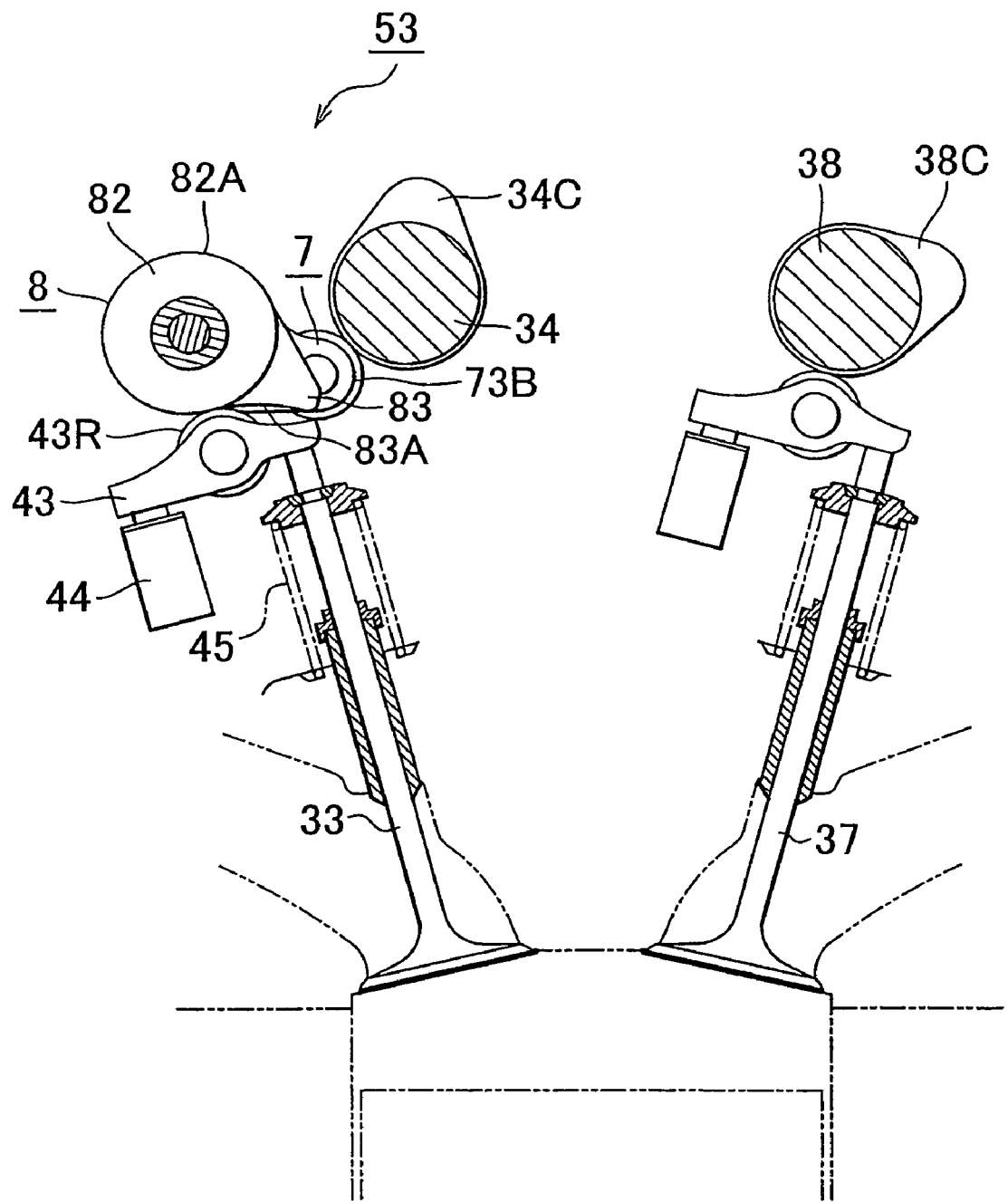
FIG. 11 is a sectional view of the variable valve mechanism and its surrounding structures in the cylinder head of the engine in accordance with the embodiment.

FIG. 11 shows structures around the variable valve mechanism 5 in the cylinder head 3.

In the cylinder head 3, an intake roller rocker arm 43 is disposed above the intake valve 33. Furthermore, the valve lift mechanism 53 of the variable valve mechanism 5 is disposed between the intake camshaft 34 and the intake roller rocker arm 43.

An end portion of the intake roller rocker arm 43 is supported by a lash adjuster 44. Another end portion thereof is in contact with a stem end of the intake valve 33.

The intake roller rocker arm 43 is urged toward the side of the variable valve mechanism 5 by a valve spring 45 of the intake valve 33. A roller 43R is kept in constant contact with the output gear 8 of the valve lift mechanism 53.

The roller 73B of the input gear 7 is urged toward the side of the intake camshaft 34 by a spring that is disposed in the cylinder head 3 in a compressed state. Therefore, the roller 73B is kept in constant contact with the cam 34C of the intake camshaft 34.

In each output gear 8, either the base portion 82A of the housing 82 or the cam surface 83A of the output arm 83 is in constant contact with the roller 43R of the intake roller rocker arm 43.

In the engine 1, each input gear 7 is pushed as the intake camshaft 34 is rotated. As torque of the intake camshaft 34 is transferred to the output gears 8 via each input gear 7 and each slider gear 6, the output gears 8 oscillate. As the output gears 8 oscillate, the intake roller rocker arms 43 are pushed, thus lifting the intake valves 33 in the valve opening direction.

In the engine 1, the amount of depression of each intake roller rocker arm 43 (amount of movement thereof from the fully closed valve position to the fully open valve position) accomplished by the corresponding output gear 8 changes in accordance with the relative phase difference between the output arm 83 and the input arm 73, and the valve duration INCAM and the maximum valve lift INVL of the intake valve 33 correspondingly change.

<Control Manner of Variable Valve Mechanism>

Figure 12:
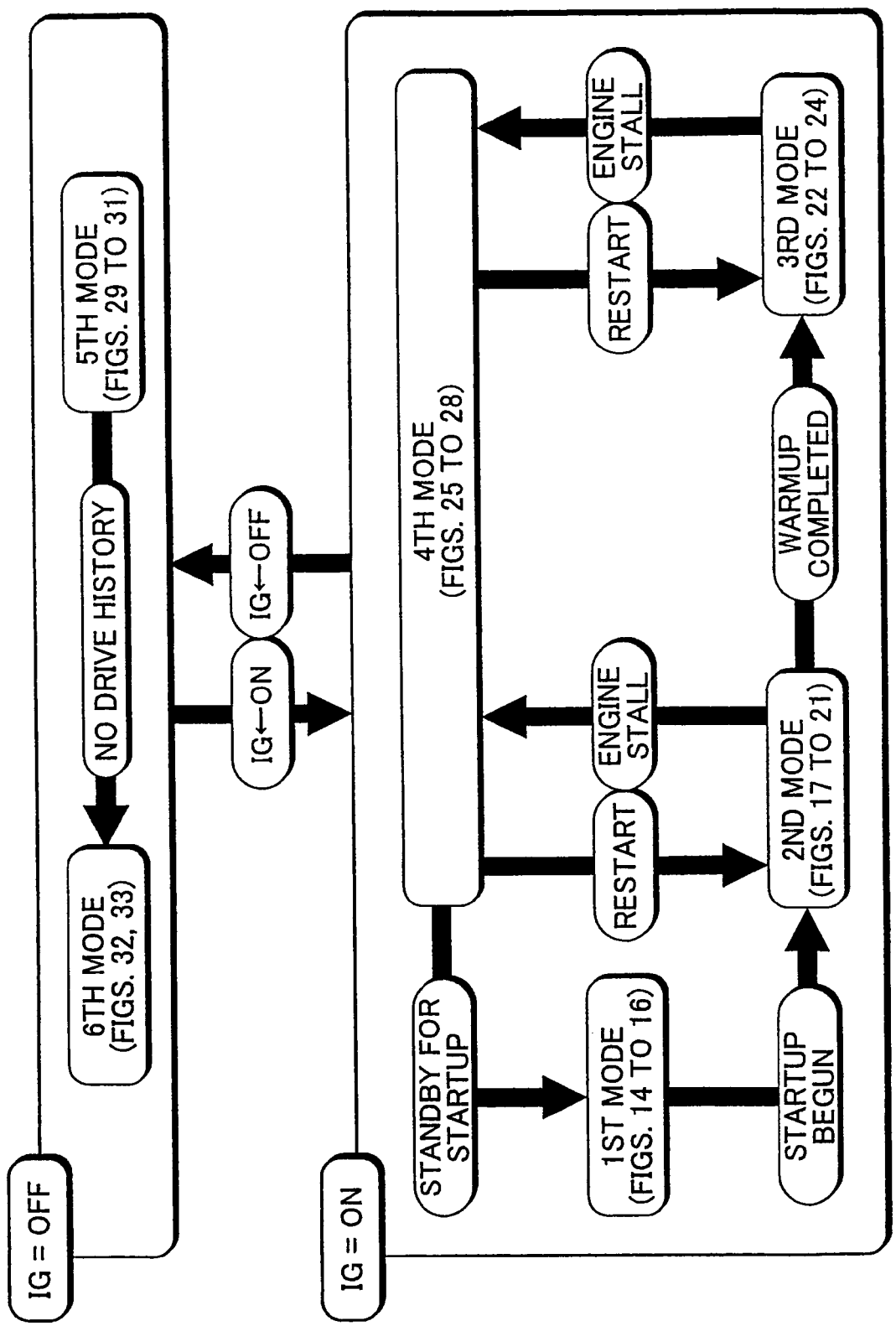
FIG. 12 is a diagram schematically illustrating the manner of switching between drive modes by an electronic control apparatus in the variable valve mechanism in the embodiment.

With reference to FIG. 12, drive modes of the variable valve mechanism 5 from which an appropriate mode is selected by the electronic control apparatus 9 will be described.

[1] "Manner of Selecting Drive Mode"

The electronic control apparatus 9 basically selects one of the drive modes of the variable valve mechanism 5 in the following manners (a) and (b):

(a) When driving the variable valve mechanism 5 during a state where the ignition signal IG is on (state where the ignition signal IG is input to the electronic control apparatus 9), the electronic control apparatus 9 selects one of a "first mode", a "second mode", a "third mode" and a "fourth mode" as a drive mode of the variable valve mechanism 5.

(b) When driving the variable valve mechanism 5 during a state where the ignition signal IG is off (state where the ignition signal IG is not input to the electronic control apparatus 9), the electronic control apparatus 9 selects one of a "fifth mode" and a "sixth mode" as a drive mode of the variable valve mechanism 5.

[2] "Variable Valve Mechanism Driving Process"

The electronic control apparatus 9 switches among the drive modes through a "variable valve mechanism driving process". The variable valve mechanism driving process includes processes (a) to (f).

Figure 32:
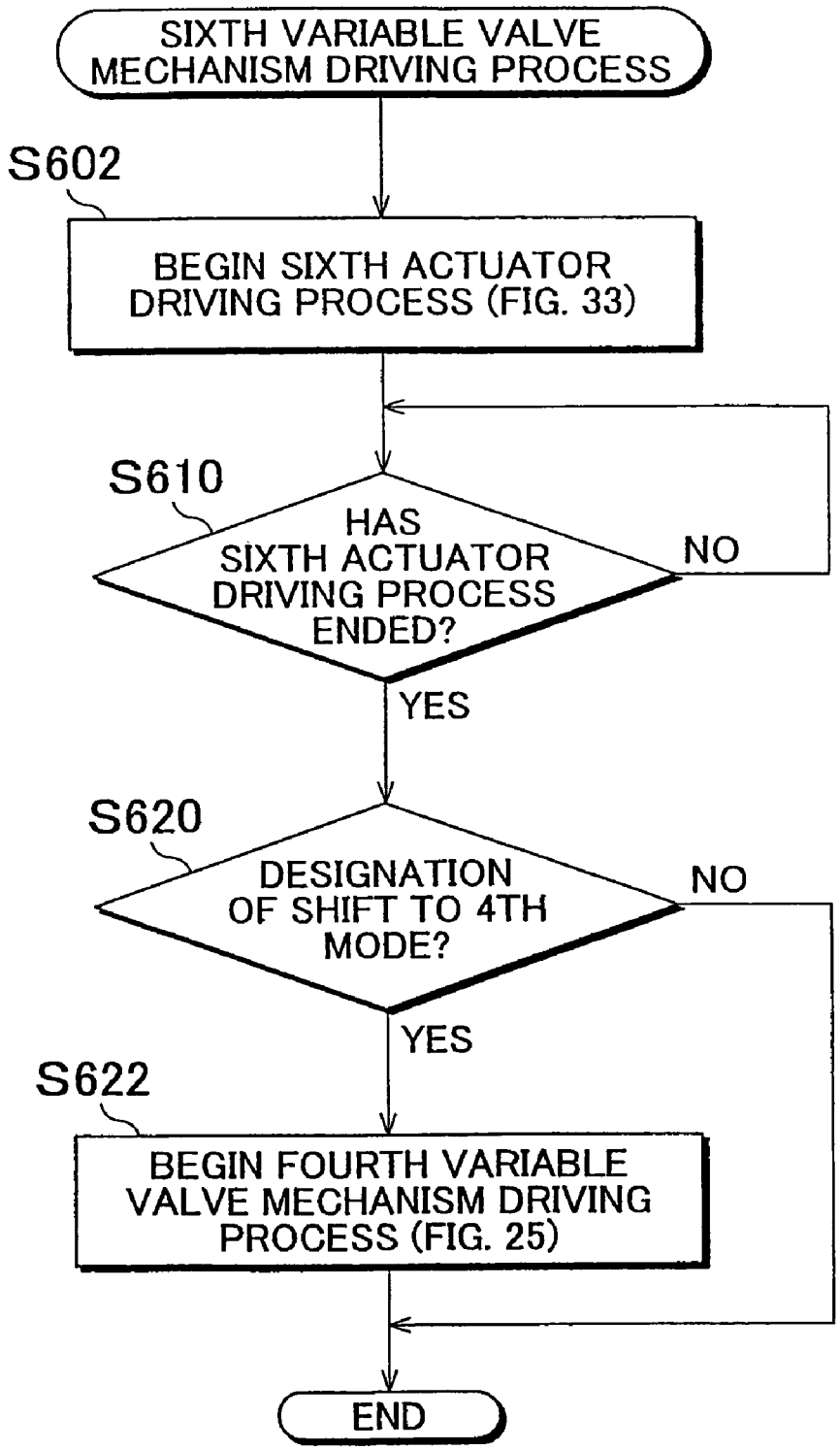
FIG. 32 is a flowchart showing a processing procedure of a "sixth variable valve mechanism driving process" executed via the electronic control apparatus of the embodiment.

(a) "first variable valve mechanism driving process" (FIGS. 14 and 15)
(b) "second variable valve mechanism driving process" (FIGS. 17 and 18)
(c) "third variable valve mechanism driving process" (FIGS. 22 and 23)
(d) "fourth variable valve mechanism driving process" (FIGS. 25 and 26)
(e) "fifth variable valve mechanism driving process" (FIG. 29)
(f) "sixth variable valve mechanism driving process" (FIG. 32)

[3] "Manner of Executing Variable Valve Mechanism Driving Process"

The electronic control apparatus 9 executes the variable valve mechanism driving process in the following manners (a) to (c). Incidentally, in the vehicle of this embodiment, the driving of the electronic control apparatus 9 continues regardless of which one of the positions "OFF", "ACC", "ON" and "START" the ignition switch 97 is in.

(a) The "first variable valve mechanism driving process" begins when the driving of the electronic control apparatus 9 begins.

(b) After beginning the "first variable valve mechanism driving process", the electronic control apparatus 9 executes an appropriate variable valve mechanism driving process, following the flow of each process.

(c) If the "sixth variable valve mechanism driving process" does not begin at the end of the "fifth variable valve mechanism driving process", or if the "fourth variable valve mechanism driving process" does not begin at the end of the "sixth variable valve mechanism driving process", the electronic control apparatus 9 begins the "first variable valve mechanism driving process" again.

[4] "Relationship between Drive Mode and Variable Valve Mechanism Driving Process"

The relationship between the drive modes of the variable valve mechanism 5 and the variable valve mechanism driving processes are indicated below.

(a) If the drive mode of the variable valve mechanism 5 has been set to the "first mode", the "first variable valve mechanism driving process" (FIGS. 14 and 15) is executed. Furthermore, control of the electric actuator 5A is performed through a "first actuator driving process" (FIG. 16) that is executed as a part of the "first variable valve mechanism driving process".

(b) If the drive mode of the variable valve mechanism 5 has been set to the "second mode", the "second variable valve mechanism driving process" (FIGS. 17 and 18) is executed. Furthermore, control of the electric actuator 5A is performed through a "second actuator driving process" (FIGS. 19 to 21) that is executed as a part of the "second variable valve mechanism driving process".

(c) If the drive mode of the variable valve mechanism 5 has been set to the "third mode", the "third variable valve mechanism driving process" (FIGS. 22 and 23) is executed. Furthermore, control of the electric actuator 5A is performed through a "third actuator driving process" (FIG. 24) that is executed as a part of the "third variable valve mechanism driving process".

(d) If the drive mode of the variable valve mechanism 5 has been set to the "fourth mode", the fourth variable valve mechanism driving process" (FIGS. 25 and 26) is executed. Furthermore, control of the electric actuator 5A is performed through a "fourth actuator driving process" (FIGS. 27 and 28) that is executed as a part of the fourth variable valve mechanism driving process".

(e) If the drive mode of the variable valve mechanism 5 has been set to the "fifth mode", the "fifth variable valve mechanism driving process" (FIG. 29) is executed. Furthermore, control of the electric actuator 5A is performed through a "fifth actuator driving process" (FIGS. 30 and 31) that is executed as a part of the fifth variable valve mechanism driving process".

(f) If the drive mode of the variable valve mechanism 5 has been set to the "sixth mode", the sixth variable valve mechanism driving process" (FIG. 32) is executed. Furthermore, control of the electric actuator 5A is performed through a "sixth actuator driving process" (FIG. 33) that is executed as a part of the "sixth variable valve mechanism driving process".

[5] "Manner of Switching Drive Mode"

The electronic control apparatus 9 basically switches the drive mode in the following manners (a) to (h). It is to be noted herein that the following description sets forth only representative conditions for the switching.

(a) If it is detected that the ignition switch 97 is switched from the "OFF" (or "ACC") position to the "ON" position while the variable valve mechanism 5 has been stopped, the electronic control apparatus 9 switches the drive mode of the variable valve mechanism 5 to the "first mode".

(b) If it is detected that the engine 1 is started up while the "first mode" has been selected as the drive mode of the variable valve mechanism 5, the electronic control apparatus 9 switches the drive mode of the variable valve mechanism 5 from the "first mode" to the "second mode".

(c) If it is detected that the warm-up of the variable valve mechanism 5 is completed while the "second mode" has been selected as the drive mode of the variable valve mechanism 5, the electronic control apparatus 9 switches the drive mode of the variable valve mechanism 5 from the "second mode" to the "third mode".

(d) If it is detected that the engine has stalled while the "second mode" or the "third mode" has been selected as the drive mode of the variable valve mechanism 5, the electronic control apparatus 9 switches the drive mode of the variable valve mechanism 5 from the "second mode" or the "third mode" to the "fourth mode".

(e) If it is detected that the engine 1 is started while the "fourth mode" has been selected as the drive mode of the variable valve mechanism 5, the electronic control apparatus 9 switches the drive mode of the variable valve mechanism 5 from the "fourth mode" to the drive mode selected before occurrence of the engine stall (i.e., to the "second mode" or the "third mode").

(f) If it is detected that the stop duration of the engine 1 exceeds a predetermined duration while the "fourth mode" has been selected as the drive mode of the variable valve mechanism 5, the electronic control apparatus 9 switches the drive mode of the variable valve mechanism 5 from the "fourth mode" to the "first mode".

(g) If it is detected that the ignition switch 97 has been switched to the "OFF" (or "ACC") position while any one of the "first mode", the "second mode", the "third mode", and the "fourth mode" has been selected as the drive mode of the variable valve mechanism 5, the electronic control apparatus 9 switches the drive mode of the variable valve mechanism 5 from the selected one of the first to fourth modes to the "fifth mode".

(h) If it is detected that the startup of the engine 1 has not been completed throughout the time from the switching of the ignition switch 97 to the "ON" position till the switching thereof to the "OFF" position while the fifth mode" has been selected as the drive mode of the variable valve mechanism 5, the electronic control apparatus 9 switches the drive mode of the variable valve mechanism 5 from the "fifth mode" to the "sixth mode".

<Manner of Controlling Electric Actuator>

The manner in which the electronic control apparatus 9 controls the electric actuator 5A will be roughly described.

During engine operation, the electronic control apparatus 9 monitors the valve duration INCAM. If the valve duration INCAM adjusted by the control (the monitored valve duration INCAMmnt) differs from a target valve duration INCAM (target valve duration INCAMtrg), the electronic control apparatus 9 controls the electric actuator 5A so that the monitored valve duration INCAMmnt becomes equal to the target valve duration INCAMtrg.

The monitored valve duration INCAMmnt can be computed, for example, in the following fashion.

(1) The present position of the control shaft 52 is determined on the basis of the amount of control of the electric actuator 5A (the electric motor 5A1).

(2) The monitored valve duration INCAMmnt is computed by applying the position of the control shaft 52 determined in step (1) to a map in which a relationship between the position of the control shaft 52 and the valve duration INCAM is pre-set.

The state of drive of the electric actuator 5A switches to one of the following states (a) to (c) via the electronic control apparatus 9. Incidentally, the "standby state" described below corresponds to a state where the electric actuator 5A is stopped. Furthermore, the "variable state" and the "holding state" correspond to states where the electric actuator 5A is being driven.

(a) "standby state": a state where electric power is not supplied from the battery 12.

(b) "variable state": a state where the position of the control shaft 52 is changed through the use of the electric power supplied from the battery 12.

(c) "holding state": a state where the position of the control shaft 52 is maintained through the use of the electric power supplied from the battery 12.

The electric actuator 5A has a built-in lock mechanism that mechanically fixes the position of the control shaft 52. In this embodiment, when the state of drive of the electric actuator 5A switches from the "variable state" or the "holding state" to the "standby state", the position of the control shaft 52 (valve duration INCAM) is fixed via the lock mechanism. Furthermore, when the state of drive of the electric actuator 5A switches from the "standby state" to the "variable state" or the "holding state", the position of the control shaft 52 is no longer fixed by the lock mechanism.

The electronic control apparatus 9 switches the state of drive of the electric actuator 5A basically in the following manner.

(a) If the monitored valve duration INCAMmnt differs from the target valve duration INCAMtrg, the electronic control apparatus 9 sets the state of drive of the electric actuator 5A to the "variable state" to change the valve duration INCAM.

(b) When the monitored valve duration INCAMmnt becomes equal to the target valve duration INCAMtrg, the electronic control apparatus 9 sets the state of drive of the electric actuator 5A to the "holding state" to maintain the existing magnitude of the valve duration INCAM.

<Adjustment of Intake Flow Amount>

In the engine 1, it is possible to improve the fuel economy in a low-load operation state and improve the output in a high-load operation state by adjusting the intake flow amount GA by changing the valve duration INCAM via the variable valve mechanism 5. However, during a state where the variable valve mechanism 5 is not sufficiently warmed up (a state where the friction of the control shaft 52 and the like is large), the load on the electric actuator 5A tends to become excessively large when the valve duration INCAM is changed.

Therefore, under such circumstances, the intake flow amount GA may be adjusted in the engine 1 in the following fashion.

(a) If the variable valve mechanism 5 has not been completely warmed up (i.e., if the drive mode of the variable valve mechanism 5 has been set to the "second mode"), the intake flow amount GA is adjusted by changing the throttle opening degree THR. That is, the throttle opening degree THR is controlled so that the intake flow amount measured value GAM converges to a target value of the intake flow amount GA (target intake flow amount GAtrg). Incidentally, the target intake flow amount GAtrg can be computed on the basis of the accelerator operation amount ACP, the engine speed NE, etc.

(b) If variable valve mechanism 5 has been warmed up (i.e., if the drive mode of the variable valve mechanism 5 has been set to the "third mode"), the intake flow amount GA is adjusted by changing the valve duration INCAM via the variable valve mechanism 5. That is, the variable valve mechanism 5 is controlled so that the intake flow amount measured value GAM converges to the target intake flow amount GAtrg. Incidentally, in such an occasion, the throttle opening degree THR is kept at a relatively great degree of opening. Then, if there is a request from another control that is being executed by the electronic control apparatus 9 (e.g., a request for adjustment of the negative pressure in the intake pipe 31), the throttle opening degree THR is changed in accordance with the request.

<Engine Starting Process>

Prior to the description of the "variable valve mechanism driving process", an "engine starting process" for starting the engine 1 will be described.

Figure 13:
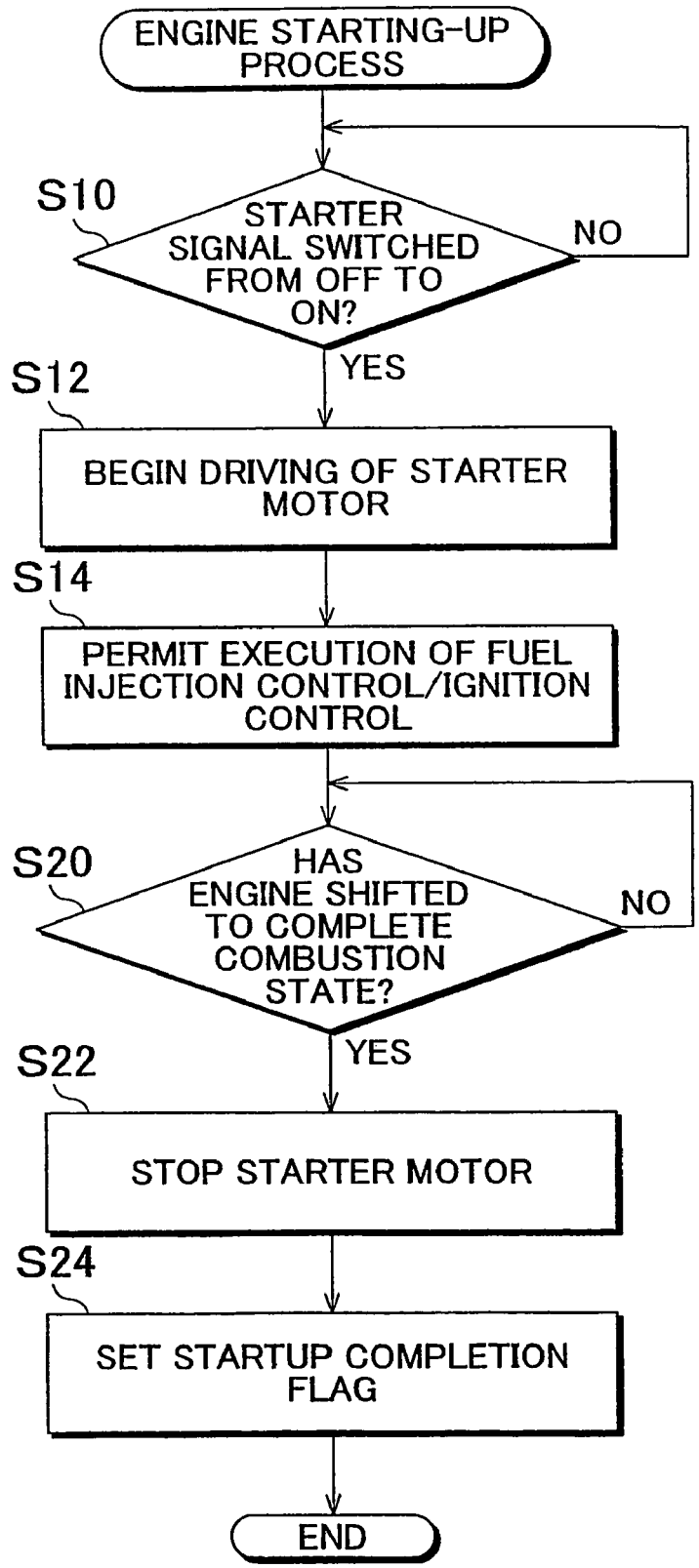
FIG. 13 is a flowchart showing the processing procedure of an "engine starting-up process" executed via the electronic control apparatus of the embodiment.

FIG. 13 shows a processing procedure of the "engine starting process". This process is performed via the electronic control apparatus 9. Furthermore, the process begins on the condition that the ignition signal IG switches from the off state to the on state.

Step S10: It is determined whether the starter signal STA has switched from the off state to the on state.

If the signal has switched from the off state to the on state, the process of step S12 is performed.

If the signal has not switched from the off state to the on state, the process of step S10 is performed again.

Step S12: The driving of the starter motor 11 begins.

Step S14: A fuel injection control and an ignition control may be executed on the basis of the completion of cylinder discrimination.

Step S20: It is determined whether the engine 1 has shifted from an initial combustion state to a complete combustion state. In the process of step S20, it is determined that the engine 1 has shifted from the initial combustion state to the complete combustion state based on the measured engine speed value NEM being greater than or equal to a threshold value. In this specification, initial combustion state refers to a state where the combustion of the air-fuel mixture is occurring, but the self-sustaining operation (a state where the rotation of the crankshaft 26 continues without the need for torque assistance from the starter motor 11) of the engine 1 cannot be carried out. The complete combustion state refers to a state where the self-sustaining operation of the engine 1 can be carried out. If the engine 1 has shifted to the complete combustion state, the process of step S22 is performed. If the engine 1 has not shifted to the complete combustion state, the process of step S20 is performed again.

Step S22: The starter motor 11 stops. Step S24: A start completion flag eST indicating completion of the starting of the engine 1 is set to an on state.

Thus, in the "engine starting process", when the starter signal STA turns on, the driving of the starter motor 11 begins, that is the starting of the engine 1 begins. Then, when the engine 1 has shifted to the complete combustion state, the driving of the starter motor 11 stops. That is, the starting of the engine 1 is completed.

<First Variable Valve Mechanism Driving Process>

Figure 14:
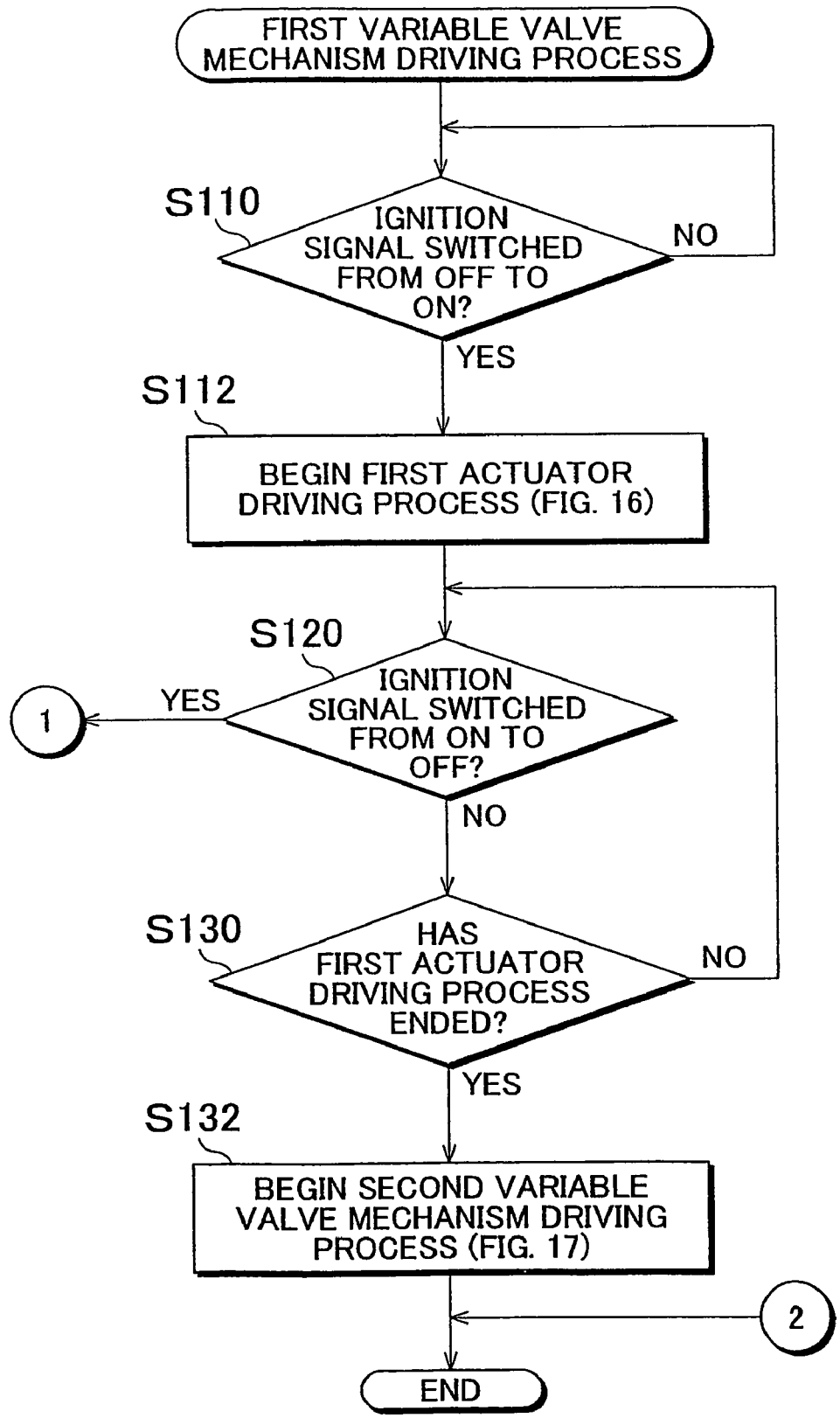
FIG. 14 is a flowchart showing a processing procedure of a "first variable valve mechanism driving process" executed via the electronic control apparatus of the embodiment.
Figure 15:
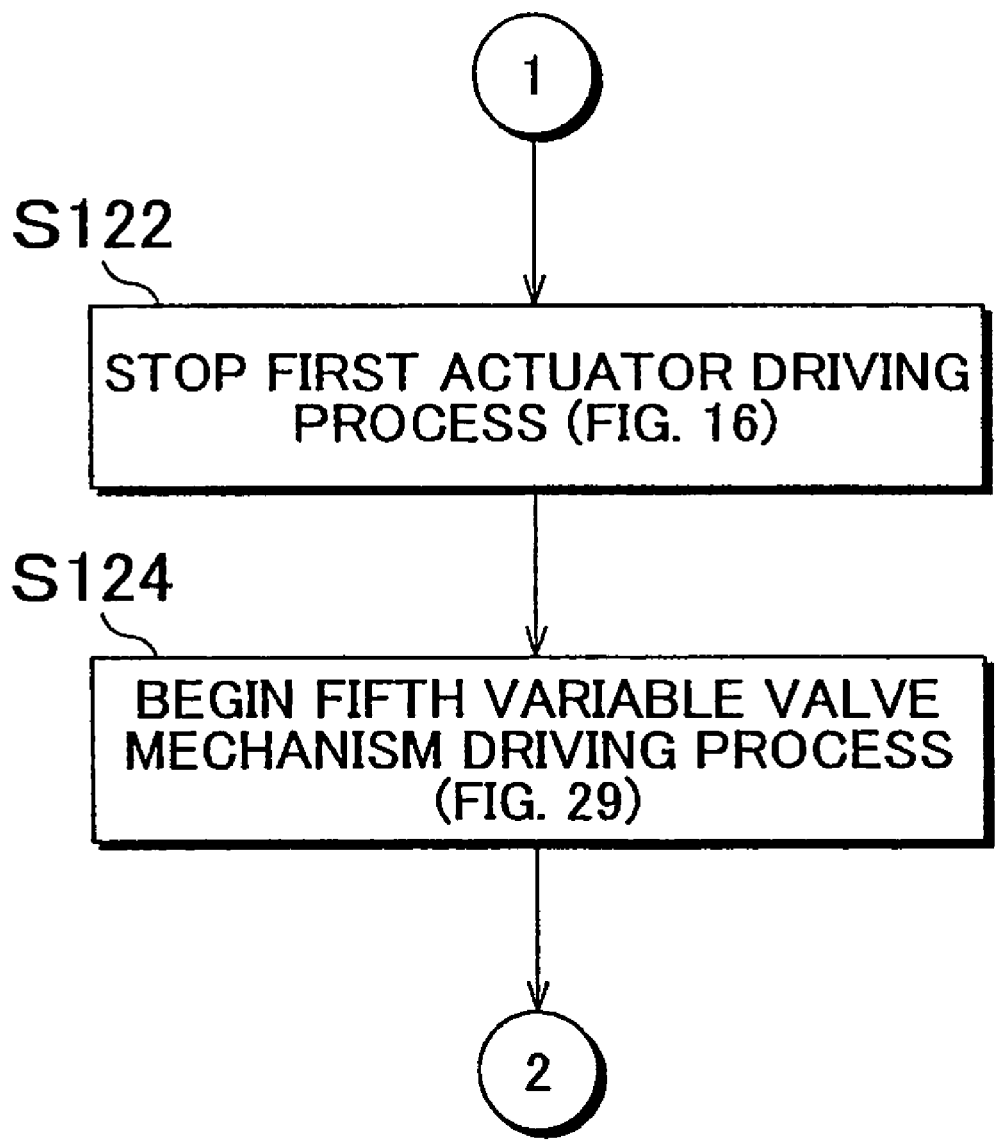
FIG. 15 is a flowchart showing another processing procedure of the "first variable valve mechanism driving process" executed via the electronic control apparatus of the embodiment.

With reference to FIGS. 14 and 15, the first variable valve mechanism driving process" will be described. Step S110: It is determined whether the ignition signal IG has switched from the off state to the on state. If the signal has switched from the off state to the on state, the process of step S112 is performed. If the signal has not switched from the off state to the on state, the process of step S110 is performed again.

Step S112: The "first actuator driving process" (FIG. 16) begins. Incidentally, the "first actuator driving process" will be described in detail later. Step S120: It is determined whether the ignition signal IG has switched from the on state to the off state. If the signal has switched from the on state to the off state, the process of step S122 (FIG. 15) is performed. If the signal has not switched from the on state to the off state, the process of step S130 is performed.

Step S122: The presently executed driving process of the electric actuator 5A, that is, the "first actuator driving process", ceases. Step S124: The "fifth variable valve mechanism driving process" (FIG. 29) begins and the "first variable valve mechanism driving process" ends. That is, the drive mode of the variable valve mechanism 5 switches from the "first mode" to the "fifth mode".

Step S130: It is determined whether the "first actuator driving process" has ended. If the driving process has ended, the process of step S132 is performed. If this driving process has not ended, the process of step S120 is performed again.

Step S132: The "second variable valve mechanism driving process" (FIG. 17) begins, and the first variable valve mechanism driving process" ends. That is, the drive mode of the variable valve mechanism 5 switches from the "first mode" to the "second mode".

<First Actuator Driving Process>

Figure 16:
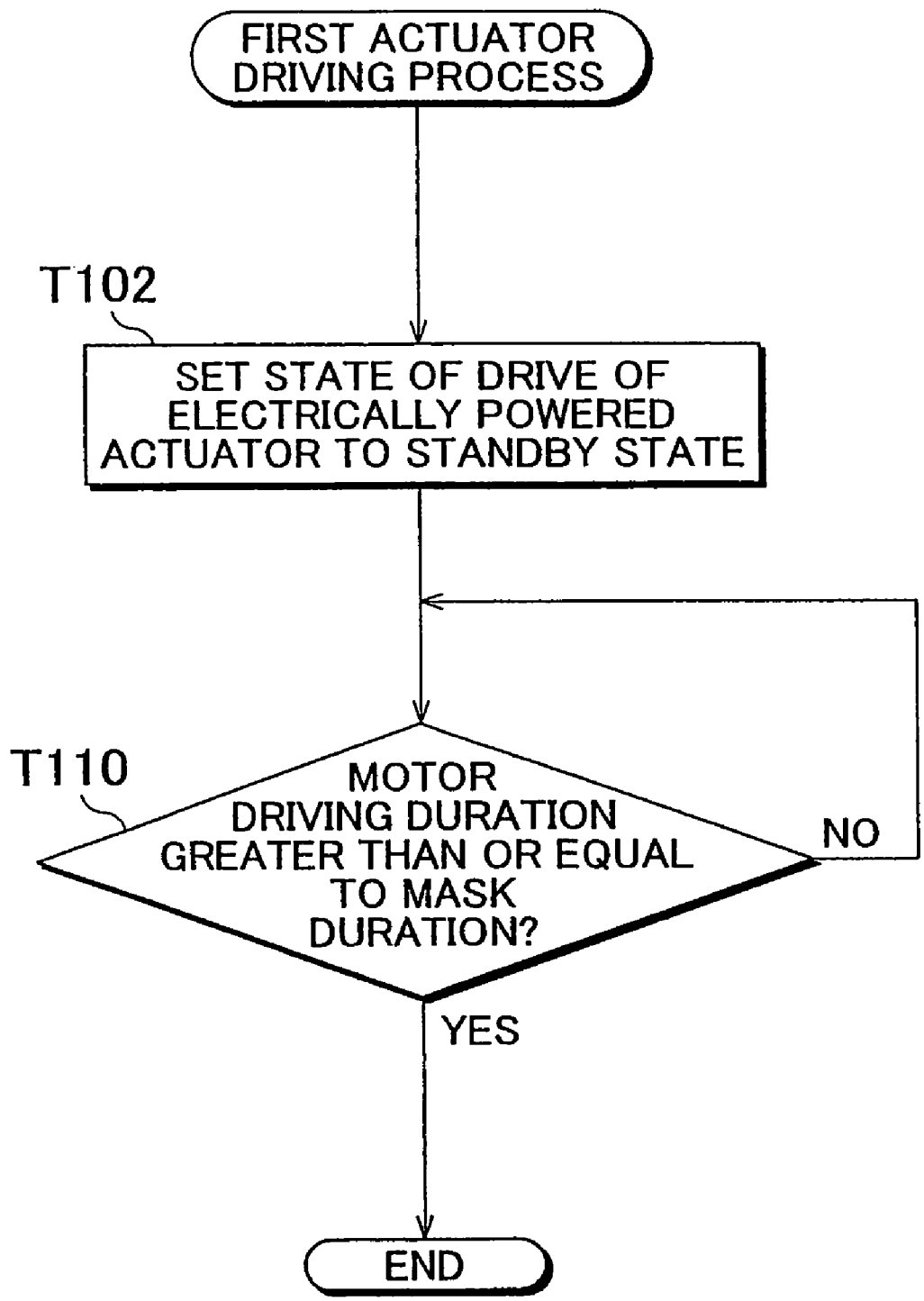
FIG. 16 is a flowchart showing a processing procedure of a "first actuator driving process" executed via the electronic control apparatus of the embodiment.

With reference to FIG. 16, the "first actuator driving process" will be described. Step T102: The state of drive of the electric actuator 5A is set to the "standby state". That is, the switching of the state of drive of the electric actuator 5A to either the "variable state" or the "holding state" is prohibited.

Step T110: It is determined whether the driving duration of the starter motor 11 (the elapsed time following the beginning of the driving of the starter motor 11 (motor driving duration TM)) is greater than or equal to a mask duration TMX.

The mask duration TMX is a pre-set value for detecting a state where the voltage of the battery 12 (battery voltage BV) is excessively reduced, for example, when initially driving the starter motor 11.

The electronic control apparatus 9 determines the state of the battery 12 through the process of step T110.

(a) If the motor driving duration TM is less than the mask duration TMX, the electronic control apparatus 9 determines that the battery voltage BV has fallen excessively due to the driving of the starter motor 11. The electronic control apparatus 9 repeats the process of step T110 if it determines that the battery voltage BV has fallen excessively.

(b) If the motor driving duration TM is greater than or equal to the mask duration TMX, the electronic control apparatus 9 determines that the battery 12 has recovered from the state where the battery voltage BV is an excessively reduced level due to the driving of the starter motor 11. If this determination result is obtained, the electronic control apparatus 9 ends the "first actuator driving process".

Thus, in the "first actuator driving process", the process of step T110 is repeatedly performed throughout the time from the switching of the ignition switch 97 to the "ON" position until the motor driving duration TM becomes greater than or equal to the mask duration TMX. That is, the "standby state" of the electric actuator 5A is continued.

It is relatively quiet in the cabin of the vehicle from when a driver and other occupants enter the cabin until the engine 1 is first started. Therefore, if in such a situation the variable valve mechanism 5 (the electric actuator 5A) is driven, it is conceivable that the driver and/or the other occupants of the vehicle may be annoyed by the operating noise of the variable valve mechanism 5 (the electric actuator 5A).

Therefore, in the "first actuator driving process", at least until the startup of the engine 1 begins, the state of drive of the electric actuator 5A is set at the "standby state", so as to reduce the likelihood where the driver and/or the other occupants of the vehicle may be annoyed. Furthermore, until the motor driving duration TM becomes greater than or equal to the mask duration TMX, the state of drive of the electric actuator 5A is set at the "standby state", so as to reduce the likelihood that the engine 1 will fail to start, due to, for example, reduced battery voltage BV.

<Second Variable Valve Mechanism Driving Process>

Figure 17:
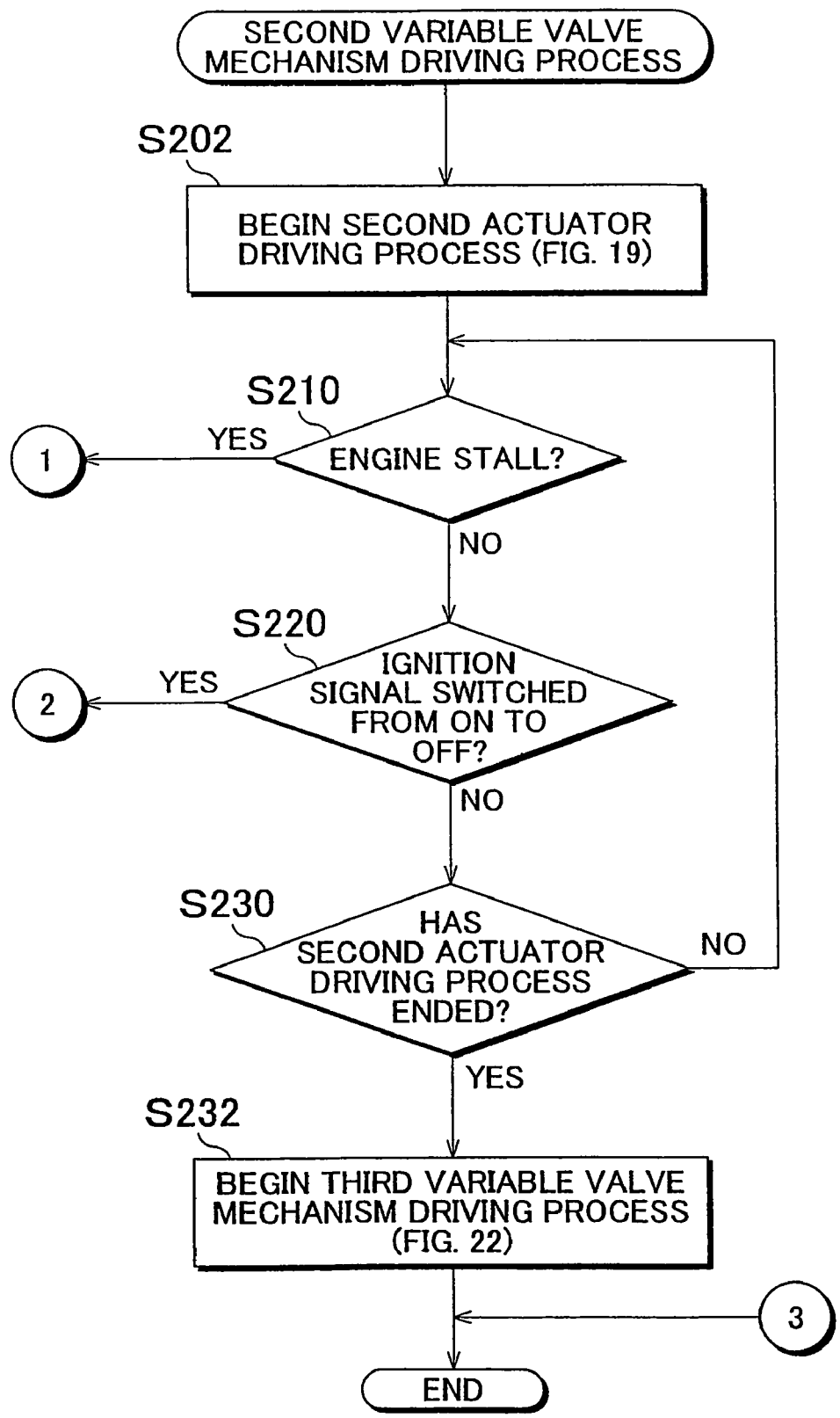
FIG. 17 is a flowchart showing a processing procedure of a "second variable valve mechanism driving process" executed via the electronic control apparatus of the embodiment.
Figure 18:
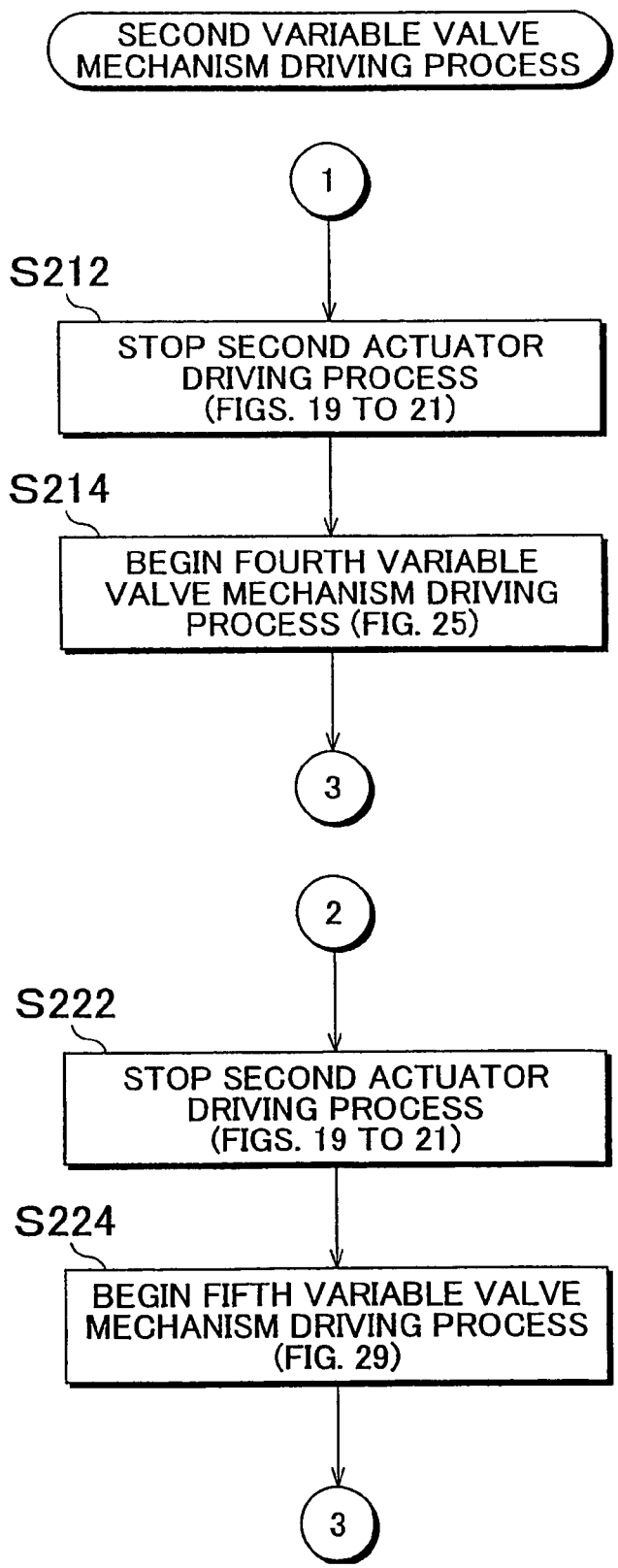
FIG. 18 is a flowchart showing other processing procedures of the "second variable valve mechanism driving process" executed via the electronic control apparatus of the embodiment.

With reference to FIGS. 17 and 18, the "second variable valve mechanism driving process" will be described. Step S202: The "second actuator driving process" (FIG. 19) begins. Incidentally, the "second actuator driving process" will be described in detail later.

Step S210: It is determined whether an engine stall has occurred. If an engine stall has occurred, the process of step S212 (FIG. 18) is performed. If an engine stall has not occurred, the process of step S220 is performed.

Step S212: The presently executed driving process of the electric actuator 5A, that is, the "second actuator driving process", ceases. Step S214: The "fourth variable valve mechanism driving process" (FIG. 25) begins, and the "second variable valve mechanism driving process" ends. That is, the drive mode of the variable valve mechanism 5 switches from the "second mode" to the "fourth mode".

Step S220: It is determined whether the ignition signal IG has switched from the on state to the off state. If the signal has switched from the on state to the off state, the process of step S222 (FIG. 18) is performed. If the signal has not switched from the on state to the off state, the process of step S230 is performed.

Step S222: The presently executed driving process of the electric actuator 5A, that is, the "second actuator driving process", ceases. Step S224: The "fifth variable valve mechanism driving process" (FIG. 29) begins, and the "second variable valve mechanism driving process" ends. That is, the drive mode of the variable valve mechanism 5 switches from the "second mode" to the "fifth mode".

Step S230: It is determined whether the "second actuator driving process" has ended. If this driving process has ended, the process of step S232 is performed. If the driving process has not ended, the process of step S210 is performed.

Step S232: The "third variable valve mechanism driving process" (FIG. 22) begins, and the "second variable valve mechanism driving process" ends. That is, the drive mode of the variable valve mechanism 5 switches from the "second mode" to the "third mode".

<Second Actuator Driving Process>

Figure 19:
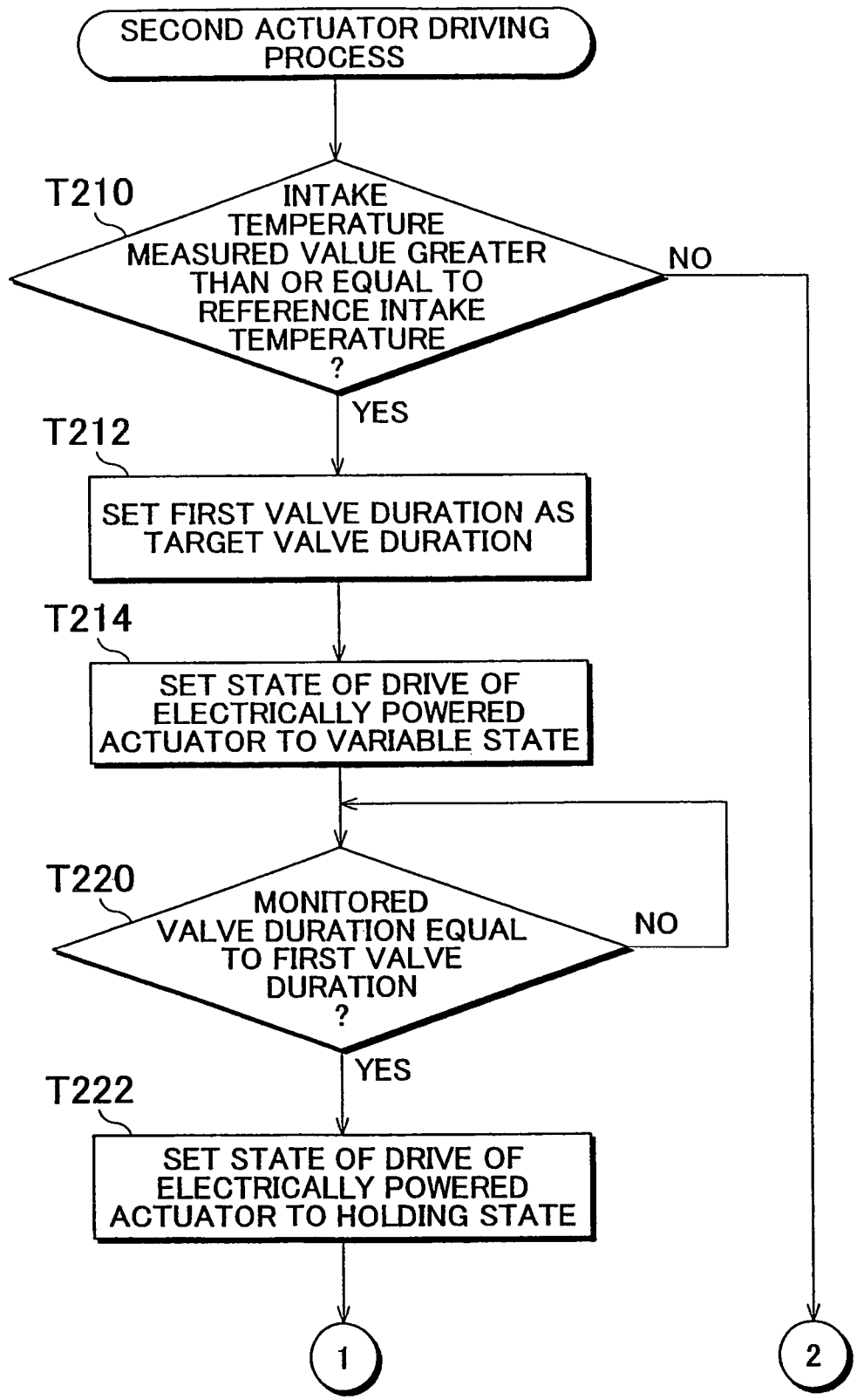
FIG. 19 is a flowchart showing of a processing procedure of a "second actuator driving process" executed via the electronic control apparatus of the embodiment.
Figure 20:
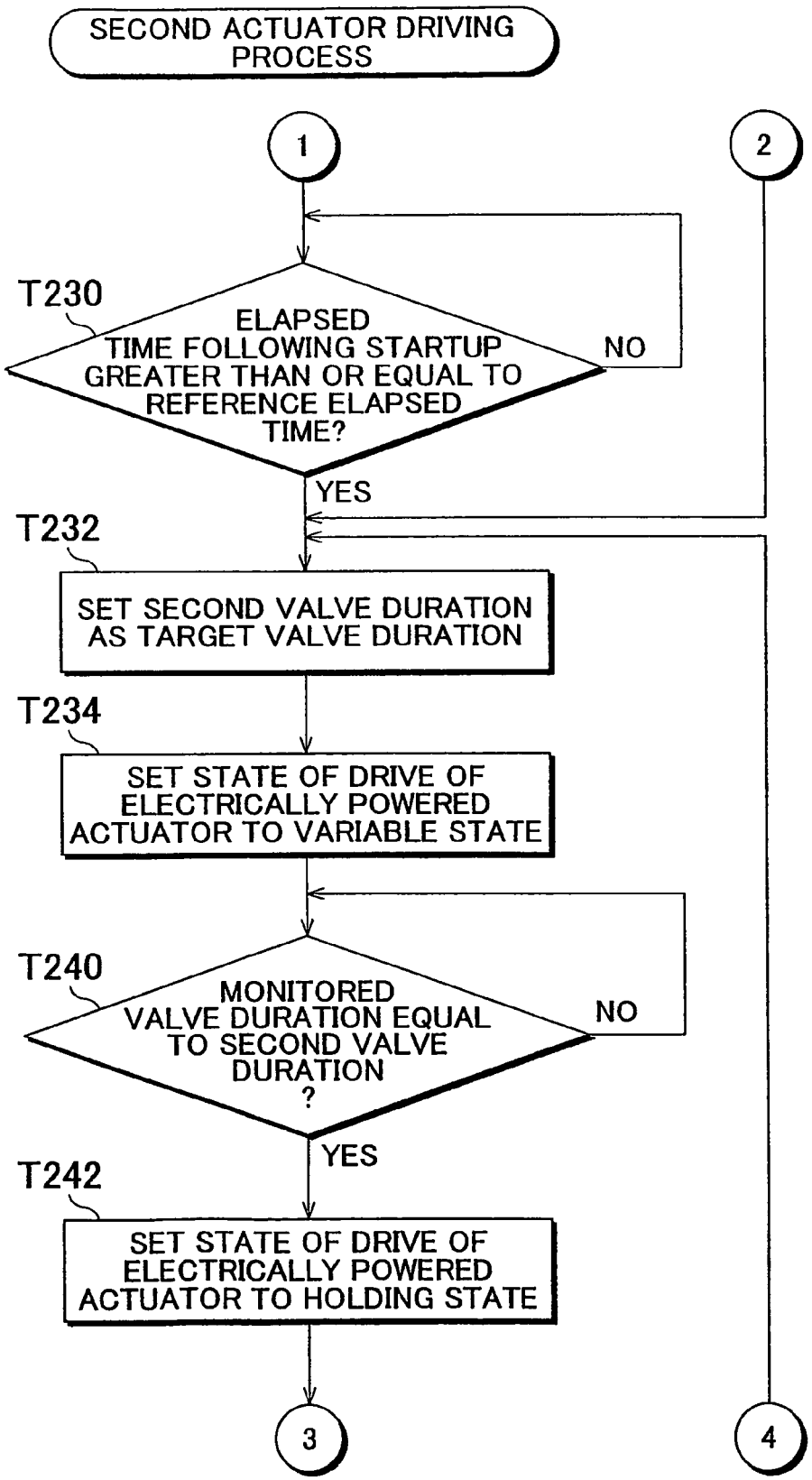
FIG. 20 is a flowchart showing of another processing procedure of the "second actuator driving process" executed via the electronic control apparatus of the embodiment.
Figure 21:
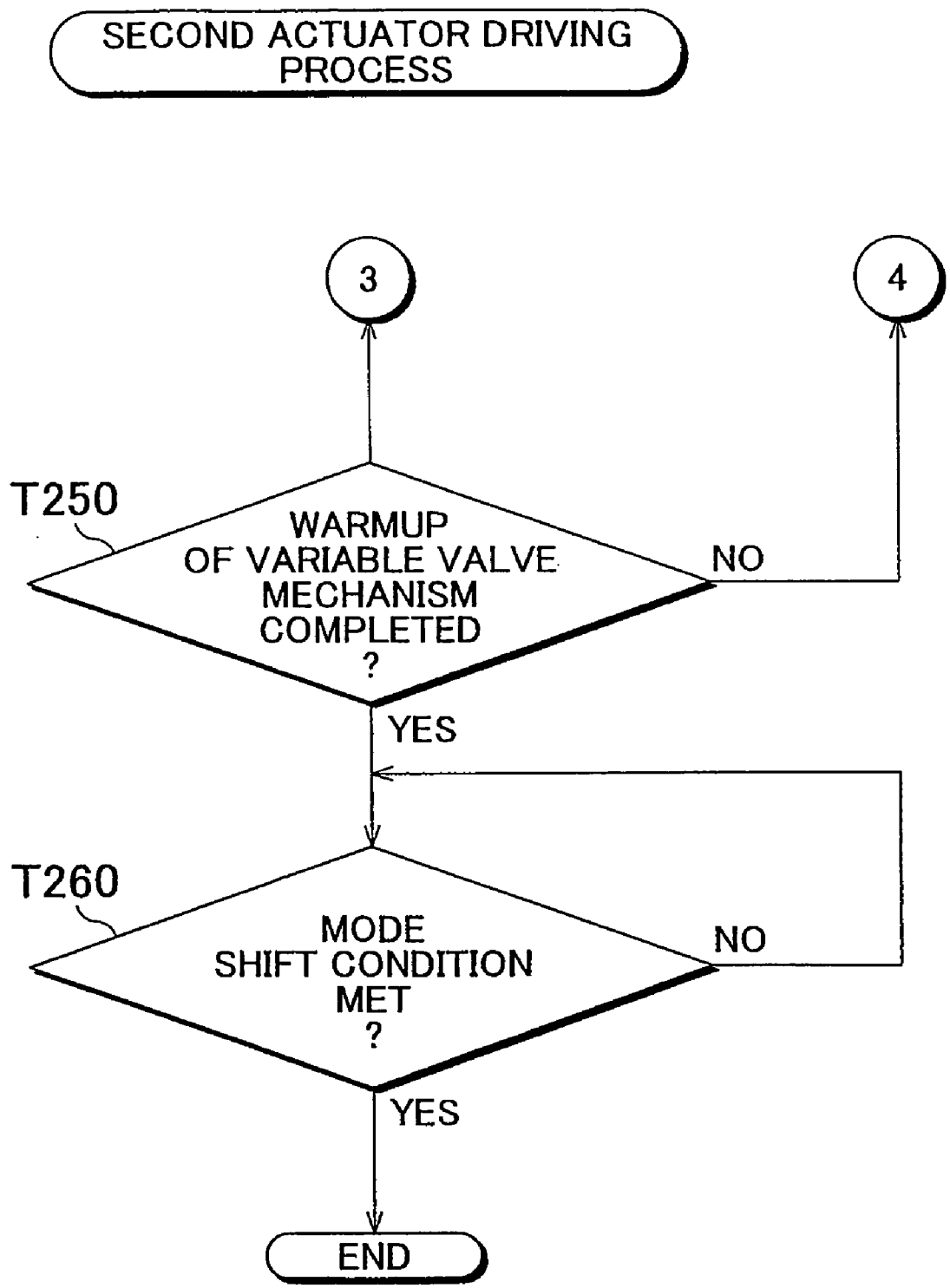
FIG. 21 is a flowchart showing still another processing procedure of the "second actuator driving process" executed via the electronic control apparatus of the embodiment.

With reference to FIGS. 19 to 21, the "second actuator driving process" will be described. Step T210: It is determined whether the measured intake temperature THAM is greater than or equal to a reference intake temperature THAX.

The throttle valve 39 does not function as an intake throttle immediately after the engine 1 has been started up. Therefore, for a brief time after the engine is started (a time until the elapsed time from the beginning of the startup of the engine 1 (post-startup duration TE) reaches the reference post-startup duration TEX), large amounts of air flow into the combustion chamber 24. Therefore, immediately after the engine 1 is started, the actual compression ratio exceeds a compression ratio that corresponds to the throttle opening degree THR. Besides, the actual compression ratio increases with increases in the intake temperature THA. Therefore, if the engine 1 is started up when the intake temperature THA is relatively high, there is an increased likelihood that knocking will occur until the post-startup duration TE reaches the reference post-startup duration TEX.

Therefore, in the process of step T210, it is determined whether the intake temperature THA is within a range that causes knocking, by comparing the intake temperature measured value THAM and the reference intake temperature THAX. Incidentally, the reference intake temperature THAX may be empirically determined.

Through the determination process of step T210, the electronic control apparatus 9 makes a determination regarding the knocking immediately after the startup of the engine 1, as follows.

(a) If the intake temperature measured value THAM is greater than or equal to the reference intake temperature THAX, the electronic control apparatus 9 determines that there is a risk of causing the occurrence of knocking due to excessive increase in the actual compression ratio. If this determination result is obtained, the process of step T212 is performed.

(b) If the intake temperature measured value THAM is less than the reference intake temperature THAX, the electronic control apparatus 9 determines that there is no risk of causing knocking. If this determination result is obtained, the process of step T232 (FIG. 20) is performed.

Step T212: A first valve duration INCAMfst is set as a target valve duration INCAMtrg. The first valve duration INCAMfst refers to a valve duration INCAM that involves a closure timing of the intake valve 33 which is apart from the bottom dead center or its vicinity.

It is to be noted that when the closure timing of the intake valve 33 is set at or near the bottom dead center, the actual compression ratio is greater than when the closure timing of the intake valve 33 is set otherwise. Therefore, by setting the valve duration INCAM at the first valve duration INCAMfst, it becomes possible to obtain an actual compression ratio that is relatively small in view of the relationship between the actual compression ratio and the valve duration INCAM.

Step T214: The state of drive of the electric actuator 5A is set to the "variable state". Then, the electric actuator 5A is controlled so that the valve duration INCAM becomes equal to the first valve duration INCAMfst.

Step T220: It is determined whether the monitored valve duration INCAMmnt is equal to the target valve duration INCAMtrg (the first valve duration INCAMfst). If the monitored valve duration INCAMmnt is equal to the first valve duration INCAMfst, the process of step T222 is performed. If the monitored valve duration INCAMmnt is not equal to the first valve duration INCAMfst, the process of step T220 is performed again. That is, the "variable state" of the electric actuator 5A is continued until the monitored valve duration INCAMmnt is equal to the first valve duration INCAMfst.

Step T222: The state of drive of the electric actuator 5A switches from the "variable state" to the "holding state". Therefore, the state where the valve duration INCAM is set at the first valve duration INCAMfst is maintained.

Step T230: It is determined whether the elapsed time following the beginning of startup of the engine 1 (post-startup duration TE) is greater than or equal to the reference post-start duration TEX. Through the determination process of step T230, the electronic control apparatus 9 makes a determination regarding the size of the valve duration INCAM, as follows.

(a) If the post-start duration TE is greater than or equal to the reference post-start duration TEX, the throttle valve 39 properly functions; therefore, it is determined that the occurrence of knocking can be substantially prevented even if the valve duration INCAM is set at an angle that is other than the first valve duration INCAMfst. If this determination result is obtained, the process of step T232 is performed.

(b) If the post-start duration TE is less than the reference post-start duration TEX, the throttle valve 39 does not properly function; therefore, it is determined that it is necessary to set the valve duration INCAM at the first valve duration INCAMfst. If this determination result is obtained, the process of step T230 is performed again.

Step T232: A second valve duration INCAMscd is set as a target valve duration INCAMtrg. The second valve duration INCAMscd corresponds to a valve duration INCAM that optimizes the intake efficiency.

In the process of step T232, a second valve duration INCAMscd appropriate for the present engine speed NE is computed by applying the measured engine speed value NEM to a map in which the relationship between the engine speed NE and the second valve duration INCAMscd is pre-set.

Step T234: The state of drive of the electric actuator 5A is set to the "variable state". Then, the electric actuator 5A is controlled so that the valve duration INCAM becomes equal to the second valve duration INCAMscd.

Step T240: It is determined whether the monitored valve duration INCAMmnt is equal to the target valve duration INCAMtrg (the second valve duration INCAMscd). If the monitored valve duration INCAMmnt is equal to the second valve duration INCAMscd, the process of step T242 is performed. If the monitored valve duration INCAMmnt is not equal to the second valve duration INCAMscd, the process of step T240 is performed again. That is, the "variable state" of the electric actuator 5A continues until the monitored valve duration INCAMmnt is equal to the second valve duration INCAMscd.

Step T242: The state of drive of the electric actuator 5A switches from the "variable state" to the "holding state". Therefore, the state where the valve duration INCAM is set at the second valve duration INCAMscd is maintained.

Step T250: It is determined whether the warm-up of the variable valve mechanism 5 has been completed. In the process of step T250, the coolant temperature THW is adopted as an index value of the variable valve mechanism 5, and it is determined whether the warm-up of the variable valve mechanism 5 has been completed, by comparing the measured coolant temperature THWM with a reference coolant temperature THWX. Incidentally, the reference coolant temperature THWX may be determined empirically.

Through the determination process of step T250, the electronic control apparatus 9 makes a determination regarding the state of warm-up of the variable valve mechanism 5, as follows.

(a) If the measured coolant temperature THWM is greater than or equal to the reference coolant temperature THWX, the electronic control apparatus 9 determines that the warm-up of the variable valve mechanism 5 has been completed. If this determination result is obtained, the process of step T260 is performed.

(b) If the measured coolant temperature THWM is less than the reference coolant temperature THWX, the electronic control apparatus 9 determines that the warm-up of the variable valve mechanism 5 has not been completed. If this determination result is obtained, the process of step T232 is performed again.

Step T260: It is determined whether a condition (mode shift condition) for allowing the switching of the drive mode of the variable valve mechanism 5 from the "second mode" to the "third mode" while curbing the degradation of vehicle drivability has been met.

When the drive mode of the variable valve mechanism 5 has been set to the "second mode" in the engine 1, the adjustment of the intake airflow amount GA is performed through control of the throttle valve 39 (change of the throttle opening degree THR). On the other hand, when the drive mode of the variable valve mechanism 5 has been set to the "third mode", the adjustment of the intake airflow amount GA is performed through control of the variable valve mechanism 5 (change of valve duration INCAM). In either case, the throttle opening degree THR and the valve duration INCAM are changed so that the actual intake airflow amount GA becomes equal to the target intake airflow amount GAtrg.

At the time of a drive mode shift, however, the control object for the adjustment of the intake airflow amount GA changes from the throttle valve 39 to the variable valve mechanism 5, so that the deviation between the actual intake airflow amount GA and the target intake airflow amount GAtrg may temporarily increase when the adjustment is performed as described above. Furthermore, the degree of deviation between the actual intake airflow amount GA and the target intake airflow amount GAtrg tends to increase with increases in the amount of change of the valve duration INCAM occurring at the time of a mode shift (the difference between the actual valve duration INCAM at the beginning of the change of the drive mode and the target valve duration INCAMtrg).

If such an increase in the degree of deviation between the actual intake airflow amount GA and the target intake airflow amount Gatrg occurs, the torque of the engine 1 sharply changes, leading to degraded vehicle drivability. Incidentally, the aforementioned increase in the deviation is considered to occur as the degree of degradation in control precision resulting from individual differences of the throttle valve 39, the variable valve mechanism 5 and the like become greater during a drive mode shift than before and after the drive mode shift (when a drive mode is fixed).

In order to curb the degradation of vehicle drivability related to a drive mode shift, the "second actuator driving process" is designed such that if it is determined through the process of step T260 that the mode shift condition is met, the shift from the "second mode" to the "third mode" is permitted (the "second actuator driving process" ends).

In the process of step T260, it is determined that the mode shift condition is met if at least one of "condition 1", "condition 2", "condition 3", and "condition 4", as described below, are met. That is, if at least one of "condition 1", "condition 2" and "condition 3", and "condition 4" are met, the shift from the "second mode" to the "third mode" is permitted.

"Condition 1": The run state of the vehicle is not a low-speed run state.

"Condition 2": The operation state of the engine 1 is a transitional operation state.

"Condition 3": The operation state of the engine 1 is a high-load operation state.

"Condition 4": The operation state of the engine 1 is not a low-load operation state.

In this embodiment, an intake rate GAP is adopted as an index value of the load on the engine 1. That is, the load on the engine 1 is determined through the intake rate GAP.

The intake rate GAP refers to the ratio between the maximum intake airflow amount GA (maximum intake airflow amount GAmax) and the intake airflow amount measured value GAM obtained in the engine 1. That is, the intake rate GAP is computed as in "GAP←GAM/GAmax". Incidentally, a value empirically obtained beforehand may be adopted as a maximum intake airflow amount GAmax.

Hereinafter, reasons for switching drive modes on the basis of the aforementioned conditions, that is, "condition 1" to "condition 4", will be explained.

[1] Regarding "Condition 1"

When the running speed of the vehicle (vehicle speed SPD) is relatively high, the vibrations of the engine 1 and the vehicle are also great, so that fluctuations of torque are unlikely to be perceived by a driver or occupant. Therefore, by permitting the drive mode shift from the "second mode" to the "third mode" when the vehicle speed SPD is in such a range (torque fluctuation permission range), the degradation of vehicle drivability resulting from the drive mode shift can be reduced.

In this embodiment, therefore, for the drive mode switching, it is determined whether "condition 1" is fulfilled (whether the vehicle speed SPD is in the torque fluctuation permission range). Specifically, in the process of step T260, whether "condition 1" is fulfilled may be determined by comparing the measured vehicle speed SPDM and a lower-limit vehicle speed SPDUL.

The lower-limit vehicle speed SPDUL corresponds to the lowest vehicle speed SPD of the vehicle speeds SPD within the torque fluctuation permission range. That is, if the vehicle speed SPD is less than the lower-limit vehicle speed SPDUL, the vehicle speed SPD is not within the torque fluctuation permission range. Conversely, if the vehicle speed SPD is greater than or equal to the lower-limit vehicle speed SPDUL, the vehicle speed SPD is within the torque fluctuation permission range. Incidentally, in this embodiment, a lower-limit vehicle speed SPDUL may be determined empirically.

Through the determination process regarding "condition 1" in step T260, the electronic control apparatus 9 makes a determination with regard to the drive mode shift as follows.
- (a) If the measured vehicle speed SPDM is greater than or equal to the lower-limit vehicle speed SPDUL, the vibrations of the engine 1 and the vehicle are relatively great, and therefore the electronic control apparatus 9 determines that degradation of vehicle drivability will not result even if torque fluctuation is caused by the shift from the "second mode" to the "third mode".
- (b) If the measured vehicle speed SPDM is less than the lower-limit vehicle speed SPDUL, the electronic control apparatus 9 determines that there is a risk that degradation of vehicle drivability may result from torque fluctuation caused by the shift form the "second mode" to the "third mode".

[2] Regarding "Condition 2"

When the operation state of the engine 1 is a transitional operation state, the vibrations of the engine 1 and the vehicle are great, so that torque fluctuations are unlikely to be perceived by a driver or other occupants. Therefore, if the shift from the "second mode" to the "third mode" is performed during the transitional operation state of the engine 1, it is possible to curb the degradation of vehicle drivability caused by the drive mode shift.

In this embodiment, therefore, for the drive mode switching, it is determined whether "condition 2" is fulfilled. Specifically, in the process of step T260, whether "condition 2" is fulfilled is determined through comparison between the amount of change of the intake rate GAP (intake rate change amount $\Delta$GAP) and a reference change amount $\Delta$GAPX.

The reference change amount $\Delta$GAPX corresponds to the smallest intake rate change amount $\Delta$GAP among the intake rate change amounts $\Delta$GAP that cause the operation state of the engine 1 to become a transitional operation state. That is, if the intake rate change amount $\Delta$GAP is less than the reference change amount $\Delta$GAPX, the operation state of the engine 1 is a steady operation state. Conversely, if the intake rate change amount $\Delta$GAP is greater than or equal to the reference change amount $\Delta$GAPX, the operation state of the engine 1 is a transitional operation state. Incidentally, in this embodiment, the reference change amount $\Delta$GAPX may be set based on empirical determinations.

Through the determination process regarding "condition 2" in step T260, the electronic control apparatus 9 makes a determination with regard to the drive mode shift as follows.
- (a) If the intake rate GAP is greater than or equal to the reference change amount $\Delta$GAPX, the vibrations of the engine 1 and the vehicle are relatively great, and therefore the electronic control apparatus 9 determines that degradation of vehicle drivability will not result even if torque fluctuation is caused by the shift from the "second mode" to the "third mode".
- (b) If the intake rate GAP is less than the reference change amount $\Delta$GAPX, the electronic control apparatus 9 determines that there is a risk that degradation of vehicle drivability may result from torque fluctuation caused by the shift form the "second mode" to the "third mode".

[3] Regarding "Condition 3"

When the operation state of the engine 1 is a high-load operation state, the valve duration INCAM is set at an increased duration. In addition, when the "second mode" is selected, the valve duration INCAM is basically set at an duration that is greater than the duration set when the operation state of the engine 1 is an intermediate-load operation state or a low-load operation state. Therefore, if the shift from the "second mode" to the "third mode" is performed when the operation state of the engine 1 is a high-load operation state, the amount of change of the valve duration INCAM involved in the drive mode shift decreases, and therefore it becomes possible to curb the degradation of vehicle drivability caused by the drive mode shift.

In this embodiment, therefore, for the drive mode switching, it is determined whether "condition 3" is fulfilled. Specifically, in the process of step T260, whether "condition 3" is fulfilled is determined through comparison between the intake rate GAP and a first intake rate GAPX1.

The first intake rate GAPX1 corresponds to the smallest intake rate GAP among the intake rates GAP that cause the operation state of the engine 1 to become a high-load operation state. That is, when the intake rate GAP is less than the first intake rate GAPX1, the operation state of the engine 1 is not a high-load operation state. Conversely, when the intake rate GAP is greater than or equal to the first intake rate GAPX1, the operation state of the engine 1 is a high-load operation state. Incidentally, in this embodiment, the first intake rate GAPX1 is pre-set through experiments or the like.

Through the determination process regarding "condition 3" in step T260, the electronic control apparatus 9 makes a determination with regard to the drive mode shift as follows.
- (a) If the intake rate GAP is greater than or equal to the reference change amount $\Delta$GAPX, the change amount of the valve duration INCAM at the time of drive mode shift is relatively small, and therefore the electronic control apparatus 9 determines that degradation of vehicle drivability will not result even if torque fluctuation is caused by the shift from the "second mode" to the "third mode".
- (b) If the intake rate GAP is less than the reference change amount $\Delta$GAPX, the electronic control apparatus 9 determines that there is a risk that degradation of vehicle drivability may result from torque fluctuation caused by the shift form the "second mode" to the "third mode".

[4] Regarding "Condition 4"

At the time of the drive mode shift, the deviation between the actual intake airflow amount GA and the target intake airflow amount GAtrg may increase, that is, the actual intake airflow amount GA may become considerably less than the target intake airflow amount GAtrg, thus stalling the engine. However, during a state where the load on the engine 1 is relatively large (when the operation state of the engine 1 is not a low-load operation state), a temporary increase in the intake airflow amount GA, if any, will not stall the engine. Incidentally, examples of the low-load operation state include an idle operation state.

In this embodiment, therefore, for the drive mode switching, it is determined whether "condition 4" is fulfilled. Specifically, in the process of step T260, whether "condition 4" is fulfilled is determined through comparison between the intake rate GAP and a second intake rate GAPX2.

The second intake rate GAPX2 corresponds to the largest intake rate GAP among the intake rates GAP that cause the operation state of the engine 1 to become a low-load operation state. That is, when the intake rate GAP is less than or equal to the second intake rate GAPX2, the operation state of the engine 1 is a low-load operation state. Conversely, when the intake rate GAP is greater than the second intake rate GAPX2, the operation state of the engine 1 is not a low-load operation state. Incidentally, in this embodiment, the second intake rate GAPX2 may be set based on empirical determinations. In addition, the second intake rate GAPX2 is set at a smaller value than the first intake rate GAPX1.

Through the determination process regarding "condition 4" in step T260, the electronic control apparatus 9 makes a determination with regard to the drive mode shift as follows.

(a) If the intake rate GAP is less than or equal to the second intake rate GAPX2, the electronic control apparatus 9 determines that there is a risk of an engine stall occurring when the actual intake airflow amount GA becomes considerably less than the target intake airflow amount GAtrg at the time of shift from the "second mode" to the "third mode".

(b) If the intake rate GAP is greater than the second intake rate GAPX2, the electronic control apparatus 9 determines that there is no risk of occurrence of an engine stall even if the actual intake airflow amount GA becomes considerably less than the target intake airflow amount GAtrg at the time of shift from the "second mode" to the "third mode".

<Third Variable Valve Mechanism Driving Process>

Figure 22:
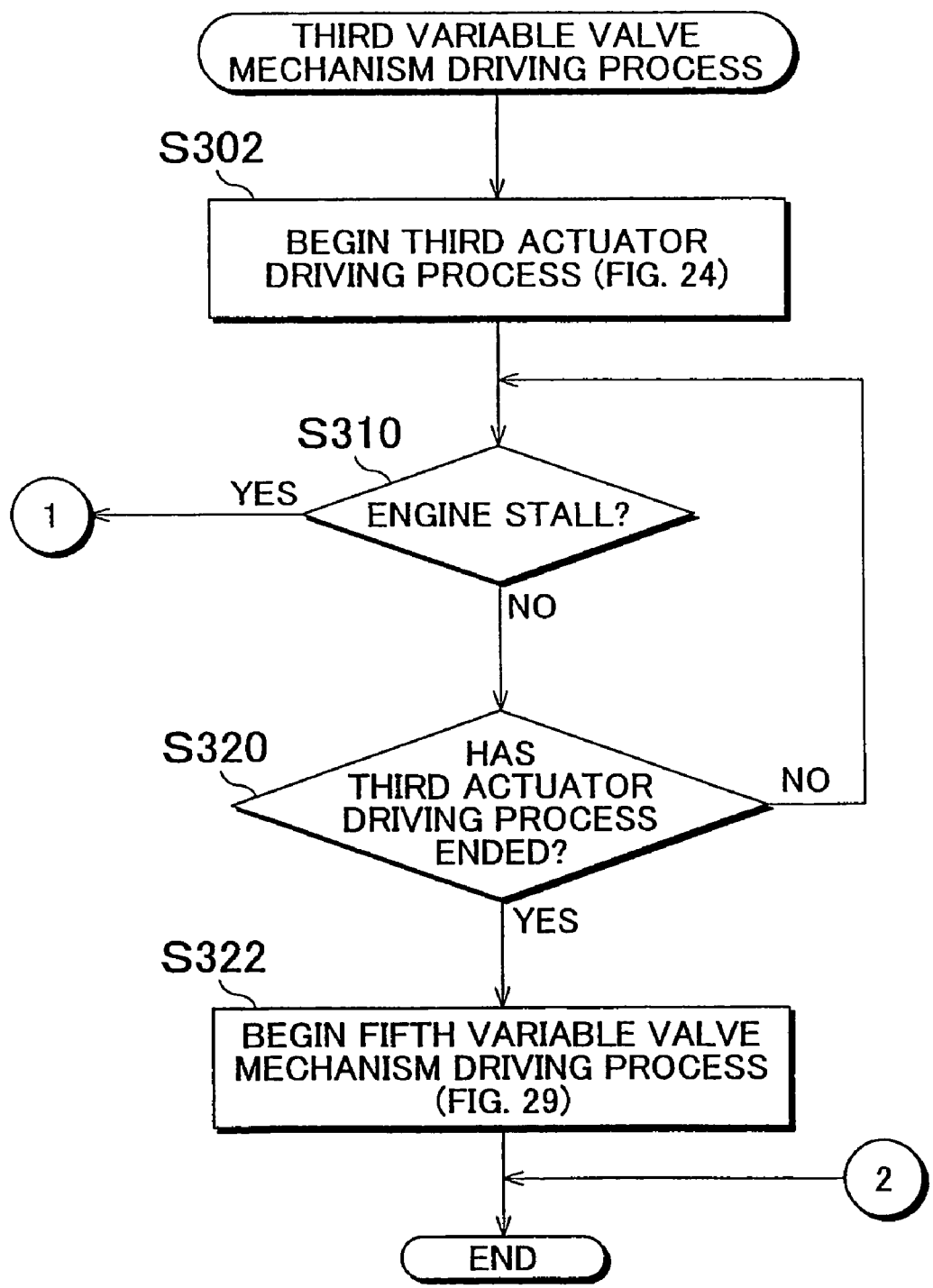
FIG. 22 is a flowchart showing a processing procedure of a "third variable valve mechanism driving process" executed via the electronic control apparatus of the embodiment.
Figure 23:
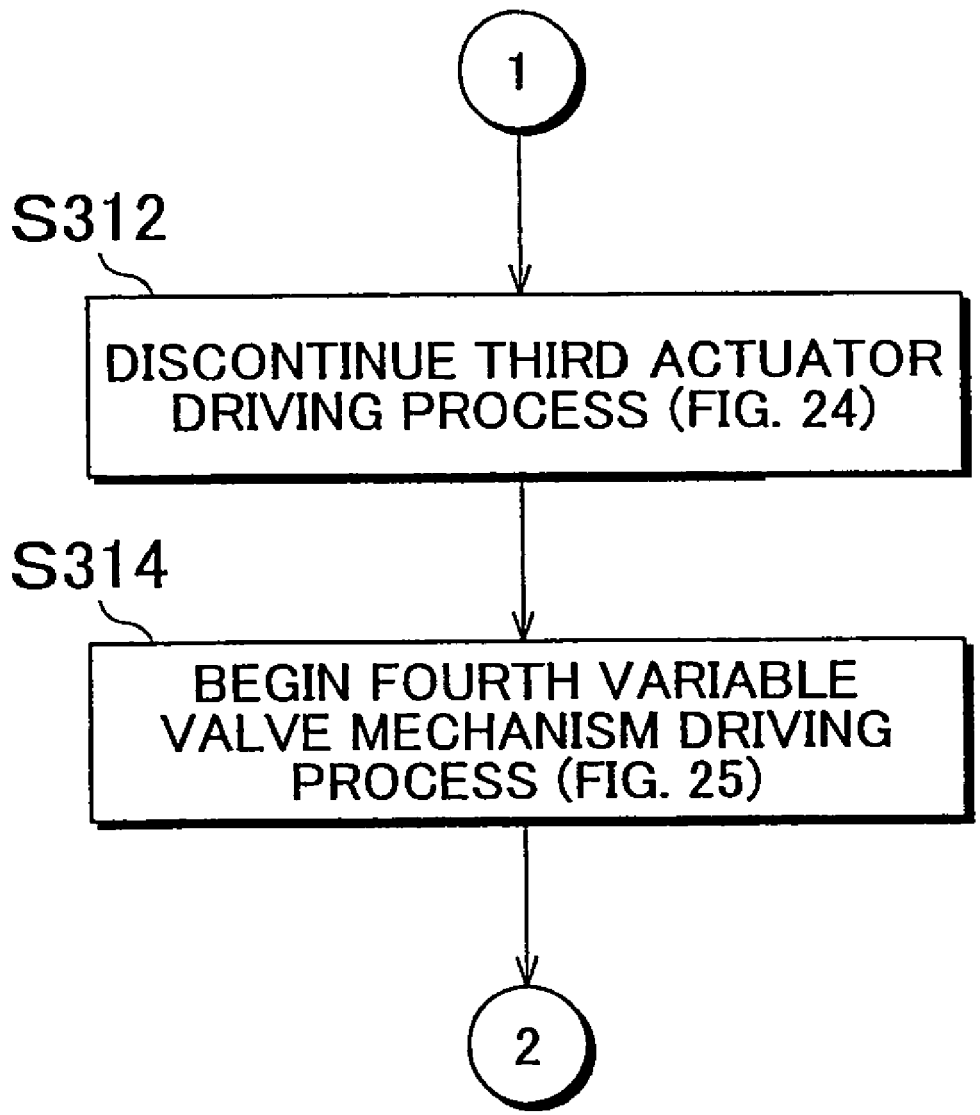
FIG. 23 is a flowchart showing another processing procedure of the "third variable valve mechanism driving process" executed via the electronic control apparatus of the embodiment.

With reference to FIGS. 22 and 23, the "third variable valve mechanism driving process" will be described. Step S302: The "third actuator driving process" (FIG. 24) begins. The detailed processing procedure of the "third actuator driving process" will be described later.

Step S310: It is determined whether an engine stall has occurred. If an engine stall has occurred, the process of step S312 (FIG. 23) is performed. If an engine stall has not occurred, the process of step S320 is performed.

Step S312: The presently executed driving process of the electric actuator 5A, that is, the "third actuator driving process", ceases. Step S314: The "fourth variable valve mechanism driving process" (FIG. 25) begins, and the "third variable valve mechanism driving process" ends. That is, the drive mode of the variable valve mechanism 5 switches from the "third mode" to the "fourth mode".

Step S320: It is determined whether the "third actuator driving process" has ended. If this driving process has ended, the process of step S322 is performed. If this driving process has not ended, the process of step S310 is performed again.

Step S322: The "fifth variable valve mechanism driving process" (FIG. 29) begins, and the "third variable valve mechanism driving process" ends. That is, the drive mode of the variable valve mechanism 5 switches from the "third mode" to the "fifth mode".

<Third Actuator Driving Process>

Figure 24:
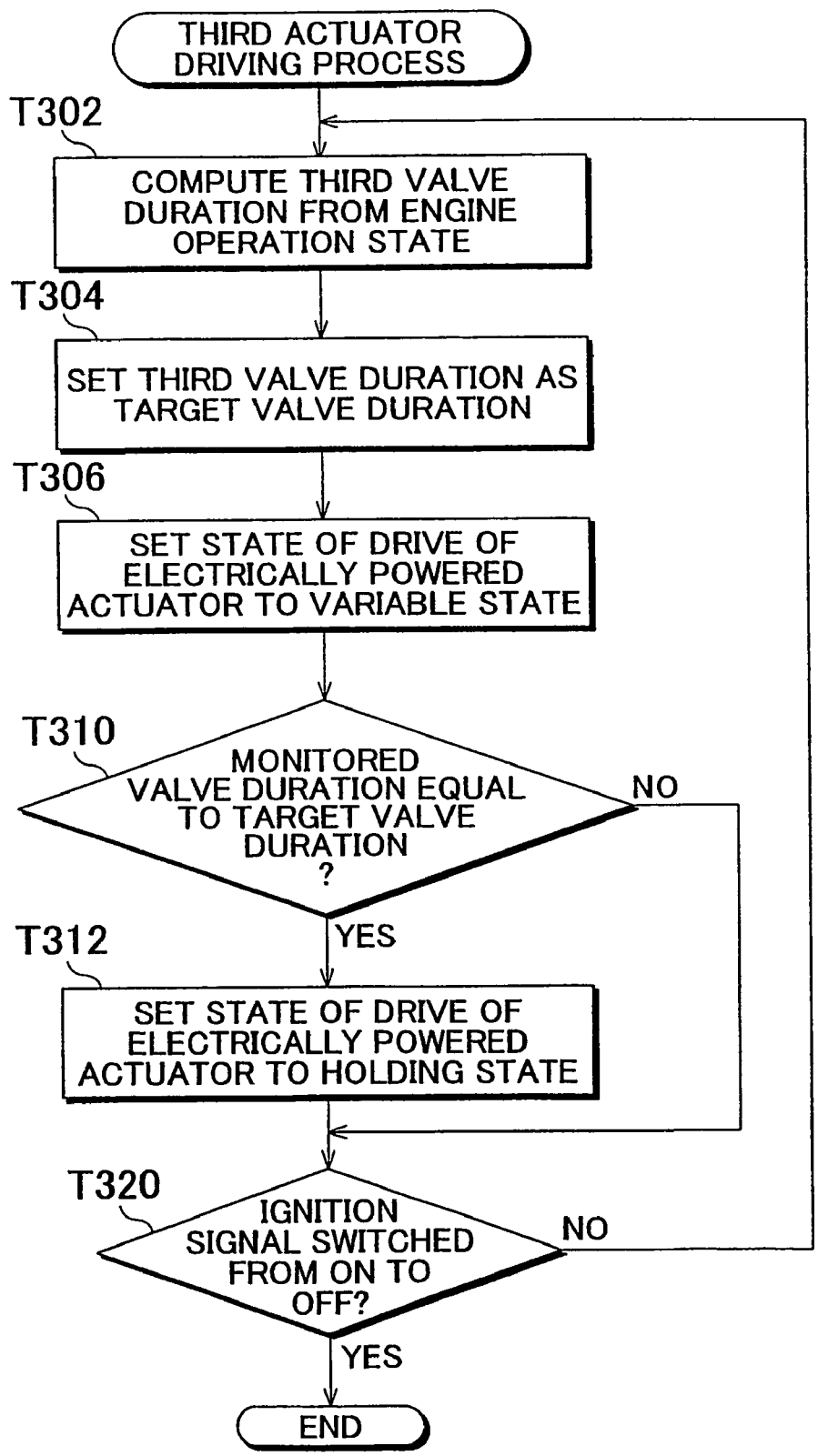
FIG. 24 is a flowchart showing a processing procedure of a "third actuator driving process" executed via the electronic control apparatus of the embodiment.

With reference to FIG. 24, the "third actuator driving process" will be described. Step T302: A valve duration INCAM (third valve duration INCAMthd) suitable for the present operation state of the engine 1 is computed.

In the process of step T302, a valve duration INCAM needed in order to converge the intake airflow amount measured value GAM to a target intake airflow amount GAtrg is computed as a third valve duration INCAMthd.

Step T304: The third valve duration INCAMthd is set as a target valve duration INCAMtrg. Step T306: The state of drive of the electric actuator 5A is set to the "variable state".

Then, the electric actuator 5A is controlled so that the valve duration INCAM becomes equal to the third valve duration INCAMthd.

Step T310: It is determined whether the monitored valve duration INCAMmnt is equal to the target valve duration INCAMtrg (third valve duration INCAMthd). If the monitored valve duration INCAMmnt is equal to the third valve duration INCAMthd, the process of step T312 is performed. If the monitored valve duration INCAMmnt is not equal to the third valve duration INCAMthd, the process of step T320 is performed.

Step T312: The state of drive of the electric actuator 5A switches from the "variable state" to the "holding state". Therefore, the state where the valve duration INCAM is set at the third valve duration INCAMthd is maintained.

Step T320: It is determined whether the ignition signal IG has switched from the on state to the off state. If the ignition signal IG has switched from the on state to the off state, the "third actuator driving process" ends. If the ignition signal IG has not switched from the on state to the off state, the process of step T302 is performed again.

<Fourth Variable Valve Mechanism Driving Process>

Figure 25:
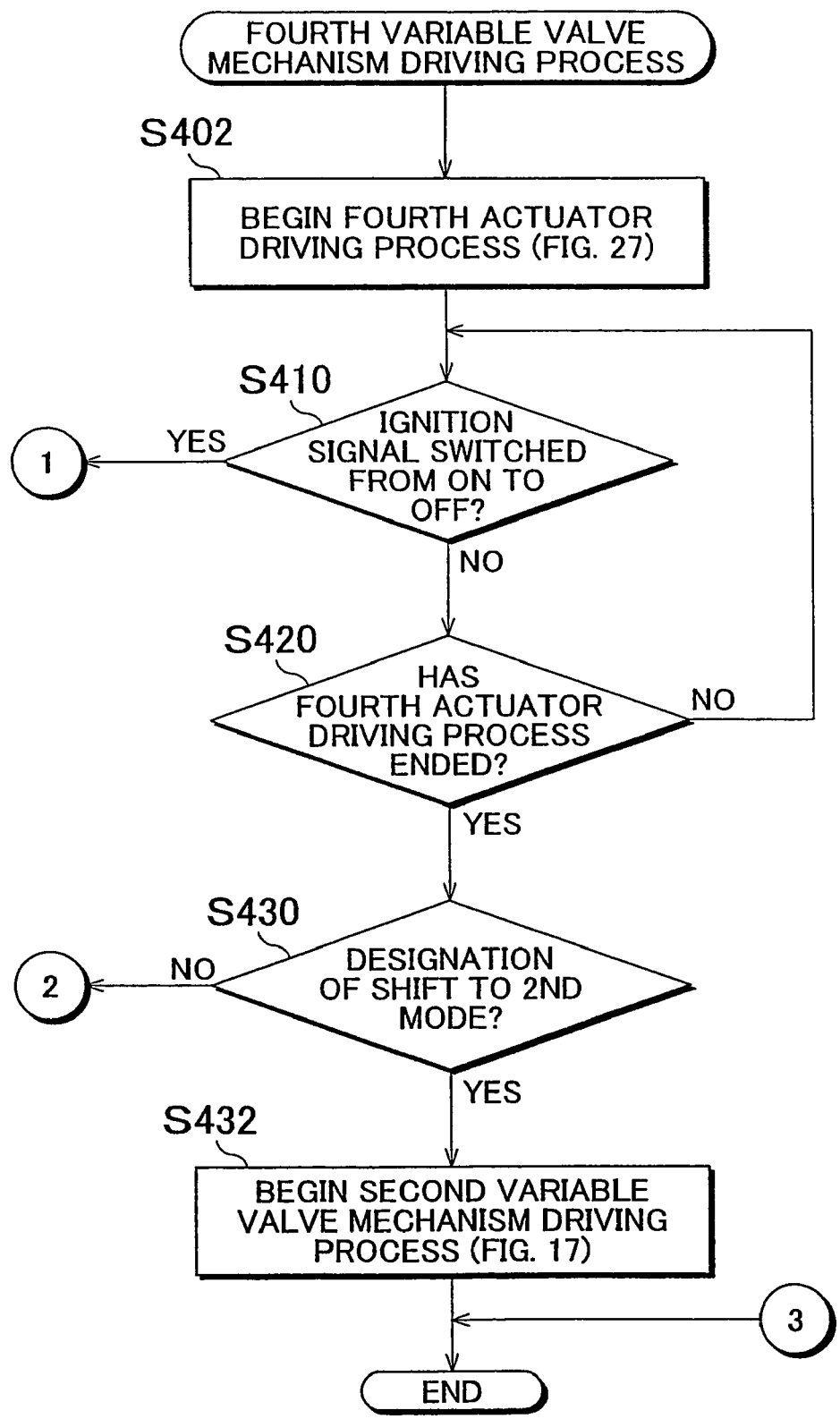
FIG. 25 is a flowchart showing a processing procedure of a "fourth variable valve mechanism driving process" executed via the electronic control apparatus of the embodiment.
Figure 26:
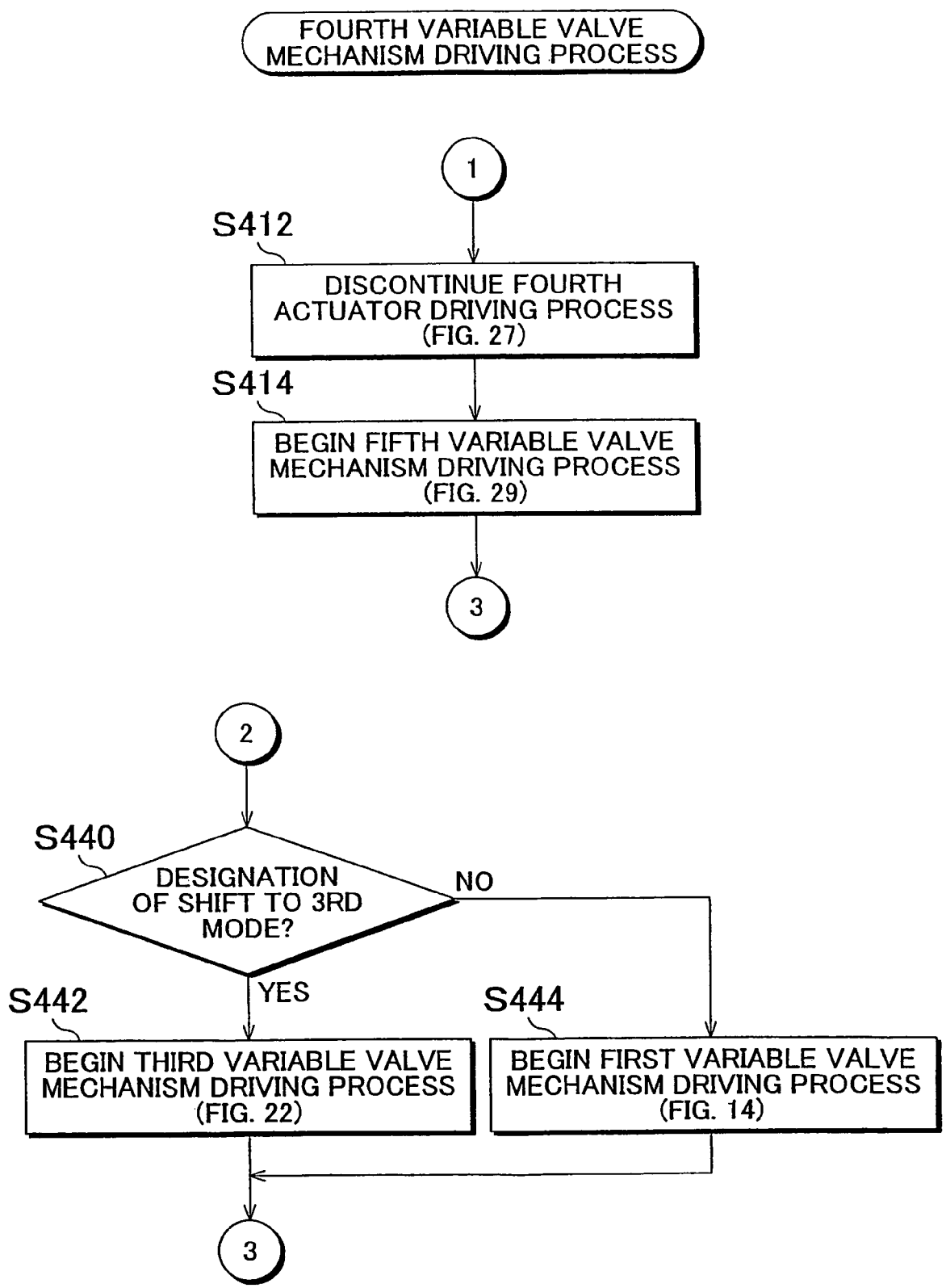
FIG. 26 is a flowchart showing another processing procedure of the "fourth variable valve mechanism driving process" executed via the electronic control apparatus of the embodiment.

With reference to FIGS. 25 and 26, the "fourth variable valve mechanism driving process" will be described. Step S402: The "fourth actuator driving process" (FIG. 27) begins. The detailed processing procedure of the "fourth actuator driving process" will be described later.

Step S410: It is determined whether the ignition signal IG has switched from the on state to the off state. If the ignition signal IG has switched from the on state to the off state, the process of step S412 (FIG. 26) is performed. If the ignition signal IG has not switched from the on state to the off state, the process of step S420 is performed.

Step S412: The presently executed driving process of the electric actuator 5A, that is, the "fourth actuator driving process", ceases. Step S414: The "fifth variable valve mechanism driving process" (FIG. 29) begins, and the "fourth variable valve mechanism driving process" ends. That is, the drive mode of the variable valve mechanism 5 switches from the "fourth mode" to the "fifth mode".

Step S420: It is determined whether the "fourth actuator driving process" has ended. If this driving process has ended, the process of step S430 is performed. If this driving process has not ended, the process of step S410 is performed again.

Step S430: It is determined whether the shift to the "second mode" has been designated through the "fourth actuator driving process". If the shift to the "second mode" has been designated, the process of step S432 is performed. If the shift to the "second mode" has not been designated, the process of step S440 (FIG. 26) is performed.

Step S432: The "second variable valve mechanism driving process" (FIG. 17) begins, and the "fourth variable valve mechanism driving process" ends. That is, the drive mode of the variable valve mechanism 5 switches from the "fourth mode" to the "second mode".

Step S440: It is determined whether the shift to the "third mode" has been designated through the "fourth actuator driving process". If the shift to the "third mode" has been designated, the process of step S442 is performed. If the shift to the "third mode" has not been designated, the process of step S444 is performed.

Step S442: The "third variable valve mechanism driving process" (FIG. 22) begins, and the "fourth variable valve mechanism driving process" ends. That is, the drive mode of the variable valve mechanism 5 switches from the "fourth mode" to the "third mode".

Step S444: The "first variable valve mechanism driving process" (FIG. 14) begins, and the "fourth variable valve mechanism driving process" ends. That is, the drive mode of the variable valve mechanism 5 switches from the "fourth mode" to the "first mode".

<Fourth Actuator Driving Process>

Figure 27:
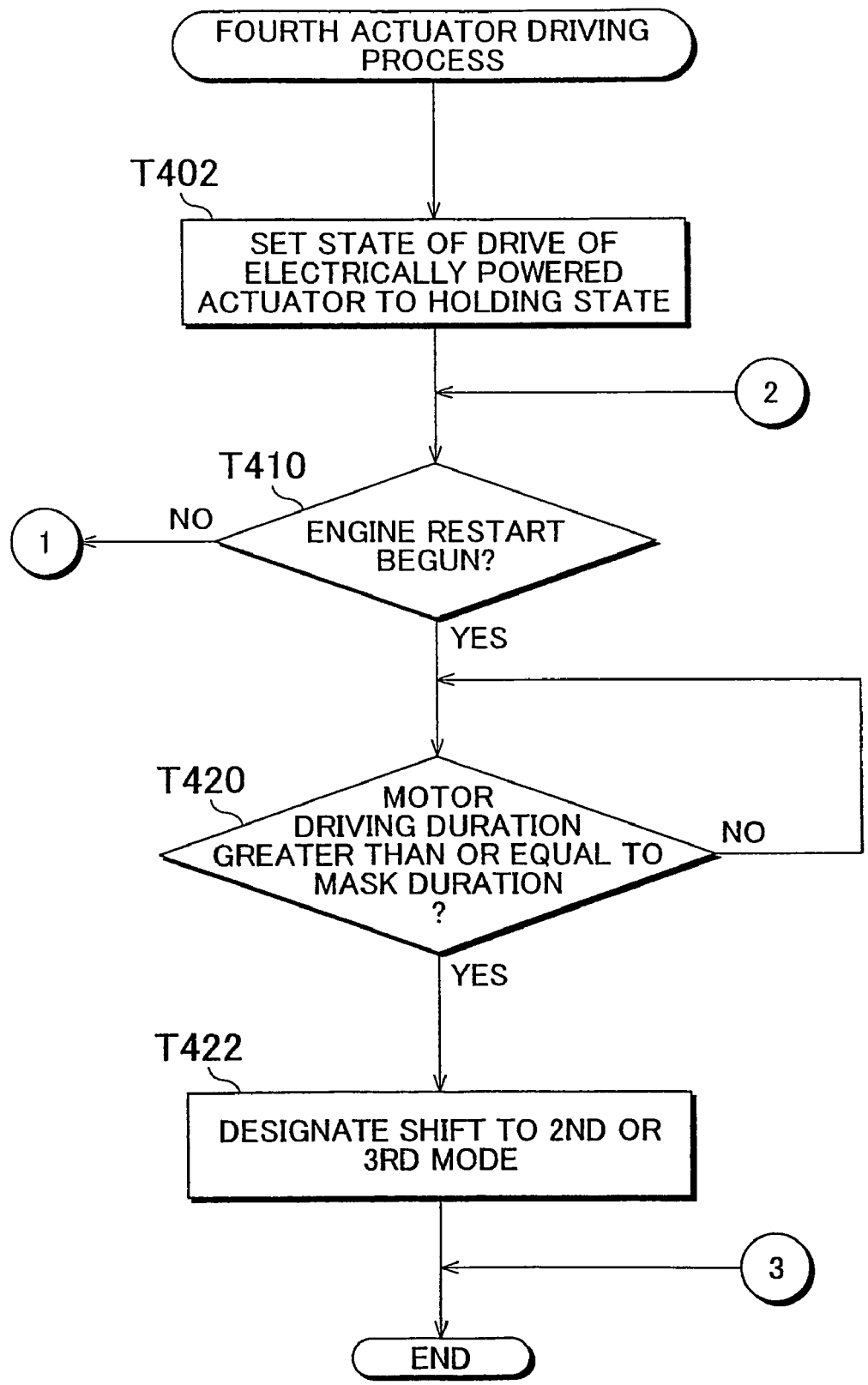
FIG. 27 is a flowchart showing a processing procedure of a "fourth actuator driving process" executed via the electronic control apparatus of the embodiment.
Figure 28:
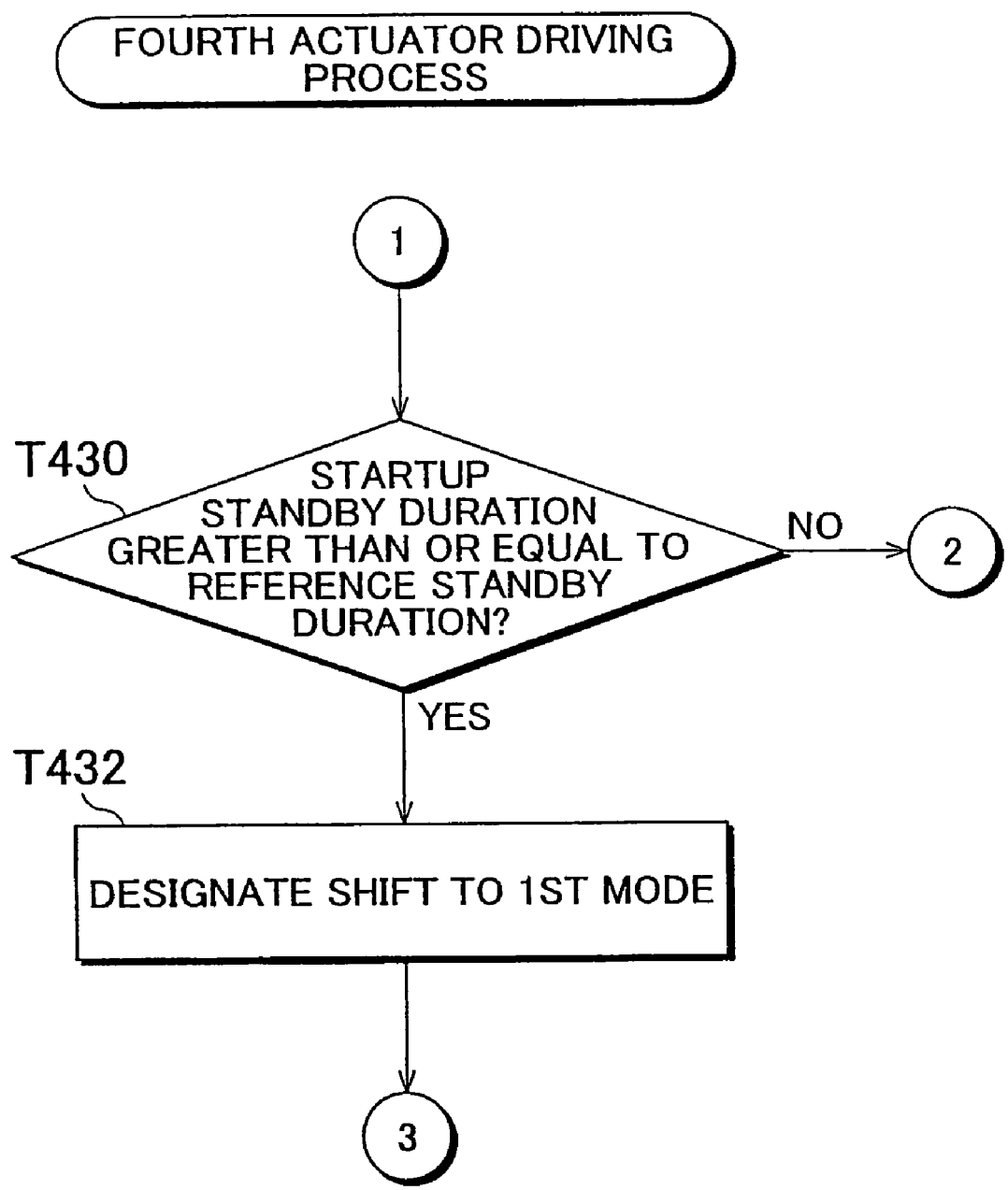
FIG. 28 is a flowchart showing another processing procedure of the "fourth actuator driving process" executed via the electronic control apparatus of the embodiment.

With reference to FIGS. 27 and 28, the "fourth actuator driving process" will be described.

Step T402: The state of drive of the electric actuator 5A is set to the "holding state".

If an engine stall occurs while the valve duration INCAM is being changed, the changing of the valve duration INCAM ceases; therefore, after the engine 1 is restarted, it is required that the changing of the valve duration INCAM be promptly resumed.

In step T402, if the engine 1 stops due to an engine stall, the electric actuator 5A is set at the "holding state", so that the changing of the valve duration INCAM can be promptly performed after the engine 1 has been restarted up.

It is to be noted herein that since the "fourth actuator driving process" is executed while the engine 1 is at a stop, the setting of the electric actuator 5A to the "holding state" in the process of step T402 is performed in a situation where the operating noise of the electric actuator 5A is relatively likely to be perceived by the driver or other occupants. However, the driver or the like is less apt to be annoyed by relatively low noises, such as the operating noise of the electric actuator 5A, when an engine stall has occurred, since it is only a short time after the shift from the state of the engine 1 being driven (a state where there is operating noise of the engine 1 which is sufficiently larger than the operating noise of the electric actuator 5A) to the state of the engine 1 being at a stop (a state where the production of operating noise from the engine 1 has ceased). Considering such a circumstance, the "fourth actuator driving process" is designed so as to allow the electric actuator 5A to be set to the "holding state" during a stop of the engine 1.

Step T410: It is determined whether the engine 1 is in the process of being restarted (the driving of the starter motor 11 has begun). If the engine 1 restart has begun is being restarted, the process of step T420 is performed. If the engine 1 is not in the process of being restarted, the process of step T430 (FIG. 28) is performed.

Step T420: It is determined whether the driving duration of the starter motor 11 (the elapsed time following the beginning of the driving (motor driving duration TM)) is greater than or equal to the mask duration TMX. If the motor driving duration TM is greater than or equal to the mask duration TMX, the process of step T422 is performed. If the motor driving duration TM is less than the mask duration TMX, the process of step T420 is performed again.

Step T422: The drive mode to shift to following the end of the "fourth actuator driving process" is set.
  (a) If the "second mode" was selected prior to the occurrence of the engine stall (prior to the beginning of the "fourth variable valve mechanism driving process"), the "second mode" is set as the drive mode to shift to following the end of the "fourth actuator driving process".
  (b) If the "third mode" was selected prior to the occurrence of the engine stall (prior to the beginning of the "fourth variable valve mechanism driving process"), the "third mode" is set as the drive mode to shift to following the end of the "fourth actuator driving process".

Step T430: It is determined whether the elapsed time from the occurrence of the engine stall (startup standby duration TS) is greater than or equal to a reference standby duration TSX. If an engine stall occurs, the engine 1 is restarted after some time in usual cases. In some cases, however, the restart of the engine 1 is not performed for a long time. In such cases, it may be desirable to set the electric actuator 5A to the "standby state" so as to reduce the consumption of electric power from the battery 12 rather than continue the "holding state" of the electric actuator 5A so as to remain ready for restart of the engine 1.

Therefore, in the process of step T430, it is determined whether restart of the engine 1 is likely to be performed soon by comparing the startup standby duration TS with the reference standby duration TSX. Incidentally, the reference standby duration TSX is pre-set as a standard duration from occurrence of an engine stall to the beginning of restart of the engine 1.

Through the determination process of step T430, the electronic control apparatus 9 makes a determination regarding restart of the engine 1 as follows.
  (a) If the startup standby duration TS is greater than or equal to the reference standby duration TSX, the electronic control apparatus 9 determines that the likelihood of restarting the engine 1 soon is small. That is, the electronic control apparatus 9 determines that it is desirable to set the electric actuator 5A to the "standby state". If this determination result is obtained, the process of step T432 is performed.
  (b) If the startup standby duration TS is less than the reference standby duration TSX, the electronic control apparatus 9 determines that the likelihood of restarting the engine 1 soon is large. That is, the electronic control apparatus 9 determines that it is desirable to continue the "holding state" of the electric actuator 5A. If this determination result is obtained, the process of step T410 is performed again.

Step T432: The "first mode" is set as the drive mode to shift to following the end of the "fourth actuator driving process". Therefore, in a process that follows this step, the electric actuator 5A is set to the "standby state" through the "first actuator driving process".

<Fifth Variable Valve Mechanism Driving Process>

Figure 29:
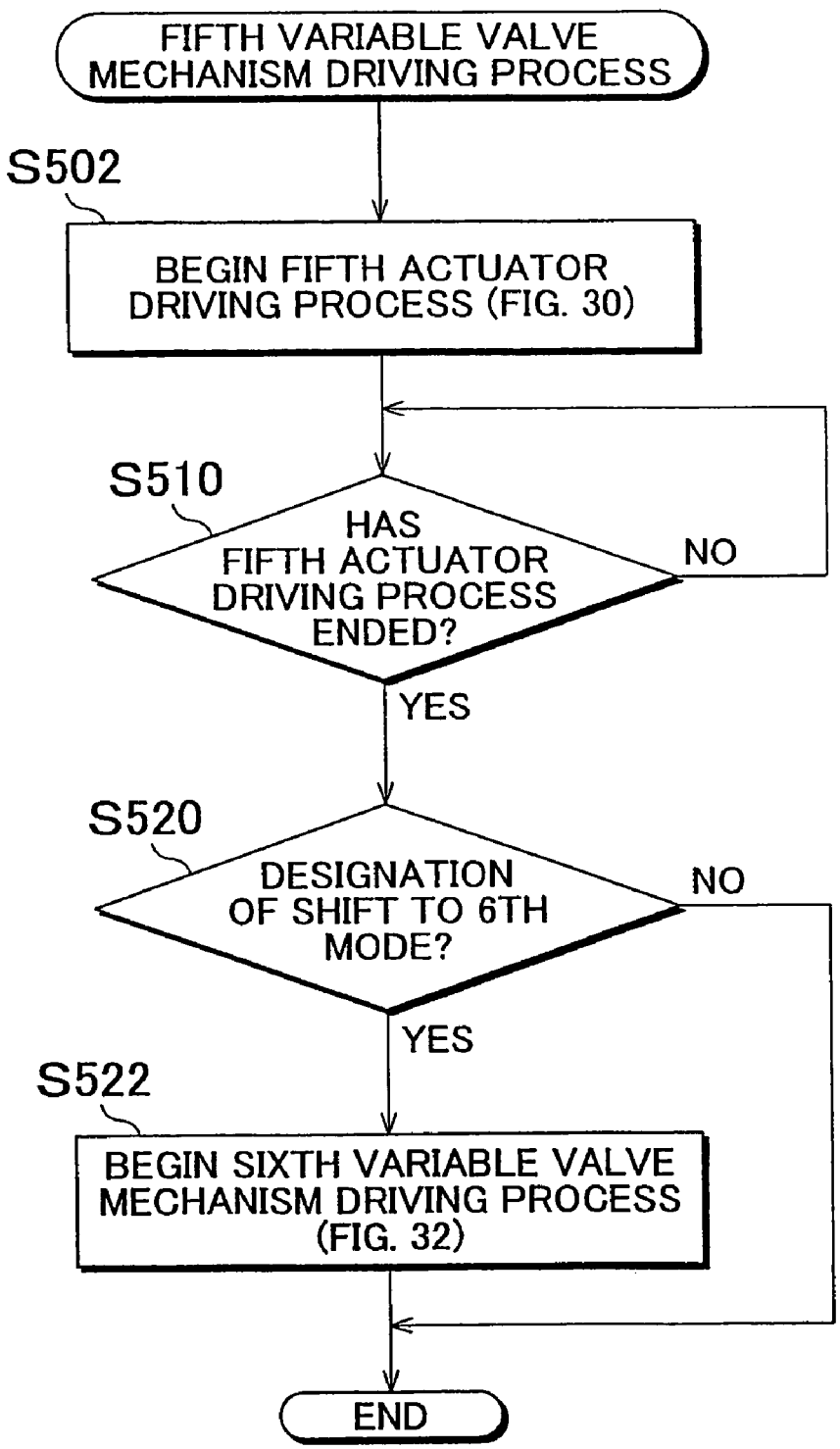
FIG. 29 is a flowchart showing a processing procedure of a "fifth variable valve mechanism driving process" executed via the electronic control apparatus of the embodiment.

With reference to FIG. 29, the "fifth variable valve mechanism driving process" will be described. Step S502: The "fifth actuator driving process" (FIG. 30) begins. Incidentally, the "fifth actuator driving process" will be described in detail later.

Step S510: It is determined whether the "fifth actuator driving process" has ended. If this driving process has ended, the process of step S520 is performed. If this driving process has not ended, the process of step S510 is performed again.

Step S520: It is determined whether the shift to the "sixth mode" has been designated through the "fifth actuator driving process". If the shift to the "sixth mode" has been designated, the process of step S522 is performed. If the shift to the "sixth mode" has not been designated, the "fifth variable valve mechanism driving process" ends.

Incidentally, if the driving of the electronic control apparatus 9 continues, the end of the "fifth variable valve mechanism driving process" as a result of the negative determination in the process of step S520 is followed by the beginning of the "first variable valve mechanism driving process".

Step S522: The "sixth variable valve mechanism driving process" (FIG. 32) begins, and the "fifth variable valve mechanism driving process" ends. That is, the drive mode of the variable valve mechanism 5 switches from the "fifth mode" to the "sixth mode".

<Fifth Actuator Driving Process>

Figure 30:
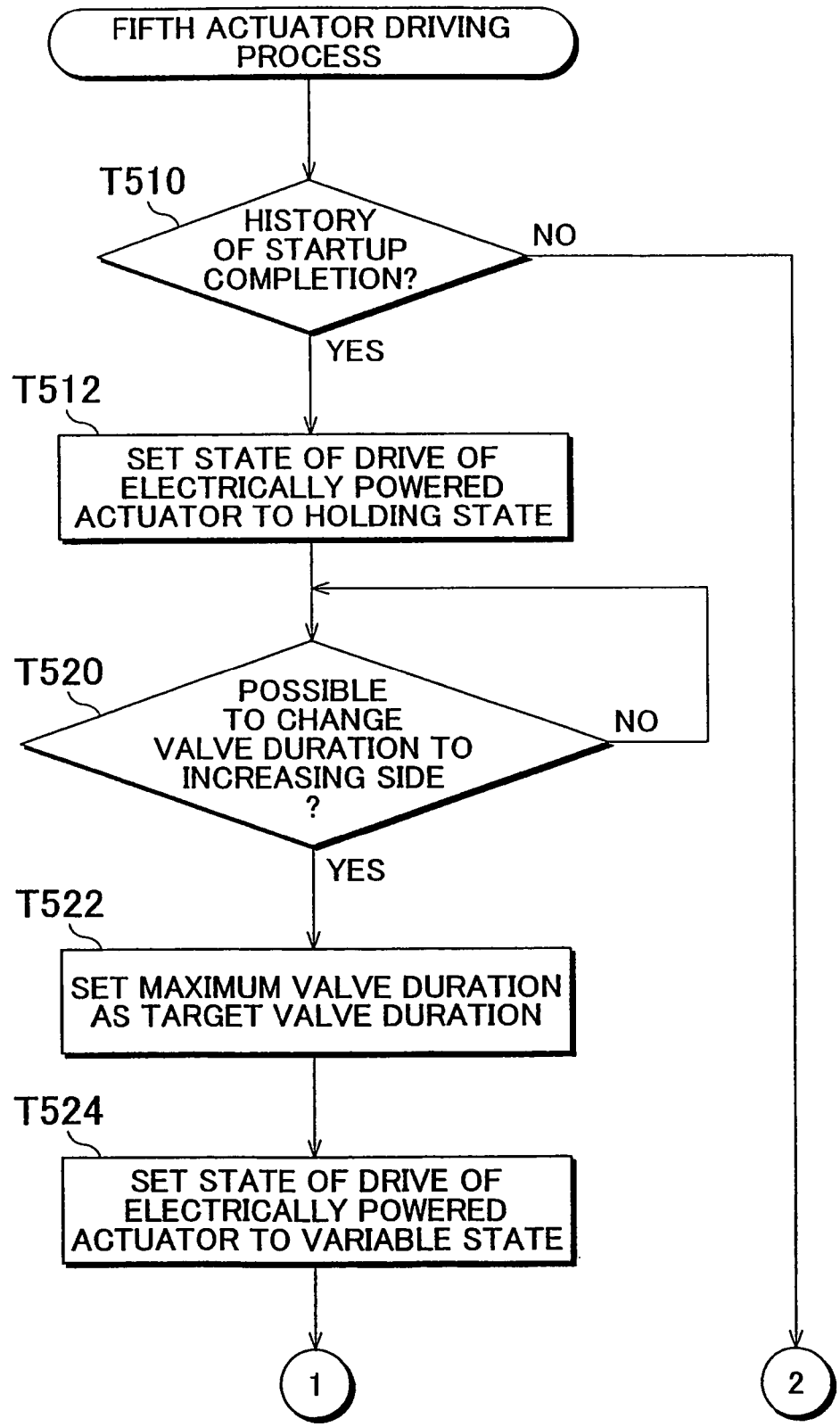
FIG. 30 is a flowchart showing a processing procedure of a "fifth actuator driving process" executed via the electronic control apparatus of the embodiment.
Figure 31:
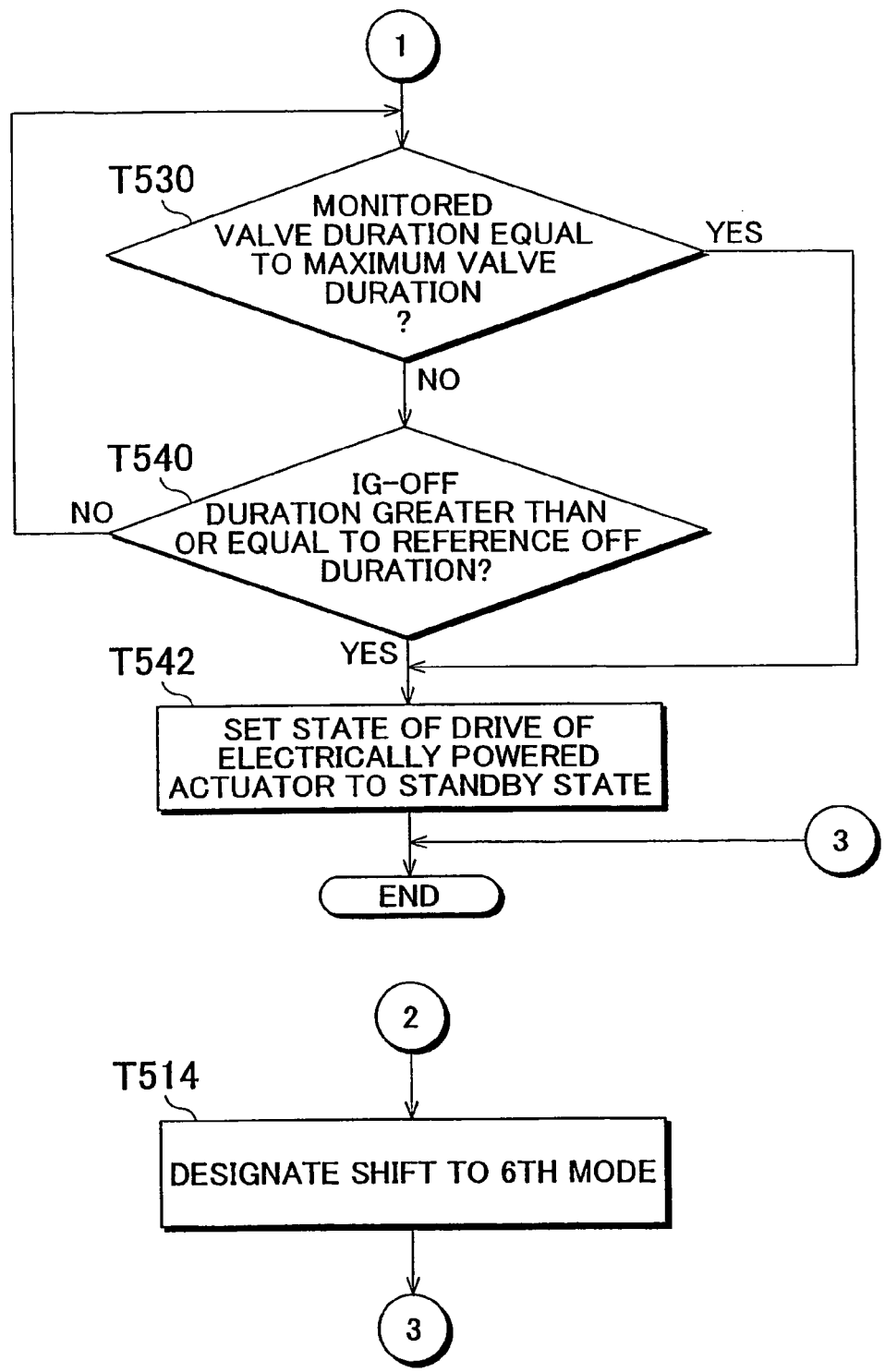
FIG. 31 is a flowchart showing another processing procedure of the "fifth actuator driving process" executed via the electronic control apparatus of the embodiment.

With reference to FIGS. 30 and 31, the "fifth actuator driving process" will be described. In the vehicle, it can happen that it is impossible to change the valve duration INCAM at the time of starting up the engine 1, due to occurrence of an abnormality in the electric actuator 5A during the stop of the engine 1. If in such a case, the valve duration INCAM is set equal to or close to the minimum valve duration INCAMmin, it is conceivable that at the time of startup of the engine 1, the amount of air supplied to the combustion chamber 24 will become insufficient, thus leading to a startup failure.

Therefore, in order to make it possible to start up the engine 1 even if the electric actuator 5A has an abnormality, this embodiment is designed such that the "fifth actuator driving process" is performed when the "fifth mode" has been selected.

In the "fifth actuator driving process", when a drive of the vehicle ends, the valve duration INCAM is set at a maximum valve duration INCAMmax so as to be ready for the next drive. Therefore, even if an abnormality of the electric actuator 5A occurs, insufficient air supply is substantially prevented at the time of startup of the engine 1, thus improving the engine startability.

Step T510: It is determined whether the startup of the engine 1 has been completed before the ignition switch 97 is switched to the "OFF" position (whether such an operation history exists). In the other words, It is determined whether the engine has failed to start before the ignition switch 97 is switched to the "OFF" position.

In the process of step T510, it is determined that such an operation history exists provided that the startup completion flag eST has been set in the on state. The ignition switch 97 is usually switched from the "ON" position to the "OFF" position when a driver is finished driving the vehicle. In some cases, however, the ignition switch 97 may be switched to the "OFF" position before the driver is finished driving the vehicle.

In the latter case, the engine 1 is started within a relatively short time. Therefore the risk of an abnormality of the electric actuator 5A occurring during the time from the switching of the ignition switch 97 to the "OFF" position up to the restart of the engine 1 is likely to be very small. That is, it is considered that even if the valve duration INCAM is not changed to the maximum valve duration INCAMmax on the basis of the switching of the ignition switch 97 to the "OFF" position, there is no risk of a start failure due to insufficient air supply. In addition, changing the valve duration INCAM to the maximum valve duration INCAMmax in such a situation would mostly turn out to be unnecessary consumption of electric power from the battery 12, since the valve duration INCAM is changed to a target valve duration INCAMtrg suitable for the operation state immediately after the engine 1 is started.

Consequently, it may be preferable that the valve duration INCAM be not changed to the maximum valve duration INCAMmax in the case where the ignition switch 97 has been switched to the "OFF" position when the driver does not intend to finish driving the vehicle.

Therefore, in the process of step T510, it is determined whether the switching of the ignition switch 97 to the "OFF" position is an operation performed because the driver is finished driving the vehicle on the basis of the operation history of the engine 1.

Through the determination process of step T510, the electronic control apparatus 9 makes a determination regarding the operation of the ignition switch 97 as follows.

(a) If the startup completion flag eST is on, the electronic control apparatus 9 determines that the driver has switched the ignition switch 97 to the "OFF" position because the driver is finished driving the vehicle. That is, the electronic control apparatus 9 determines that it is unlikely that the engine 1 will be started again within a short time. If this determination result is obtained, the determination process of step T520 is performed.

(b) If the startup completion flag eST is off, the electronic control apparatus 9 determines that the ignition switch 97 has been switched to the "OFF" position before the driver is finished driving the vehicle. That is, the electronic control apparatus 9 determines that there is some likelihood of the engine 1 being started again within a short time. If this determination result is obtained, the process of step T514 is performed.

Step T512: The state of drive of the electric actuator 5A is set to the "holding state". Step T514: The shift from the "fifth mode" to the "sixth mode" is designated, and the "fifth actuator driving process" ends.

Step T520: It is determined whether the state of the engine 1 is a state where a change of the valve duration INCAM to an increasing side can be allowed (change allowable state). In the process of step T520, it is determined that the state of the engine 1 is the change allowable state provided that the vehicle speed measured value SPDM is less than a reference vehicle speed SPDX.

If the valve duration INCAM is changed toward the maximum valve duration INCAMmax while the engine speed NE is excessively great, the thus-increased intake airflow amount GA may result in combustion of fuel remaining in the combustion chamber 24. In this case, even though the driver may want to stop the vehicle, the engine speed NE increases, which may cause discomfort to the driver.

Therefore, in the process of step T520, it is determined whether the state of the engine 1 is the aforementioned change allowable state by comparing the vehicle speed measured value SPDM with the reference vehicle speed SPDX. Incidentally, the reference vehicle speed SPDX may be set based on empirical determinations.

Through the determination process of step T520, the electronic control apparatus 9 makes a determination regarding the changing of the valve duration INCAM as follows.

(a) If the vehicle speed measured value SPDM is less than the reference vehicle speed SPDX, the electronic control apparatus 9 determines that there is no risk that increasing the valve duration INCAM will cause an increase in the engine speed NE. If this determination result is obtained, the process of step T522 is performed.

(b) If the vehicle speed measured value SPDM is greater than or equal to the reference vehicle speed SPDX, the electronic control apparatus 9 determines that there is a risk that increasing the valve duration INCAM will cause an increase in the engine speed NE. If this determination result is obtained, the process of step T520 is performed again.

Step T522: The maximum valve duration INCAMmax is set as a target valve duration INCAMtrg. Step T524: The state of drive of the electric actuator 5A is set to the "variable state". The, the electric actuator 5A is controlled so that the valve duration INCAM becomes equal to the maximum valve duration INCAMmax.

Step T530: It is determined whether the monitored valve duration INCAMmnt is equal to the target valve duration INCAMtrg (maximum valve duration INCAMmax). If the monitored valve duration INCAMmnt is equal to the maximum valve duration INCAMmax, the process of step T542 is performed. If the monitored valve duration INCAMmnt is not equal to the maximum valve duration INCAMmax, the process of step T540 is performed.

Step T540: It is determined whether the elapsed time from the switching of the ignition signal IG to the off state (IG-off duration Toff) is greater than a reference off duration ToffX. If the changing of the valve duration INCAM is performed when the engine speed NE is very low (equal to or close to "0"), the load that the electric actuator 5A receives when moving the control shaft 52 becomes considerably great, so that the electric actuator 5A may be damaged in conjunction with the changing of the valve duration INCAM.

Therefore, in the case where the valve duration INCAM is changed to the maximum valve duration INCAMmax on the basis of the switching of the ignition switch 97 to the "OFF" position, it is desirable to stop the changing of the valve duration INCAM regardless of the size of the valve duration INCAM after the engine speed NE has become less than a limit value (lower-limit rotation speed NEUL).

Incidentally, the lower-limit engine speed NEUL corresponds to the lowest engine speed among the engine speeds NE that, during the time of stopping the engine 1, make it possible to change the valve duration INCAM without an excessive increase of the load on the electric actuator 5A. That is, if the changing of the valve duration INCAM is performed when the engine speed NE is less than the lower-limit engine speed NEUL, there is a risk that the load on the electric actuator 5A will become excessively great. On the other hand, if the changing of the valve duration INCAM is performed when the engine speed NE is greater than or equal to the lower-limit engine speed NEUL, there is no risk that the load on the electric actuator 5A will become excessively great.

Considering such a circumstance, the process of step T540 is designed such that it is determined whether the engine speed NE is less than the lower-limit engine speed NEUL through comparison of the IG-off duration Toff with the reference off duration ToffX. Incidentally, the reference off duration ToffX is pre-set as a standard duration from the switching of the ignition switch 97 to the "OFF" position until the engine speed NE becomes less than the lower-limit engine speed NEUL.

Through the determination process of step T540, the electronic control apparatus 9 makes a determination regarding the changing of the valve duration INCAM as follows.

(a) If the IG-off duration Toff is greater than or equal to the reference off duration ToffX, the electronic control apparatus 9 determines that the engine speed NE is less than or equal to the lower-limit engine speed NEUL. That is, the electronic control apparatus 9 determines that there is a risk that continuation of the changing of the valve duration INCAM will damage of the electric actuator 5A. If this determination result is obtained, the process of step T542 is performed.

(b) If the IG-off duration Toff is less than the reference off duration ToffX, the electronic control apparatus 9 determines that the engine speed NE is grater than the lower-limit engine speed NEUL. That is, the electronic control apparatus 9 determines that there is no risk that continuation of the changing of the valve duration INCAM will damage of the electric actuator 5A. If this determination result is obtained, the process of step T530 is performed again.

Step T542: The state of drive of the electric actuator 5A switches from the "variable state" to the "standby state". Therefore, the supply of electric power to the electric actuator 5A stops. Furthermore, since the position of the control shaft 52 is mechanically fixed via a lock mechanism, movement of the control shaft 52 (i.e., change of the valve duration INCAM) is prevented during the stop of the engine 1.

<Sixth Variable Valve Mechanism Driving Process>

With reference to FIG. 32, the "sixth variable valve mechanism driving process" will be described. Step S602: The "sixth actuator driving process" (FIG. 33) begins. Incidentally, the "sixth actuator driving process" will be described in detail later.

Step S610: It is determined whether the "sixth actuator driving process" has ended. If this driving process has ended, the process of step S620 is performed. If this driving process has not ended, the process of step S610 is performed again.

Step S620: It is determined whether the shift to the "fourth mode" has been designated through the "sixth actuator driving process". If the shift to the "fourth mode" has been designated, the process of step S622 is performed. If the shift to the "fourth mode" has not been designated, the "sixth variable valve mechanism driving process" ends.

Incidentally, if the driving of the electronic control apparatus 9 is being continued, the end of the "sixth variable valve mechanism driving process" as a result of the negative determination in the process of step S620 is followed by the beginning of the "first variable valve mechanism driving process".

Step S622: The "fourth variable valve mechanism driving process" (FIG. 25) begins, and the "sixth variable valve mechanism driving process" ends. That is, the drive mode of the variable valve mechanism 5 switches from the "sixth mode" to the "fourth mode".

<Sixth Actuator Driving Process>

Figure 33:
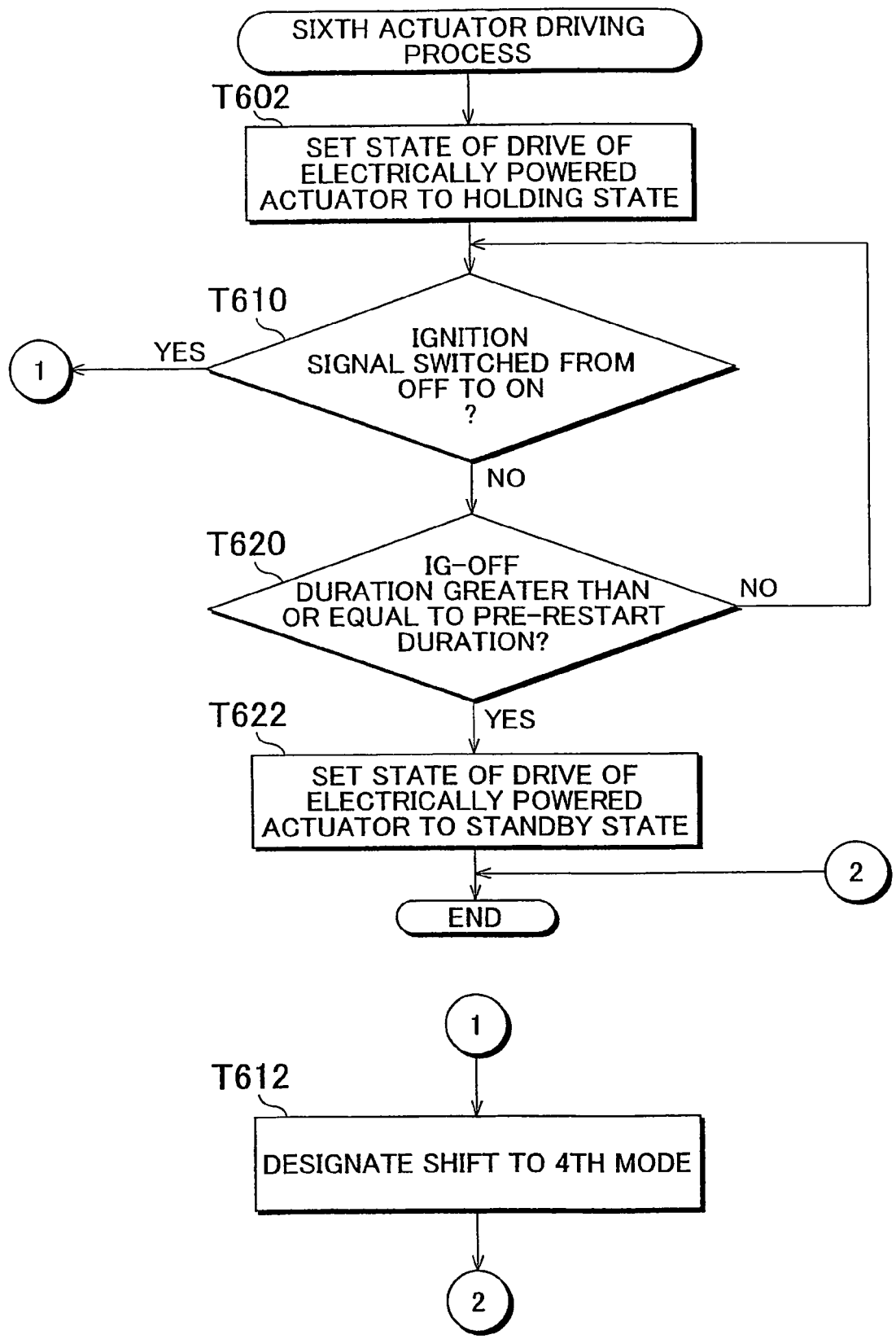
FIG. 33 is a flowchart showing a processing procedure of a "sixth actuator driving process" executed via the electronic control apparatus of the embodiment.

With reference to FIG. 33, the "sixth actuator driving process" will be described.

Step T602: The state of drive of the electric actuator 5A is set to the "holding state".

The situation at the beginning of the "sixth actuator driving process" is a situation where it is calculated that the engine 1 will be started within a short time.

Therefore, in step T602, by setting the electric actuator 5A to the "holding state", it becomes possible to promptly change the valve duration INCAM after the engine 1 is started.

It is to be noted herein that since the "sixth actuator driving process" is executed while the engine 1 is at a stop, the setting of the electric actuator 5A to the "holding state" in the process of step T602 is performed in a situation where the operating noise of the electric actuator 5A is relatively likely to be perceived by the driver or other occupants. However, the driver or occupant is less apt to be annoyed by relatively low noises, such as the operating noise of the electric actuator 5A or the like, when the "sixth mode" has been selected, since it is only a short time after the shift from the state of the starter motor 11 being driven (a state where there is operating noise of the engine 1 which is sufficiently larger than the operating noise of the electric actuator 5A) to the state of the starter motor 11 being at a stop (a state where the production of operating noise from the engine 1 has ceased). Therefore, the "sixth actuator driving process" is designed so as to allow the electric actuator 5A to be set to the "holding state" during stop of the engine 1.

Step T610: It is determined whether the ignition signal IG has switched from the off state to the on state. If the ignition signal IG has switched from the off state to the on state, the process of step T612 is performed. If the ignition signal IG has not switched from the off state to the on state, the process of step T620 is performed.

Step T612: The "first mode" is set as the drive mode to shift to after the "sixth actuator driving process" ends.

Step T620: It is determined whether the elapsed time from the switching of the ignition signal IG to the off state (IG-off duration Toff) is greater than or equal to a pre-restart duration ToffY If an operation history is not detected when the ignition switch 97 is switched to the "OFF" position, it is calculated that the driver is not finished driving, that is, it is calculated that the engine 1 will be started within a short time, as mentioned above. However, if the driver's actual intention is different from such a calculation (e.g., the driver requests a stop of the vehicle) but the state of drive of the electric actuator 5A has been set to the "holding state" or the "variable state", it is conceivable that the operating noises of the electric actuator 5A and the variable valve mechanism 5 may cause discomfort to the driver or the like.

Therefore, the process of step T620 is designed such that it is verified whether the calculation that the engine 1 will soon be started is appropriate, by comparing the IG-off duration Toff with the pre-restart duration ToffY. Incidentally, the pre-restart duration ToffY is pre-set as a standard duration from the switching of the ignition switch 97 to the "OFF" position when the driver does not intend to finish driving the vehicle until the startup of the engine 1 begins.

Through the determination process of step T620, the electronic control apparatus 9 makes a determination regarding the startup of the engine 1 as follows.

(a) If the IG-off duration Toff is greater than or equal to the pre-restart duration ToffY, the electronic control apparatus 9 determines that the calculation that the ignition switch 97 was switched to the "OFF" position and the driver did not intend to stop the vehicle is not appropriate. That is, the electronic control apparatus 9 determines that it is unlikely that the engine 1 will be started within a short time. If this determination result is obtained, the process of step T622 is performed.

(b) If the IG-off duration Toff is less than the pre-restart duration ToffY, the electronic control apparatus 9 determines that there is no problem with the calculation that the ignition switch 97 was switched to the "OFF" position and the driver did not intend to stop the vehicle. That is, the electronic control apparatus 9 determines that it is likely that the engine 1 will be started. If this determination result is obtained, the process of step T610 is performed again.

Step T622: The state of drive of the electric actuator 5A switches from the "holding state" to the "standby state". Therefore, the supply of electric power to the electric actuator 5A stops. Furthermore, since the position of the control shaft 52 is mechanically fixed via a lock mechanism, movement of the control shaft 52 (change of the valve duration INCAM) is prevented during stop of the engine 1.

<Control Manners of Variable Valve Mechanism>

With reference to FIGS. 34 to 36, the control manners of the variable valve mechanism 5 during the following situation [a] to [c].

[a] The situation where the engine 1 is normally operated.
[b] The situation where an engine has stalled.
[c] The situation where a start failure of the engine 1 has occurred.

[1] "Control Manner during Normal Operation"

[A] Time point t11: As the ignition signal IG switches from the off state to the on state, the drive mode of the variable valve mechanism 5 is set to the "first mode". Accordingly, the changing of the state of drive of the electric actuator 5A to either the "holding state" or the "variable state" is prohibited.

[B] Time point t12: As the starter signal STA switches from the off state to the on state, the driving of the starter motor 11 starts. The electric actuator 5A is kept at the "standby state" during the time from the switching of the ignition signal IG to the on state until the motor driving duration TM becomes greater than or equal to the mask duration TMX.

[C] Time point t13: As the motor driving duration TM becomes greater than or equal to the mask duration TMX, the drive mode of the variable valve mechanism 5 is set to the "second mode". Accordingly, the target valve duration INCAMtrg is updated (it is assumed herein that the second valve duration INCAMscd is set as a target valve duration INCAMtrg). Then, the drive state of the electric actuator 5A is set to the "variable state", and the valve duration INCAM is changed.

[D] Time point t14: As the monitored valve duration INCAMmnt becomes equal to the second valve duration INCAMscd, the drive state of the electric actuator 5A switches from the "variable state" to the "holding state". During the time from time point t14 until the shift to the "third mode" is permitted, the electric actuator 5A is set to the "variable state" every time the second valve duration INCAMscd is updated in accordance with the engine speed NE.

[E] Time point t15: As the mode shift condition is met during the state where the warmup of the variable valve mechanism 5 has been completed, the drive mode of the variable valve mechanism 5 is set to the "third mode". Accordingly, the third valve duration INCAMthd is set as a target valve duration INCAMtrg. Then, the drive state of the electric actuator 5A is set to the "variable state", and the valve duration INCAM is changed. Incidentally, from time point t15 on, the electric actuator 5A is set to the "variable state" at every update of the third valve duration INCAMthd based on the target intake airflow amount GAtrg and the intake airflow amount measured value GAM, while the set drive mode of the variable valve mechanism 5 is the "third mode".

[F] Time point t16: As the ignition signal IG switches from the on state to the off state, the drive mode of the variable valve mechanism 5 is set to the "fifth mode". Accordingly, the maximum valve duration INCAMmax is set as a target valve duration INCAMtrg. Then, the drive state of the electric actuator 5A is set to the "variable state", and the valve duration INCAM is changed.

[G] Time point t17: As the monitored valve duration INCAMmnt becomes equal to the maximum valve duration INCAMmax (or as the IG-off duration Toff becomes greater than or equal to the reference off duration ToffX), the drive state of the electric actuator 5A switches from the "variable state" to the "standby state".

[2] "Control Manner at the Time of Engine Stall"

[A] Time point t21: As an engine stall occurs during operation of the engine 1, the drive mode of the variable valve mechanism 5 is set to the "fourth mode". Accordingly, the drive state of the electric actuator 5A is set to the "holding state".

[B] Time point t22: As the starter signal STA switches from the off state to the on state, the driving of the starter motor 11 starts. The electric actuator 5A is kept at the "holding state" during the time from the occurrence of the engine stall until the motor driving duration TM becomes greater than or equal to the mask duration TMX.

[C] Time point t23: As the motor driving duration TM becomes greater than or equal to the mask duration TMX, the drive mode of the variable valve mechanism 5 is set to the "third mode". Incidentally, from time point t23 on, the electric actuator 5A is set to the "variable state" at every update of the third valve duration INCAMthd based on the target intake airflow amount GAtrg and the intake airflow amount measured value GAM, while the set drive mode of the variable valve mechanism 5 is the "third mode".

[D] Time point t24: Because another engine stall occurs during operation of the engine 1, the drive mode of the variable valve mechanism 5 is set to the "fourth mode". Accordingly, the drive state of the electric actuator 5A is set to the "holding state".

[E] Time point t25: As the ignition signal IG switches from the on state to the off state, the drive mode of the variable valve mechanism 5 is set to the "fifth mode". Accordingly, the maximum valve duration INCAMmax is set as a target valve duration INCAMtrg. Then, the drive state of the electric actuator 5A is set to the "variable state", and the valve duration INCAM is changed.

[F] Time point t26: As the monitored valve duration INCAMmnt becomes equal to the maximum valve duration INCAMmax (or as the IG-off duration Toff becomes greater than or equal to the reference off duration ToffX), the state of drive of the electric actuator 5A switches from the "variable state" to the "standby state".

[3] "Control Manner at the Time of Startup Failure"

[A] Time point t31: As the ignition signal IG switches from the off state to the on state, the drive mode of the variable valve mechanism 5 is set to the "first mode". Accordingly, the changing the drive state of the electric actuator 5A to either the "holding state" or the "variable state" is prohibited.

[B] Time point t32: As the starter signal STA switches from the off state to the on state, the driving of the starter motor 11 starts. The electric actuator 5A is kept at the "standby state" during the time from the switching of the ignition signal IG to the on state until the motor driving duration TM becomes greater than or equal to the mask duration TMX.

[C] Time point t33: As the motor driving duration TM becomes greater than or equal to the mask duration TMX, the drive mode of the variable valve mechanism 5 is set to the "second mode". Accordingly, the target valve duration INCAMtrg is updated (it is assumed herein that the second valve duration INCAMscd is set as a target valve duration INCAMtrg). Then, the drive state of the electric actuator 5A is set to the "variable state", and the valve duration INCAM is changed.

[D] Time point t34: Because the engine 1 fails to start, the drive mode of the variable valve mechanism 5 is set to the "fourth mode". Accordingly, the state of drive of the electric actuator 5A is set to the "holding state".

[E] Time point t35: As there is no operation history of the engine 1 when the ignition switch 97 is switched to the "OFF" position, the drive mode of the variable valve mechanism 5 is set to the "sixth mode". In addition, the "holding state" of the electric actuator 5A is maintained.

[F] Time point t36: As the ignition signal IG switches from the off state to the on state, the drive mode of the variable valve mechanism 5 is set to the "fourth mode". Incidentally, if the IG-off duration Toff becomes greater than or equal to pre-restart duration ToffY before the ignition signal IG switches from the off state to the on state, the drive state of the electric actuator 5A switches from the "holding state" to the "standby state".

[G] Time point t37: As the starter signal STA switches from the off state to the on state, the driving of the starter motor 11 starts. The electric actuator 5A is kept at the "holding state" during the time from the occurrence of the engine stall until the motor driving duration TM becomes greater than or equal to the mask duration TMX.

[H] Time point t38: As the motor driving duration TM becomes greater than or equal to the mask duration TMX, the drive mode of the variable valve mechanism 5 is set to the "second mode". Accordingly, the target valve duration INCAMtrg is updated (it is assumed herein that the second valve duration INCAMscd is set as a target valve duration INCAMtrg). Then, the drive state of the electric actuator 5A is set to the "variable state", and the valve duration INCAM is changed.

As can be understood from the foregoing description, the control apparatus for an engine according to this embodiment achieves the following advantages.

(1) During stop of the engine 1, it is relatively quiet in the cabin. Therefore, if in such a situation, the valve duration INCAM is changed, it is conceivable that the driver or other occupants may be annoyed by the noise produced in conjunction with the changing of the valve duration INCAM.

Considering such a circumstance, the control apparatus of this embodiment is designed so that during stop of the engine 1, the valve duration INCAM is not changed. Therefore, it becomes possible to curb the degradation of driveability caused by change of the valve duration INCAM.

(2) During the time beginning when a driver or other occupant gets into the vehicle and ending when startup of the engine 1 starts, it is relatively quiet in the cabin. Therefore, if in such a situation, the variable valve mechanism 5 or the electric actuator 5A is driven, it is conceivable that the driver or other occupants may be annoyed by the operating noise of the variable valve mechanism 5 or the electric actuator 5A.

Considering such a circumstance, the control apparatus of this embodiment is designed so that the state of drive of the electric actuator 5A is kept at the "standby state", until the engine 1 starts. Therefore, it becomes possible to curb the degradation of driveability caused by the operating noise of the variable valve mechanism 5 or the electric actuator 5A prior to the startup of the engine 1.

(3) In the control apparatus of this embodiment, the drive state of the electric actuator 5A is kept at the "standby state" until the motor driving duration TM becomes greater than or equal to the mask duration TMX. Therefore, it becomes possible to curb the occurrence of a start failure of the engine 1 caused by a reduced battery voltage BV.

(4) In the control apparatus of this embodiment, if the intake temperature THA is greater than or equal to the reference intake temperature THAX, the first valve duration INCAMfst is set as a target valve duration INCAMtrg until the post-startup duration TE becomes greater than or equal to the reference post-startup duration TEX. Therefore, it becomes possible to curb the occurrence of knocking even in the case where the engine 1 is started when the intake temperature THA is relatively high.

(5) At the time of a drive mode shift, there is a risk of an engine stall resulting from an increased deviation of the actual intake airflow amount GA from the target intake airflow amount GAtrg, that is, the actual intake airflow amount GA becoming considerably less than the target intake airflow amount GAtrg. However, when the operation state of the engine 1 is not a low-load operation state, the occurrence of an engine stall can be avoided even if the intake airflow amount GA temporarily becomes small.

Considering such a circumstance, the control apparatus of this embodiment is designed so that if "condition 4" (the intake rate GAP is greater than the second intake rate GAPX2) is not met, the switching from the "second mode" to the "third mode" is prohibited. Therefore, it becomes possible to curb the occurrence of an engine stall caused by the drive mode switching.

(6) The degradation of vehicle driveability associated with the drive mode shift can be curbed when the vehicle or the engine 1 is in any one of the following states:

During a state where the speed of the vehicle (vehicle speed SPD) is relatively great, the vibrations of the engine 1 and the vehicle are great, so that torque fluctuations are unlikely to be perceived by the driver. Therefore, the permission of the shift from the "second mode" to the "third mode" when the vehicle speed SPD is within such a range (torque fluctuation permission range) contributes to the curbing of the degradation of vehicle driveability caused by the drive mode shift.

When the operation state of the engine 1 is a transitional operation state, the vibrations of the engine 1 and the vehicle are great, so that torque fluctuations are unlikely to be perceived by the driver. Therefore, performing the shift from the "second mode" to the "third mode" during the transitional operation state of the engine 1 contributes to the curbing of the degradation of vehicle driveability caused by the drive mode shift.

When the operation state of the engine 1 is a high-load operation state, the valve duration INCAM is set relatively large. While the "second mode" has been selected, the valve duration INCAM is basically set at an duration that is larger than the duration set when the operation state of the engine 1 is an intermediate-load operation state or a low-load operation state. Therefore, shifting from the "second mode" to the "third mode" when the operation state of the engine 1 is the high-load operation state reduces the amount of change of the valve duration INCAM involved in the drive mode shift, and thus contributes to the curbing of the degradation of vehicle driveability caused by the drive mode shift.

Considering such a circumstance, the control apparatus of this embodiment is designed so as to prohibit the switching from the "second mode" to the "third mode" when none of "condition 1" (the vehicle speed measured value SPDM be greater than or equal to the lower-limit vehicle speed SPDUL), "condition 2" (the intake rate change amount ΔGAP be greater than or equal to reference change amount ΔGAPX), and "condition 3" (the intake rate GAP be greater than or equal to the first intake rate GAPX1) are met. That is, the drive mode switching is permitted if at least one of "condition 1", "condition 2" and "condition 3" is met. Therefore, it becomes possible to curb the degradation of driveability caused by the drive mode switching.

(7) If the engine stalls while the valve duration INCAM is being changed, the changing of the valve duration INCAM naturally discontinues, so that it is required that the changing of the valve duration INCAM be promptly resumed after the engine 1 has been restarted.

Considering such a circumstance, the control apparatus of this embodiment is designed so as to set the electric actuator 5A to the "holding state" when the engine 1 has stopped due to an engine stall. Therefore, it becomes possible to promptly change the valve duration INCAM after the engine 1 has been restarted.

(8) When the electric actuator 5A is set at the "variable state" (i.e., during the changing of the valve duration INCAM by the variable valve mechanism 5), the operating noise of the electric actuator 5A is greater than when the electric actuator 5A is set at the "holding state". In addition, operating noise of the variable valve mechanism 5 also occurs during the "variable state" of the electric actuator 5A. Therefore, if the electric actuator 5A is set to the "variable state" when the engine 1 has stopped due to an engine stall, it is conceivable that the operating noise of the variable valve mechanism 5 or the electric actuator 5A may annoy the driver or other occupants.

Considering such a circumstance, the control apparatus of this embodiment is designed so that while the engine 1 has stopped due to an engine stall, the electric actuator 5A is not set to the "variable state". Therefore, it becomes possible to curb the degradation of driveability caused by the operating noise of the variable valve mechanism 5 or the electric actuator 5A when an engine stall has occurred.

(9) If an engine stall occurs, the engine 1 is usually restarted after a while; however, in some cases, the engine 1 is left in the stopped state for a long time. In such cases, it may be preferable to set the electric actuator 5A to the "standby state" so as to reduce the consumption of electric power from the battery 12 rather than continue the "holding state" of the electric actuator 5A so as to remain ready for restart of the engine 1.

Considering such a circumstance, the control apparatus of this embodiment is designed so that if the startup standby duration TS is greater than or equal to the reference standby duration TSX, the drive state of the electric actuator 5A is set to the "standby state". Therefore, the control apparatus can curb the consumption of electric power from the battery 12.

(10) As for this vehicle, it can happen that it is impossible to change the valve duration INCAM at the time of starting up the engine 1, due to occurrence of an abnormality in the electric actuator 5A during the stop of the engine 1. If in such a case, the valve duration INCAM is set equal to or close to the minimum valve duration INCAMmin, it is conceivable that at the time of startup of the engine 1, the amount of air supplied to the combustion chamber 24 will become insufficient, thus leading to a start failure.

Considering such a circumstance, the control apparatus of this embodiment is designed so that when a drive of the vehicle ends, the valve duration INCAM is set at a maximum valve duration INCAMmax so as to be ready from the next drive. Therefore, even if an abnormality of the electric actuator 5A occurs, insufficient air supply is substantially prevented at the time of startup of the engine 1, thus improving the engine startability.

(11) The ignition switch 97 is usually switched from the "ON" position to the "OFF" position when the driver has finished driving the vehicle. In some cases, however, the ignition switch 97 may be switched to the "OFF" position before the driver is finished driving the vehicle. In the latter case, the engine 1 is started within a relatively short time, and therefore the risk of an abnormality of the electric actuator 5A occurring during a time following the switching of the ignition switch 97 to the "OFF" position up to restart of the engine 1 can be said to be very small. That is, it is considered that even if the valve duration INCAM is not changed to the maximum valve duration INCAMmax on the basis of the switching of the ignition switch 97 to the "OFF" position, there is no risk of a start failure resulting from insufficient air supply. In addition, changing the valve duration INCAM to the maximum valve duration INCAMmax in such a situation would mostly turn out to be unnecessary consumption of electric power from the battery 12, since the valve duration INCAM is changed to a target valve duration INCAMtrg suitable for the operation state immediately after starting the engine 1.

Considering such a circumstance, the control apparatus of this embodiment is designed so as to prohibit the changing of the valve duration INCAM if there is not an operation history when the ignition switch 97 is switched to the "OFF" position. Therefore, unnecessary operations of the variable valve mechanism 5 can be eliminated. Furthermore, the consumption of the electric power from the battery 12 can be curbed.

(12) If the valve duration INCAM is changed toward the maximum valve duration INCAMmax while the engine speed NE is excessively great, the thus-increased intake airflow amount GA may result in combustion of fuel remaining in the combustion chamber 24. In this case, even though the driver may wish to stop the vehicle, the engine speed NE rises, which may cause discomfort to the driver.

Considering such a circumstance, the control apparatus of this embodiment is designed so as to prohibit increasing the valve duration INCAM if the measured vehicle speed SPDM is greater than or equal to the reference vehicle speed SPDX. Therefore, it becomes possible to considerably reduce the incidents of the engine speed NE increasing when driver wishes to stop the vehicle.

(13) If the changing of the valve duration INCAM is performed when the engine speed NE is very small (equal to or close to "0"), the load that the electric actuator 5A receives when moving the control shaft 52 becomes considerably great, so that the electric actuator 5A may be damaged in conjunction with the changing of the valve duration INCAM.

Considering such a circumstance, the control apparatus of this embodiment is designed so as to prohibit the changing of the valve duration INCAM if the IG-off duration Toff is greater than or equal to the reference off duration ToffX. Therefore, it becomes possible to considerably reduce the incidents of the electric actuator 5A being damaged in conjunction with the changing of the valve duration INCAM.

(14) In the control apparatus of this embodiment, the electric actuator 5A is set to the "holding state" while the drive mode of the variable valve mechanism 5 is set at the "sixth mode". Therefore, it becomes possible to promptly change the valve duration INCAM after the engine 1 has been started.

(15) When the electric actuator 5A is set at the "variable state" (i.e., during the changing of the valve duration INCAM by the variable valve mechanism 5), the operating noise of the electric actuator 5A is greater than when the electric actuator 5A is set at the "holding state". In addition, operating noise of the variable valve mechanism also occurs during the "variable state" of the electric actuator 5A. Therefore, if the electric actuator 5A is set to the "variable state" when the engine 1 has stopped due to a start failure, it is conceivable that the operating noise of the variable valve mechanism 5 or the electric actuator 5A may annoy the driver or other vehicle occupants.

Considering such a circumstance, the control apparatus of this embodiment is designed so that when the engine 1 has stopped due to a start failure, the electric actuator 5A is not set to the "variable state". Therefore, it becomes possible to curb the degradation of driveability caused by the operating noise of the variable valve mechanism 5 or the electric actuator 5A when a start failure of the engine 1 has occurred.

(16) If an operation history is not detected when the ignition switch 97 is switched to the "OFF" position, it is calculated that the driver does not intend to finish driving, that is, it is calculated that the engine 1 will be started again within a short time. However, if the driver's actual intention is different from such a calculation (e.g., the driver indeed wishes to stop the vehicle) but the state of drive of the electric actuator 5A has been set to the "holding state" or the "variable state", it is conceivable that the operating noises of the electric actuator 5A and the variable valve mechanism 5 may cause discomfort to the driver or other vehicle occupants.

Considering such a circumstance, the control apparatus of this embodiment is designed so as to set the state of drive of the electric actuator 5A to the "standby state" if the IG-off duration Toff is greater than or equal to the pre-restart duration ToffY. Therefore, it becomes possible to considerably reduce the incidents where the operating noise of the electric actuator 5A or the variable valve mechanism 5 causes discomfort to the driver or other vehicle occupants.

OTHER EMBODIMENTS

The foregoing embodiment may be modified, for example, in the following manners.

In the process of step T260 of the "second actuator driving process" in the foregoing embodiment, it is determined that the mode shift condition is met provided that at least one of "condition 1", "condition 2" and "condition 3", and "condition 4" are met. However, this may be modified, for example, as follows.

(a) It is determined that the mode shift condition is met provided that at least one of "condition 1" to "condition 4" is met.

(b) It is determined that the mode shift condition is met provided that all of "condition 1" to "condition 4" are met.

In the foregoing embodiment, degradation of the vehicle driveability is curbed as follows. That is, after the drive mode of the variable valve mechanism 5 is set to the "second mode", the switching to the "third mode" is not performed until the condition of step T250 and the condition of step T260 in the "second actuator driving process" are fulfilled. However, this may be modified, for example, as follows. That is, after the drive mode of the variable valve mechanism 5 is set to the "second mode", the switching to the "third mode" begins on the basis of fulfillment of the condition of step T250 in the "second actuator driving process", and during the drive mode shift, the valve duration INCAM is gently changed. In this manner, the degradation of vehicle driveability is curbed. In an example of the manner of changing the valve duration INCAM in this case, the amount of change of the valve duration INCAM per unit time is set at or below a predetermined value.

In the process of step T250 of the "second actuator driving process" in the foregoing embodiment, the coolant temperature THW is adopted as an index value of the warmup state of the variable valve mechanism 5. However, other parameters may also be adopted as an index value of the warmup state. For example, the temperature of the lubricating oil of the engine 1, the elapsed time from startup of the engine 1, etc. may be used as a basis for the determination as to whether the warmup of the variable valve mechanism 5 has been completed. Furthermore, the temperature of the variable valve mechanism 5 may be directly measured in order to grasp the warmup state thereof.

The foregoing embodiment is constructed so that when the drive mode of the variable valve mechanism 5 is set at the "fourth mode", the drive state of the electric actuator 5A is set to the "holding state". However, this may be modified as follows. That is, the state of drive of the electric actuator 5A may be set to the "standby state" (the drive state of the electric actuator 5A may be set to the "standby state" in the process of step T402 of the "fourth actuator driving process").

In the process of step T520 of the "fifth actuator driving process" in the foregoing embodiment, it is determined that the present state of the engine 1 is a change allowable state provided that the measured vehicle speed SPDM is less than the reference vehicle speed SPDX. However, this may be modified, for example, as follows. That is, it is also possible to determine that the state of the engine 1 is a change allowable state provided that the engine speed NE is less than a criterion value. Incidentally, the criterion value is set as a value that is greater than the lower-limit engine speed NEUL.

In the process of step T522 of the "fifth actuator driving process" in the foregoing embodiment, the maximum valve duration INCAMmax is set as a target valve duration INCAMtrg. However, an duration other than the maximum valve duration INCAMmax may also be set as a target valve duration INCAMtrg. Briefly, any appropriate duration other than the maximum valve duration INCAMmax may also be set as a target valve duration INCAMtrg as long as it is a valve duration INCAM that substantially avoids insufficient supply of air at the time of starting the engine 1.

In the process of step T540 of the "fifth actuator driving process" in the foregoing embodiment, a pre-set reference off duration ToffX is adopted. However, this may be modified, for example, as follows. That is, it is also possible that every time the ignition switch 97 is switched to the "OFF" position, a reference off duration ToffX be set on the basis of the then engine speed NE.

In the process of step T540 of the "fifth actuator driving process" in the foregoing embodiment, it is determined whether to continue the changing of the valve duration INCAM based on the comparison between the IG-off duration Toff and the reference off duration ToffX. However, this may be modified, for example, as follows. That is, the determination as to whether to continue the changing of the valve duration INCAM may also be made based on the comparison between the engine speed measured value NEM and the lower-limit engine speed NEUL. If this construction is adopted, the process of step T540 of the "fifth actuator driving process" is constructed as follows.

(a) If NEM≧NEUL, then the process of step T530 is performed.
(b) If NEM<NEUL, then the process of step T542 is performed.

In the foregoing embodiment, after the drive mode of the variable valve mechanism 5 is set to the "fifth mode", the changing of the valve duration INCAM is continued until the condition of step T530 or the condition of step T540 in the "fifth actuator driving process" is met. However, this may be modified, for example, as follows. That is, it is also possible that after the drive mode of the variable valve mechanism 5 is set to the "fifth mode", the valve duration INCAM is changed toward the maximum valve duration INCAMmax, and until the monitored valve duration INCAMmnt becomes equal to the maximum valve duration INCAMmax, the operation of the engine 1 is continued.

In the foregoing embodiment, while the drive mode of the variable valve mechanism 5 is set at the "sixth mode", the drive state of the electric actuator 5A is set to the "standby state" on the basis of fulfillment of the condition of step T620 of the "sixth actuator driving process". However, this may be modified, for example, as follows. That is, it is also possible that while the drive mode of the variable valve mechanism 5 is set at the "sixth mode", the drive state of the electric actuator 5A is set to the "standby state" (the state of drive of the electric actuator 5A is set to the "standby state" in the process of step T602 of the "sixth actuator driving process").

Although in the foregoing embodiment, the "variable valve mechanism driving process" is constructed of the "first variable valve mechanism driving process" to the "sixth variable valve mechanism driving process", the construction of the "variable valve mechanism driving process" may be modified as follows. That is, the "variable valve mechanism driving process" may be constructed of at least one process of the "first variable valve mechanism driving process" to the "fifth variable valve mechanism driving process".

Although the foregoing embodiment adopts the electric actuator 5A that has a lock mechanism, it is also possible to adopt an electric actuator that does not have a lock mechanism. Although the electric actuator 5A adopted in the foregoing embodiment fixes the position of the control shaft 52 through the lock mechanism during the "standby state", and holds the position of the control shaft 52 through the electric power from the battery 12 during the "holding state", an electric actuator as described below may also be adopted. That is, it is also possible to adopt an electric actuator that fixes the position of the control shaft 52 through the lock mechanism during the "standby state" and during the "holding state".

In the foregoing embodiment, the engine 1 is assumed to be an engine in which the intake airflow amount GA is adjusted via the throttle valve 39 until the warmup of the variable valve mechanism 5 is completed. However, the engines to which the variable valve mechanism of the invention may be applied are not limited to the engine exemplified in the embodiment. The variable valve mechanism of the invention is also applicable to, for example, an engine in which the intake airflow amount GA is adjusted via a variable valve mechanism throughout the operation of the engine from the start to the stop. Furthermore, the variable valve mechanism of the invention is also applicable to an engine in which the intake airflow amount GA is adjusted through a cooperative control of the variable valve mechanism and the throttle valve throughout the operation of the engine from the start to the stop.

In the foregoing embodiment, the invention is applied to the variable valve mechanism 5 that changes the opening-closing characteristic of the intake valve 33 (the valve duration and the maximum valve lift). However, the invention is also applicable to a variable valve mechanism for the exhaust valve 37.

The invention has been described in connection with the variable valve mechanism having a structure exemplified in FIGS. 4 to 11. However, it is to be understood that the various modifications, alterations and adaptations may be made by those skilled in the art without departing from the spirit and scope of the invention. It is intended that the invention be limited only by the appended claims.

The invention claimed is:

1. An engine control apparatus comprising:
   a control unit, and
   a variable valve mechanism,
   wherein the engine control apparatus changes an opening-closing characteristic of an engine valve by controlling the variable valve mechanism and the control unit prohibits the changing of the opening-closing characteristic of the engine valve when the engine is stopped.

2. The engine control apparatus according to claim 1, wherein the control unit further prohibits the changing of the opening-closing characteristic of the engine valve of the stopped engine starting from when an ignition switch is switched to an on position and ending when driving of a starter motor begins.

3. An engine control apparatus comprising
   a control unit, and
   a variable valve mechanism,
   wherein the engine control apparatus changes an opening-closing characteristic of an engine valve by controlling the variable valve mechanism and the control unit prohibits changing the opening-closing characteristic of the engine valve from when an ignition switch is switched to an on position, when the engine is stopped, and ending when driving of a starter motor begins.

4. The engine control apparatus according to claim 3, wherein the variable valve mechanism comprises:
   a control shaft disposed in a cylinder head,
   a valve lift mechanism, mounted around the control shaft, that operates an engine valve, and
   an actuator that moves the control shaft along the longitudinal axis of the control shaft,
   wherein the valve lift mechanism includes a slider gear that moves in cooperation with the control shaft; an input gear mounted on the slider gear that operates through a cam of a camshaft, and an output gear mounted on the slider gear that operates the engine valve, and the actuator changes the duration of the engine valve by relatively rotating the input gear and the output gear through a movement of the control shaft.

5. The engine control apparatus according to claim 4, wherein the actuator is driven via electric power.

6. An engine control apparatus comprising:
a control unit, and
a variable valve mechanism,
wherein the engine control apparatus changes an opening-closing characteristic of an engine valve by controlling the variable valve mechanism and the control unit prohibits the changing of the opening-closing characteristic of the engine valve from when an engine stall is detected until when a restart of the engine is detected.

7. The engine control apparatus according to claim 6, wherein when the control unit prohibits the changing of the opening-closing characteristic of the engine valve, the control unit maintains the opening-closing characteristic of the engine valve used immediately before the engine stall is detected.

8. The engine control apparatus according to claim 6, wherein the variable valve mechanism comprises:
a control shaft disposed in a cylinder head,
a valve lift mechanism mounted around the control shaft that operates an engine valve, and
an actuator that moves the control shaft along the longitudinal axis of the control shaft,
wherein the valve lift mechanism includes a slider gear that moves in cooperation with the control shaft, an input gear mounted on the slider gear that operates through a cam of a camshaft, and an output gear mounted on the slider gear that operates the engine valve, and
the actuator changes the duration of the engine valve by relatively rotating the input gear and the output gear through a movement of the control shaft.

9. The engine control apparatus according to claim 8, wherein the actuator is driven via electric power.

10. An engine control apparatus comprising:
a control unit, and
a variable valve mechanism,
wherein the engine control apparatus changes an opening-closing characteristic of an engine valve by controlling the variable valve mechanism,
when an amount of intake air is adjusted by changing a degree of opening of a throttle valve, the variable valve mechanism is switched to a first drive manner; and when the amount of intake air is adjusted by changing the opening-closing characteristic of the engine valve, the variable valve mechanism is switched to a second drive manner, and
the control unit permits switching from the first drive manner to the second drive manner when the engine is in a transitional operation state.

11. The engine control apparatus according to claim 10, wherein the variable valve mechanism comprises:
a control shaft disposed in a cylinder head,
a valve lift mechanism mounted around the control shaft that operates an engine valve, and
an actuator that moves the control shaft along the longitudinal axis of the control shaft,
wherein the valve lift mechanism includes a slider gear that moves in cooperation with the control shaft, an input gear, mounted on the slider gear, that operates through a cam of a camshaft, and an output gear mounted on the slider gear that operates the engine valve, and
the actuator changes the duration of the engine valve by relatively rotating the input gear and the output gear through a movement of the control shaft.

12. The engine control apparatus according to claim 11, wherein the actuator is driven via electric power.

13. An engine control apparatus comprising:
a control unit, and
a variable valve mechanism,
wherein the engine control apparatus changes an opening-closing characteristic of an engine valve by controlling of the variable valve mechanism,
when an amount of intake air is adjusted by changing a degree of opening of a throttle valve, the variable valve mechanism is switched to a first drive manner; and when the amount of intake air is adjusted by changing the opening-closing characteristic of the engine valve, the variable valve mechanism is switched to a second drive manner, and
the control unit permits switching from the first drive manner to the second drive manner when the engine is not in a low-speed run state.

14. The engine control apparatus according to claim 13, wherein the variable valve mechanism comprises:
a control shaft disposed in a cylinder head,
a valve lift mechanism mounted around the control shaft that operates an engine valve, and
an actuator that moves the control shaft along the longitudinal axis of the control shaft,
wherein the valve lift mechanism includes a slider gear that moves in cooperation with the control shaft, an input gear mounted on the slider gear that operates through a cam of a camshaft, and an output gear mounted on the slider gear that operates the engine valve, and
the actuator changes the duration of the engine valve by relatively rotating the input gear and the output gear through a movement of the control shaft.

15. The engine control apparatus according to claim 14, wherein the actuator is driven via electric power.

16. An engine control apparatus comprising:
a control unit, and
a variable valve mechanism,
wherein the engine control apparatus changes an opening-closing characteristic of an engine valve by controlling the variable valve mechanism,
when an amount of intake air is adjusted by changing a degree of opening of a throttle valve, the variable valve mechanism is switched to a first drive manner; and when the amount of intake air is adjusted by changing the opening-closing characteristic of the engine valve, the variable valve mechanism is switched to a second drive manner, and
the control unit permits switching from the first drive manner to the second drive manner when the engine is in a high-load operation state.

17. The engine control apparatus according to claim 16, wherein the variable control mechanism comprises:
a control shaft disposed in a cylinder head,
a valve lift mechanism mounted around the control shaft that operates an engine valve, and
an actuator that moves the control shaft along the longitudinal axis of the control shaft,
wherein the valve lift mechanism includes a slider gear that moves in cooperation with the control shaft, an input gear mounted on the slider gear that operates through a cam of a camshaft, and an output gear mounted on the slider gear that operates the engine valve, and the actuator changes the duration of the engine valve by relatively rotating the input gear and the output gear through a movement of the control shaft.

18. The engine control apparatus according to claim 17, wherein the actuator is driven via electric power.

19. An engine control apparatus comprising:
a control unit, and
a variable valve mechanism,
wherein the engine control apparatus changes an opening-closing characteristic of an engine valve by controlling the variable valve mechanism,
when an amount of intake air is adjusted by changing a degree of opening of a throttle valve, the variable valve mechanism is switched to a first drive manner; and when the amount of intake air is adjusted by changing the opening-closing characteristic of the engine valve, the variable valve mechanism is switched to a second drive manner, and
the control unit permits switching from the first drive manner to the second drive manner when the engine is not in a low-load operation state.

20. The engine control apparatus according to claim 19, wherein the variable control mechanism comprises:
a control shaft disposed in a cylinder head,
a valve lift mechanism mounted around the control shaft that operates an engine valve, and
an actuator that moves the control shaft along the longitudinal axis of the control shaft,
wherein the valve lift mechanism includes a slider gear that moves in cooperation with the control shaft, an input gear mounted on the slider gear that operates through a cam of a camshaft, and an output gear mounted on the slider gear that operates the engine valve, and
the actuator changes the duration of the engine valve by relatively rotating the input gear and the output gear through a movement of the control shaft.

21. The engine control apparatus according to claim 20, wherein the actuator is driven via electric power.

22. An engine control apparatus comprising:
a control unit, and
a variable valve mechanism,
wherein the engine control apparatus changes an opening-closing characteristic of an engine valve by controlling the variable valve mechanism and the control unit changes the opening-closing characteristic of the intake valve toward an initial opening-closing characteristic, which is defined to be a largest or nearly largest open valve duration of the intake valve when an ignition switch is switched to an off position.

23. The engine control apparatus according to claim 22, wherein
if the control unit detects that a vehicle speed is greater than or equal to a threshold value when changing the opening-closing characteristic of the intake valve toward the initial opening-closing characteristic, the control unit suspends the changing of the opening-closing characteristic of the intake valve until the vehicle speed falls below the threshold value.

24. The engine control apparatus according to claim 22, wherein
if the control unit detects that an engine speed is greater than or equal to a threshold value when changing the opening-closing characteristic of the intake valve toward the initial opening-closing characteristic, the control unit suspends the changing of the opening-closing characteristic of the intake valve until the vehicle speed falls below the threshold value.

25. The engine control apparatus according to claim 22, wherein
if the control unit detects that the engine has failed to start before the ignition switch is switched to the off position, the control unit prohibits the changing of the opening-closing characteristic of the intake valve toward the initial opening-closing characteristic.

26. The engine control apparatus according to claim 25, wherein,
when the control unit prohibits the changing of the opening-closing characteristic of the intake valve, the control unit maintains the opening-closing characteristic of the intake valve that was used immediately before the switching of the ignition switch to the off position is detected.

27. The engine control apparatus according to claim 22, wherein,
if the control unit determines or predict that an engine speed is less than a reference value when the opening-closing characteristic of the intake valve is changed, the control unit discontinues the changing of the opening-closing characteristic of the intake valve.

28. The engine control apparatus according to claim 22, wherein the variable valve mechanism comprises:
a control shaft disposed in a cylinder head,
a valve lift mechanism, mounted around the control shaft, that operates an engine valve, and
an actuator that moves the control shaft along the longitudinal axis of the control shaft,
wherein, the valve lift mechanism includes a slider gear that moves in cooperation with the control shaft; an input gear, mounted on the slider gear, that operates through a cam of a camshaft, and an output gear mounted on the slider gear that operates the engine valve, and
the actuator changes the duration of the engine valve by relatively rotating the input gear and the output gear through a movement of the control shaft.

29. The engine control apparatus according to claim 28, wherein the actuator is driven via electric power.

30. The engine control apparatus according to claim 22, wherein the variable control mechanism comprises:
a control shaft disposed in a cylinder head,
a valve lift mechanism mounted around the control shaft that operates an engine valve, and
an actuator that moves the control shaft along the longitudinal axis of the control shaft,
wherein the valve lift mechanism includes a slider gear that moves in cooperation with the control shaft, an input gear mounted on the slider gear that operates through a cam of a camshaft, and an output gear mounted on the slider gear that operates the engine valve, and
the actuator changes the duration of the engine valve by relatively rotating the input gear and the output gear through a movement of the control shaft.

31. The engine control apparatus according to claim 30, wherein the actuator is driven via electric power.

32. A method of controlling a valve opening-closing characteristic in an engine, the method comprising:
determining whether the engine is stopped, and
prohibiting a variable valve mechanism from changing the valve opening-closing characteristic when it is determined that the engine is stopped.

33. A method of controlling a valve opening-closing characteristic in an engine, the method comprising:

determining whether the engine has stalled, and prohibiting a variable valve mechanism from changing the valve opening-closing characteristic from when it is determined that the engine is stalled until a restart of the engine is detected.

34. A method of controlling a valve opening-closing characteristic in an engine, the method comprising:

determining whether the engine is in a transitional operation state, and permitting changing the valve opening-closing characteristic of a variable valve mechanism from a first drive manner to a second drive manner when it is determined that the engine is in the transitional operation state, wherein, when an amount of intake air is adjusted by changing a degree of opening of a throttle valve, the variable valve mechanism is switched to the first drive manner; and when the amount of intake air is adjusted by changing the opening-closing characteristic of the engine valve, the variable valve mechanism is switched to the second drive manner.

35. A method of controlling a valve opening-closing characteristic in an engine, the method comprising:

determining whether an engine is not in a low-speed run state, and permitting changing the valve opening-closing characteristic of a variable valve mechanism from a first drive manner to a second drive manner when it is determined that the engine is not in the low-speed run state, wherein, when an amount of intake air is adjusted by changing a degree of opening of a throttle valve, the variable valve mechanism is switched to the first drive manner; and when the amount of intake air is adjusted by changing the opening-closing characteristic of the engine valve, the variable valve mechanism is switched to the second drive manner.

36. A method of controlling a valve opening-closing characteristic in an engine, the method comprising:

determining whether an engine is in a high-load operation state, and permitting changing the valve opening-closing characteristic of a variable valve mechanism from a first drive manner to a second drive manner when it is determined that the engine is in the high-load operation state, wherein, when an amount of intake air is adjusted by changing a degree of opening of a throttle valve, the variable valve mechanism is switched to the first drive manner; and when the amount of intake air is adjusted by changing the opening-closing characteristic of the engine valve, the variable valve mechanism is switched to the second drive manner.

37. A method of controlling a valve opening-closing characteristic in an engine, the method comprising:

determining whether an engine is not in a low-load operation state, and permitting changing the valve opening-closing characteristic of a variable valve mechanism from a first drive manner to a second drive manner when it is determined that the engine is not in the low-load operation state, wherein, when an amount of intake air is adjusted by changing a degree of opening of a throttle valve, the variable valve mechanism is switched to the first drive manner; and when the amount of intake air is adjusted by changing the opening-closing characteristic of the engine valve, the variable valve mechanism is switched to the second drive manner.

38. A method of controlling a valve opening-closing characteristic in an engine, the method comprising:

determining whether an ignition switch is switched to an off position, and changing the valve opening-closing characteristic of the intake valve toward an initial opening-closing characteristic, which is defined to be a largest or nearly largest open valve duration of the intake valve when it is determined that the ignition switch is switched to the off position.

* * * * *